United States Patent
Norbeck et al.

(10) Patent No.: US 7,500,997 B2
(45) Date of Patent: *Mar. 10, 2009

(54) STEAM PYROLYSIS AS A PROCESS TO ENHANCE THE HYDRO-GASIFICATION OF CARBONACEOUS MATERIALS

(75) Inventors: Joseph M. Norbeck, Riverside, CA (US); Colin E. Hackett, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/911,348

(22) Filed: Aug. 3, 2004

(65) Prior Publication Data
US 2005/0032920 A1 Feb. 10, 2005

Related U.S. Application Data

(60) Provisional application No. 60/355,405, filed on Feb. 5, 2002.

(51) Int. Cl.
C10L 3/00 (2006.01)
C10J 3/54 (2006.01)

(52) U.S. Cl. ............... 48/127.7; 48/197 R; 518/702; 518/704; 423/418.2

(58) Field of Classification Search ............... 48/70–73, 48/92, 127, 197, 198–206, 127.7, 197 R; 422/198–207; 423/449–454, 418.2; 518/700–708
See application file for complete search history.

(56) References Cited

U.S. PATENT DOCUMENTS

| | | | | |
|---|---|---|---|---|
| 3,957,460 A * | 5/1976 | Lee | ........................... | 48/197 R |
| 4,012,311 A * | 3/1977 | Greene | ........................... | 208/412 |
| 4,158,697 A * | 6/1979 | Cramer | ........................... | 422/189 |
| 4,822,935 A * | 4/1989 | Scott | ........................... | 585/240 |
| 5,344,848 A * | 9/1994 | Steinberg et al. | ........................... | 518/704 |
| 5,447,559 A * | 9/1995 | Rao et al. | ........................... | 96/4 |
| RE35,377 E * | 11/1996 | Steinberg et al. | ........................... | 518/704 |
| 6,053,954 A * | 4/2000 | Anderson et al. | ........................... | 44/280 |
| 6,225,358 B1* | 5/2001 | Kennedy | ........................... | 518/700 |
| 6,350,288 B1* | 2/2002 | Hirayama et al. | ........................... | 48/197 R |
| 6,495,610 B1* | 12/2002 | Brown | ........................... | 518/706 |
| 7,208,530 B2* | 4/2007 | Norbeck et al. | ........................... | 518/704 |
| 2005/0256212 A1* | 11/2005 | Norbeck et al. | ........................... | 518/702 |

OTHER PUBLICATIONS

Olsen et al., Unit Processes and Principles of Chemical Engineering, pp. 1-3 (1932).*

* cited by examiner

Primary Examiner—N. Bhat
(74) Attorney, Agent, or Firm—Berliner & Associates

(57) ABSTRACT

A process and apparatus for producing a synthesis gas for use as a gaseous fuel or as feed into a Fischer-Tropsch reactor to produce a liquid fuel in a substantially self-sustaining process. In one embodiment, a slurry of carbonaceous material in water, and hydrogen from an internal source, are fed into a hydro-gasification reactor to generate methane rich producer gases which are fed into a steam pyrolytic reformer to generate synthesis gas comprising hydrogen and carbon monoxide. A portion of the hydrogen is used as the internal hydrogen source. The remaining synthesis gas is either used as fuel to produce electricity and/or process heat or is fed into a Fischer-Tropsch reactor to produce liquid fuel. In another embodiment of the invention, carbonaceous material can be heated simultaneously in the presence of both hydrogen and steam to undergo steam pyrolysis and hydro-gasification in a single step.

37 Claims, 46 Drawing Sheets

STEAM PYROLYSIS AS A PROCESS TO ENHANCE THE HYDRO-GASIFICATION OF CARBONACEOUS MATERIALS

CROSS-REFERENCE TO RELATED APPLICATION

This application is a continuation-in-part of, and claims the benefit of, International Application PCT/US03/03489, herein incorporated by reference, with an international filing date of Feb. 4, 2003, published in English under PCT Article 21(2), which claims priority to U.S. Provisional Patent Application Ser. No. 60/355,405, filed Feb. 5, 2002.

BACKGROUND OF THE INVENTION

1. Field of the Invention

The field of the invention is the synthesis of transportation fuel from carbonaceous feed stocks.

2. Description of Related Art

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gases cleanly and efficiently from carbonaceous sources, that can be subjected to a Fischer-Tropsch process to produce clean and valuable synthetic gasoline and diesel fuels, will benefit both the transportation sector and the health of society. Such a process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch liquid fuels, produced from biomass derived synthesis gases, are sulfur-free, aromatic free, and in the case of synthetic diesel fuel have an ultrahigh cetane value.

Biomass material is the most commonly processed carbonaceous waste feed stock used to produce renewable fuels. Waste plastic, rubber, manure, crop residues, forestry, tree and grass cuttings and biosolids from waste water (sewage) treatment are also candidate feed stocks for conversion processes. Biomass feed stocks can be converted to produce electricity, heat, valuable chemicals or fuels. California tops the nation in the use and development of several biomass utilization technologies. Each year in California, more than 45 million tons of municipal solid waste is discarded for treatment by waste management facilities. Approximately half this waste ends up in landfills. For example, in just the Riverside County, Calif. area, it is estimated that about 4000 tons of waste wood are disposed of per day. According to other estimates, over 100,000 tons of biomass per day are dumped into landfills in the Riverside County collection area. This municipal waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30-$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is an example of using biomass to produce heat energy. Unfortunately, the open burning the biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gases for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming. In the future, these co-production processes could provide clean-burning fuels for a renewable fuel economy that could be sustained continuously.

A number of processes exist to convert coal and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

The need to identify new resources and methods for the production of transportation fuels requires not only investigating improvements in ways to produce current petroleum-based fuels but also research into new methods for the synthesis of functionally equivalent alternative fuels obtained using resources and methods that are not in use today. The production of synthetic liquid fuels from carbonaceous materials such as waste organic materials is one way to solve these problems. The utilization of carbonaceous waste materials to produce synthetic fuels can be considered a feasible method of obtaining new resources for fuel production since the material feed stock is already considered a waste. without value and often it's disposal creates additional sources of environmental pollution.

SUMMARY OF THE INVENTION

The present invention makes use of steam pyrolysis, hydro-gasification and steam reformation to produce a synthesis gas that can be converted into a synthetic paraffinic fuel, preferably a diesel fuel, although synthetic gasolines and jet propulsion fuels can also be made, using a Fischer-Tropsch paraffin fuel synthesis reactor. Alternatively, the synthesis gas may be used in a co-generated power conversion and process heat system. The present invention provides comprehensive equilibrium thermo-chemical analyses for a general class of co-production processes for the synthesis of clean-burning liquid transportation fuels, thermal process energy and electric power generation from feeds of coal, or other carbonaceous materials, and liquid water. It enables a unique design, efficiency of operation and comprehensive analysis of coal, or any other carbonaceous feed materials to co-produced fuel, power and heat systems.

In one embodiment, the invention provides separate steam pyrolysis, hydro-gasification, and steam reformer reactors in a process for producing a synthesis gas for use as a gaseous fuel or as feed into a Fischer-Tropsch reactor to produce a liquid paraffinic fuel, recycled water and sensible heat, in a substantially self-sustaining process. A slurry of particles of carbonaceous material suspended in liquid water, and hydrogen from an internal source, are fed into a steam generator for pyrolysis and hydro-gasification reactor under conditions whereby super-heated steam, methane, carbon dioxide and carbon monoxide are generated and fed into a steam reformer under conditions whereby synthesis gas comprising primarily of hydrogen and carbon monoxide are generated. Using a hydrogen separation filter for purification, a portion of the hydrogen generated by the steam reformer is fed into the hydro-gasification reactor as the hydrogen from an internal source. The remaining synthesis gas generated by the steam reformer is either used as fuel for a gaseous fueled engine or gas turbine to produce electricity and process heat, or is fed into a Fischer-Tropsch fuel synthesis reactor under conditions to produce a liquid fuel, and recycled water. The correct stoichiometric ratio of hydrogen to carbon monoxide molecules fed into the Fischer-Tropsch fuel synthesis reactor, is controlled by the water to carbon ratio in the feed stocks. Molten salt loops are used to transfer heat from the exothermic hydro-gasification reactor (and from the exothermic Fischer-Tropsch reactor if liquid fuel is produced) to the endothermic steam generator for pyrolysis and the steam reformer reactor vessels.

In particular, this embodiment provides the following features.

1) A general purpose solid carbonaceous material feed system that can accept arbitrary combinations of coal, urban and agricultural biomass, and municipal solid waste for hydro-gasification.
2) A first stage, steam generator for pyrolysis and hydro-gasification unit.
3) A steam reformer as a second stage reactor to produce hydrogen rich synthesis gas from the output of the first stage steam generator for pyrolysis and hydro-gasification unit. The molal steam to carbon ratio is maintained as necessary to bring the chemical reactions close to equilibrium;
4) Either (a) a Fischer-Tropsch (synthesis gas-to-liquid) fuel synthesizer as a third and final stage reactor to convert the synthesis gas from the steam reformer into a sulfur-free clean-burning liquid transportation fuel, and recycled water or (b) use of generated synthesis gas as fuel for process heat and/or in a fuel engine or gas turbine that can generate electricity;
5) Three thermo-chemical process reactors are operated to produce nearly pure paraffinic hydrocarbon liquids (similar to petroleum derived diesel fuels) and wax-like compounds (similar to petroleum derived USP paraffinic jellies, which can be further refined into more diesel-like fuels using conventional methods) from carbonaceous feed stocks (such as waste wood) in a continuous self-sustainable fashion without the need for additional fuels or external energy sources. The reactor configurations can also be optimized for the production of other synthetic fuels, such as dimethyl ether (a fuel similar to propane, that can be used as a transportation fuel in diesel engines and gas turbines) and gaseous fuel grade hydrogen (a fuel that can be used in engines and turbines, and if purified to remove carbon monoxide, as an electrochemical fuel in a fuel cell), as well as energetic synthesis gases for combined cycle power conversion and electric power production.

In another embodiment, a process is provided for converting carbonaceous material to energetic gases by combining two separate processes, steam pyrolysis and hydro-gasification, into a single step. The process involves simultaneously heating carbonaceous material in the presence of both hydrogen and steam at a temperature and pressure sufficient to generate methane and carbon monoxide rich producer gases. The process can be carried out on biomass, municipal waste, wood, synthetic and natural polymers such as plastics and rubbers, and other carbonaceous materials.

One of the advantages of combining steam pyrolysis and hydro-gasification into a single step is the production of hydrocarbon gases from carbonaceous material at rates much greater than the rates achievable by hydro-gasification alone. Another advantage is the use of more compact hydro-gasification reactors, with shorter residence times, than systems without steam pyrolysis.

The fundamental advantages of this invention, over what was achievable with the prior art, are: (a) energy efficient (>85%) methane production from the available carbon in the carbonaceous feed stock using steam pyrolysis to activate the carbon and hydrogen gas as the sole initiating reactant, in contradistinction to partial oxidative gasification usually requiring an additional energy intensive air separation system to provide the necessary oxygen; (b) chemically self-sustained operation of the first stage hydro-gasification reactor by feeding-back surplus hydrogen gas produced in the second stage methane steam reformer reactor; (c) energy efficient synthesis of clean-burning transportation fuels using the effluent gases from the steam reformer, such as: (i) paraffinic compounds using a third stage Fischer-Tropsch fuel synthesis reactor, (ii) dimethyl ether synthesis using a third stage synthesis reactor, and (iii) hydrogen production using a hydrogen separation and/or purification filter without the need for a third stage fuel synthesis reactor; (d) thermally self-sustained operation of all reactors by effective management of thermal and chemical energy using combinations of molten salt or water/steam heat transfer fluids, combustion of product energetic gases to start and maintain process temperatures, recovered process heat for the generation of electric power, without the need for additional fuels and external energy sources; (e) significantly reduced airborne emissions from all enclosed processes reactors and/or synthesis gas combustors when compared to direct naturally aspirated combustion (usually known as open incineration) of the carbonaceous feed materials; and f) the ability to capture all gaseous carbon dioxide effluent from process reactors or intra-process synthesis gas combustors for sequestration and/or chemical conversion into condensed phase compounds using conventional technologies.

These novel configurations of the process reactors have the capability to improve the overall efficiency of energy utilization for carbonaceous material conversion in a co-production plant for synthetic fuels, chemicals and energy.

DETAILED DESCRIPTION OF THE INVENTION

Figure 1:
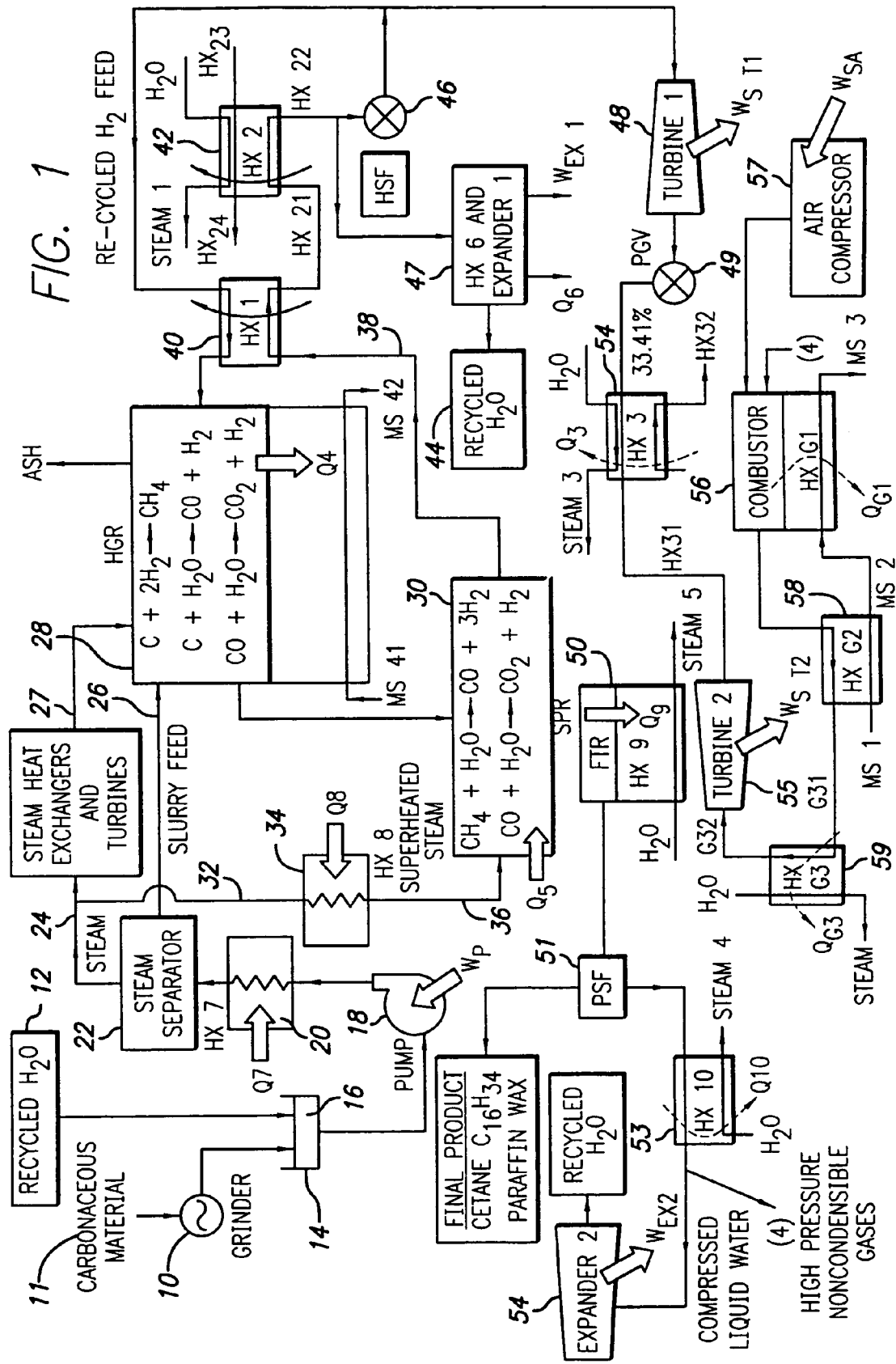
FIG. 1 is a flow diagram showing the overall modeling of one embodiment of the present invention.

In one embodiment of the invention, a steam generator for pyrolysis, hydro-gasification reactor (HGR) and steam pyrolytic reformer (SPR) (also called a steam pyrolytic reactor, steam reformer or steam reactor) such as used in a Hynol process, may be utilized to produce the synthesis gas (syngas) through steam pyrolysis of the feed stock, hydro-gasification and steam reforming reactions. The reactions start in the HGR to convert carbon in the carbonaceous matter into a methane rich producer gas and continue through the SPR to produce synthesis gas with the correct hydrogen and carbon monoxide stoichiometry for efficient operation of the Fischer-Tropsch process. With the Fischer-Tropsch process as the final step in processing, products such as synthetic gasoline, synthetic diesel fuel and recycled water can be produced.

The feedstock requirement is highly flexible. Many feeds that consist of different carbonaceous materials can be wet milled to form a water slurry that can be fed at high pressure into a steam pyrolyzer, hydro-gasifier and steam reformer reactors for synthesis gas production. The feed to water mass ratio can even vary during the running of the process, with a knowledge of the chemical content of the feed, to maintain the carbon-hydrogen stiochiometry required for an optimized fuel synthesis process. Appropriate carbonaceous materials include biomass, natural gas, oil, petroleum coke, coal, petrochemical and refinery by-products and wastes, plastics, tires, sewage sludge and other organic wastes. For example, wood is an example of waste biomass material that is readily available in Riverside County, Calif. This particular waste stream could be augmented with other carbonaceous materials, such as green waste and biosolids from water treatment that are available in Riverside County, and would otherwise go to landfill.

When used to make a transportation fuel, such as diesel fuel, the process is designed so that the feedstock makes the maximum amount of Fischer-Tropsch paraffinic product required. The desired output consists of a liquid hydrocarbon, such as cetane, $C_{16}H_{34}$, within the carbon number range, 12 to 20, suitable as a diesel fuel. Excess synthesis gas output from the SPR, i.e., "leftover" chemical energy from the Fischer Tropsch synthetic fuel producing process, can be used as an energetic fuel to run a gas turbine for electricity production. The synthesis gas output after recycling enough hydrogen to sustain the hydro-gasifier, may be used for this purpose also, depending on the needs of the user. The following provides a method for maximizing the economic potential from the present invention in the conversion of carbonaceous materials to a usable transportation fuels and inclusive of the possibility for direct electric power production through a gas turbine combined cycle.

1) Find approximate data on available carbonaceous wastes, their chemical composition and perform further analysis on the practical need for the process.
2) Model the important reactions within the process consisting of the steam generator for pyrolysis, hydro-gasifier, steam reformer, and the Fischer-Tropsch (or other fuel synthesis) reactor on a continuous flow-through basis. This may be done by optimizing the Fischer-Tropsch (or other fuel synthesizer) feedstock for the optimum stoichiometric hydrogen to carbon monoxide mole ratio for fuel to be synthesized.
3) Perform an economic analysis on the costs to obtain and prepare the input material required, capital costs, operating and maintenance, and product yield and costs.

Specific implementations are given below in conjunction with flow charts provided in the Figures, demonstrating the conversion of waste wood, as the candidate carbonaceous material, to a liquid diesel transportation fuel, recycled water and an alternative power source, via a Fischer-Tropsch process linked to a gas turbine combined cycle.

The thermo-chemical conversion of carbonaceous materials occurs by two main processes: hydro-gasification and steam reformation, with steam pyrolysis of the feedstock occurring within the steam generator to pre-treat feedstock and activate the carbon contained therein. The hydro-gasifier requires an input of the pyrolyzed carbonaceous waste, hydrogen, steam, reacting in a vessel at high temperature and pressure, which in a specific implementation is approximately 30 atmospheres and 1000 degrees Celsius. Steam reforming of the methane rich effluent gas from the HGR also requires an approximate pressure of 30 atmospheres and 1000 degrees Celsius. More generally, each process can be conducted over a temperature range of about 700 to 1200 degrees Celsius and a pressure of about 20 to 50 atmospheres. Lower temperatures and pressures can produce useful reaction rates with the use of appropriate reaction catalysts or steam pyrolysis processes. When combining steam pyrolysis and hydrogasification in a common reactor vessel, the inventors have found that adequate reaction kinetics can be achieved at temperatures up to 750 degrees Celsius.

Referring to FIG. 1, which is an overall flow diagram, the order of general processes that carry out these main reaction processes is shown (specific amounts for a particular embodiment are in the flow diagrams shown in FIGS. 14 through 38). Piping is used to convey the materials through the process. The feed 11 is chopped, milled or ground in a grinder 10 into small particles, mixed with the recycled water 12 and placed in a receptacle or tank 14 as a liquid, suspension slurry 16 that is transportable as a compressed fluid by a pump 18 to a steam generator 20 where the slurry 16 is superheated and pyrolyzed, followed by either separation of the steam in a steam separator 22 so that steam goes through piping 24 that is separate from piping that delivers the pumped, dense slurry paste 26, or a direct steam pyrolysis feed through piping 27.

The dense slurry paste feed 26, or the direct steam pyrolysis feed 27, enters the HGR 28. Hydrogen from an internal source (from the steam reformer via a hydrogen separation filter described below) and a fraction of the previously produced steam flow into the HGR 28 for the desired output. The output gases consists largely of methane, hydrogen, carbon monoxide, and super-heated steam. The gases produced by the HGR 28 leaves the chamber and is pumped over to the SPR 30. The un-reacted residue (or ash) from the HGR, is periodically removed from the bottom of the reactor vessel using a double buffered lock-hopper arrangement, that is commonly used in comparable high pressure gasification systems. The ash is expected to be comprised of sand, $SiO_2$, and alumina, $Al_2O_3$, with trace amounts of metals. The input to the SPR 30 is delivered from either the steam separator 22 by piping 32 through a heater 34 and further piping 36, or via the HGR 28 output piping, to provide greater-than-theoretical steam to carbon ratio into the SPR 30, to mitigate coking in the reactor. The output is a higher amount of hydrogen, and CO, with the appropriate stiochiometry for the desired hydrocarbon fuel synthesis process described below.

The output of the SPR 30 is directed via piping 38 through heat exchangers 40 and 42. Condensed water 44 is separated and removed from the SPR output, via a heat exchanger and liquid water expander 47. The non-condensable gaseous output of SPR 30 is then conveyed to a hydrogen separation filter 46. A portion of the hydrogen from the SPR output, about one-half in this embodiment, is carried from the filter 46, passed through the heat exchanger 40 with a resultant rise in its temperature (in the embodiment from 220 degrees centigrade to 970 degrees Centigrade) and delivered to the HGR 28 as its hydrogen input. The hot effluent from the SPR output is cooled by passing through heat exchangers 40 and 42, used to heat the recycled hydrogen, and make steam respectively. The condensed water 44 leaving the heat exchanger 47 is recycled back to make the water supply 12 for the slurry feed. By such means, a self-sustaining process is obtained.

The fuel synthesis gas is then used for one of two options. Based on the calorific value, the synthesis gas may go through a gas turbine combined cycle for direct energy production or through a fuel synthesis reactor (in this embodiment, a Fischer-Tropsch process to produce a clean diesel fuel and recycled water). In accordance with a specific embodiment of the invention, the synthesis gas is directed through an expansion turbine 48, to recover mechanical energy by lowering the pressure of the gaseous feed into the Fischer-Tropsch reactor 50. The mechanical power produced by the liquid state turbine, the Brayton and Rankine cycle turbines can be used to provide power for internal slurry, water feed pumps, air compressor, with the surplus exported via electricity generation, see Tables 1 through 7.

Efficiency may be maximized by adjusting input and process parameters. The biomass/coal varying-mixture feed is synthesized into a slurry by adding water whereby after steam separation the carbon to hydrogen ratio will be appropriate for the process. A slurry feed needs enough water to run the hydro-gasifier, the steam reformer, and to keep the feed in a viable slurry after steam separation. Prior art attempts at biomass conversion using solid dry feed had many mechanical problems of feeding a solid into the high pressure, and high temperature HGR reaction chamber. This method of slurry feed has already been demonstrated and studied, according to the results for the "Hydrothermal Treatment of Municipal Solid Waste to Form High Solids Slurries in a Pilot Scale System", by C. B. Thorsness et al., UCRL-ID 119685, published by Lawrence Livermore Nation Laboratory, Livermore, Calif. in 1995. In addition, there is related art published on the making and operating of coal water slurry feeds. For example, see Z. Aktas et al., Fuel Processing Technology 62 2000 1-15. The principle reactions of the two main processes, hydro-gasification and steam reforming, are shown here. The HGR independent reactions can be expressed as:

$$C + 2H_2 \rightarrow CH_4 \tag{1}$$

$$C + 2H_2O \rightarrow CO + H_2 \tag{2}$$

$$CO_2 + H_2 \rightarrow CO + H_2O \tag{3}$$

Reactions 2 and 3 are endothermic. Reaction 1 is sufficiently exothermic to provide the heat of reaction for reactions 2 and 3. Some preheating of the HGR will be needed to bring the reactor up to its operating temperature. Thus, the HGR is intended to be self-sustaining once the reactions have started and achieve steady state.

The main purpose of the HGR process is to maximize the carbon conversion from the feed stock into the energetic gases $CH_4$ and CO. After this process, hydrogen is produced by reacting superheated steam with $CH_4$ and CO within the SPR. In the SPR, half the hydrogen is obtained from the superheated steam and the remainder from the $CH_4$. The principle reactions in the SPR are considered to be:

$$CH_4 + H_2O \rightarrow CO + 3H_2 \tag{4}$$

$$CO_2 + H_2 \rightarrow CO + H_2O \rightarrow CO_2 + H_2 \tag{5}$$

The steam reforming reactions (4 and 5) are often run with steam concentrations higher than required for the stiochiometry shown above. This is done to avoid coke formation and to improve conversion efficiency. The required steam concentration is usually specified in the form of the steam-to-carbon mole ratio (S:C), the ratio of water steam molecules per carbon atom in the HGR feed. The preferred (S:C) ratio for the SPR operation is greater than 3. This steam rich condition favors the water-gas shift reaction. This reaction is only slightly exothermic ($\Delta H° = -41$ kJ/mole CO); however, it produces additional hydrogen gas and converts carbon monoxide into carbon dioxide. Unfortunately, an additional unwanted secondary reaction can occur, the methanation reaction, which consumes hydrogen:

$$CO + 3 H_2 \rightarrow CH_4 + H_2O \tag{6}$$

The resulting effluent after the two main reactors is a synthesis of gases rich in hydrogen, carbon monoxide, and steam. Approximately half the hydrogen produced in the SPR is recycled back to the HGR. Consequently, no outside source of hydrogen is needed to maintain steady state operation. The HGR and SPR processes, therefore, may be considered to be chemically self-sustaining. The remaining synthesis gas is then available for the production of fuels and process heat.

The present invention using the Fischer-Tropsch process can produce a zero-sulfur, ultrahigh cetane value diesel-like fuel and valuable paraffin wax products. The absence of sulfur enables low pollutant and particle emitting diesel fuels to be realized.

The present invention also provides a source of by-products. One useful by-product is purified water, which can be re-cycled to create the slurry feed into the process. In a report by Rentech titled "Fischer-Tropsch technology" dated 1998 (see Rentech web publications at rentechinc.com), Rentech states that the Fischer-Tropsch process with an iron catalyst makes about 7/10ths of a barrel of water per barrel of Fischer-Tropsch products. A cobalt catalyzed Fischer-Tropsch process makes about 1.1 to 1.3 barrels of water for each barrel of Fischer-Tropsch products, a greater amount than iron. Part of the water may be recycled to make steam in the steam reformer unit and for cooling in both the synthesis gas and Fischer-Tropsch step of the overall process.

The Fischer-Tropsch reactions also produce tail gas that contains hydrogen, CO, $CO_2$, and some light hydrocarbon gases. Hydrogen can be stripped out of the tail gas and recycled either to the HGR or the Fischer-Tropsch reactor. Any small amounts of other gases such as CO and CO2 may be flared off.

Two main products of Fischer-Tropsch may be characterized as synthetic oil and petroleum wax. According to Rentech, in the above report for their particular implementation of the Fischer-Tropsch process, the mix of solid wax to liquid ratio is about 50/50. Fischer-Tropsch products are totally free of sulfur, nitrogen, nickel, vanadium, asphaltenes, and aromatics that are typically found in crude oil. The products are almost exclusively paraffins and olefins with very few, or no, complex cyclic hydrocarbons or oxygenates that would otherwise require further separation and/or processing in order to be usable end-products. The absence of sulfur, nitrogen, and aromatics substantially reduces harmful emissions.

California's Air Resources Board (CARB) specifications for diesel fuel require a minimum cetane value of 48 and reduced sulfur content. The above Rentech study with Shell diesel fuel produced from a Fischer-Tropsch process has a cetane value of 76. The CARB standard for sulfur in diesel fuel placed in the vehicle tank is 500 ppm by weight, and Shell's Fischer-Tropsch process diesel fuel has no detectable amount in the ppm range. The CARB standard for aromatic content is no more than 10% by volume (20% for small refineries). The Shell Fischer-Tropsch process diesel fuel had no detectable aromatics.

Rentech further affirmed through studies that the diesel fuel may need no further processing because of the purity and olefin products that may even be advantageous over crude oil diesel. The Fischer-Tropsch diesel process is clean and the product is cleaner, has a higher cetane value, and most likely does not need further processing, when compared to a crude oil diesel.

A gas turbine combined cycle for electric power production is an option. If the Fischer-Tropsch product is unexpectedly too costly, the use of the synthesis gas heating value can be a viable option, based on an overall efficiency of 65% of the synthesis gas energy converting to electric energy. This number is reasonable since the synthesis gas starts at a high temperature as opposed to taking natural gas in from a pipeline.

Process modeling can be used to reasonably produce a synthesis gas maximized for a yield high in CO and stoichiometric hydrogen. First, the unit operation reactions of the hydro-gasifier, steam reformer, and Fischer-Tropsch reactors are modeled. This may be accomplished by using Stanjan, a DOS-based computer program that uses equilibrium modeling. By varying the parameters of temperature, pressure, original feedstock and gas flows, a parameterization study was carried out based on costs and output benefit. The hydro-gasifier variables were modified for the maximum practical carbon conversion efficiency. The steam reformer variables were modified for maximum practical CO output, enough hydrogen for recycling output, and minimum $CO_2$ production. The study looked at the various parameters whereby two different values varied for one constant, resulting in 3-D parameterization studies. The following discusses the results from the computer modeling of the main reactions using Stanjan programming.

Figure 2:
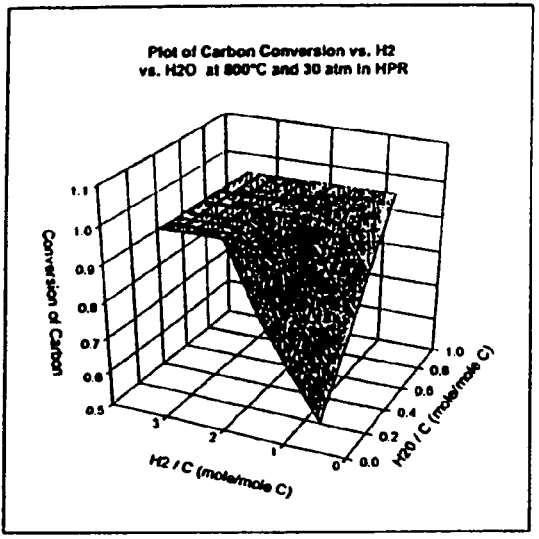
FIG. 2 is a graph showing a plot of carbon conversion vs. $H_2/C$ and $H_2O/C$ ratios at 800° C. and 30 atm. in HPR.
Figure 3:
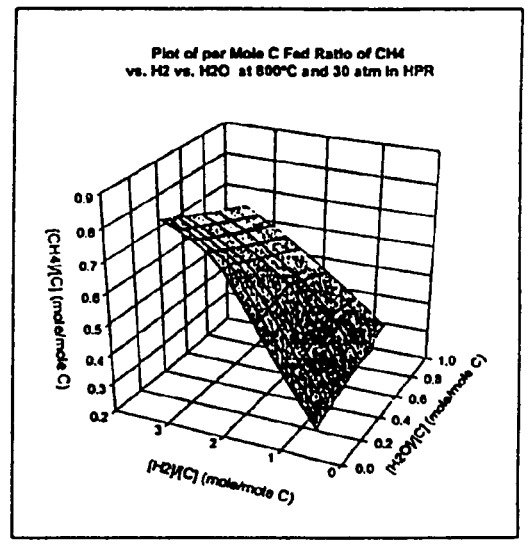
FIG. 3 is a graph showing a plot of $CH_4/C$ feed ratio vs. $H_2/C$ and $H_2O/C$ ratios at 800° C. and 30 atm. in HPR.
Figure 4:
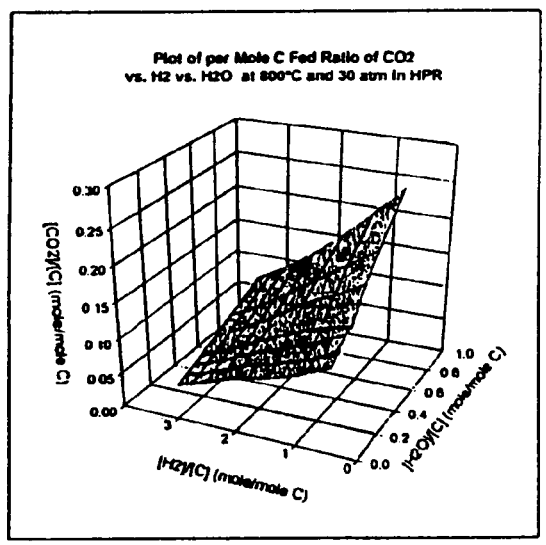
FIG. 4 is a graph showing a plot of $CO_2/C$ feed ratio vs. $H_2/C$ and $H_2O/C$ ratio sat 800° C. and 30 atm. in HPR.
Figure 5:
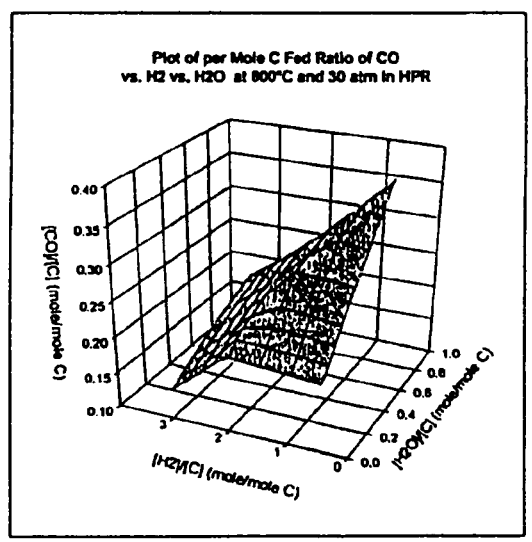
FIG. 5 is a graph showing a plot of CO/C feed ratio vs. $H_2/C$ and $H_2O/C$ ratios at 800° C. and 30 atm. in HPR.
Figure 6:
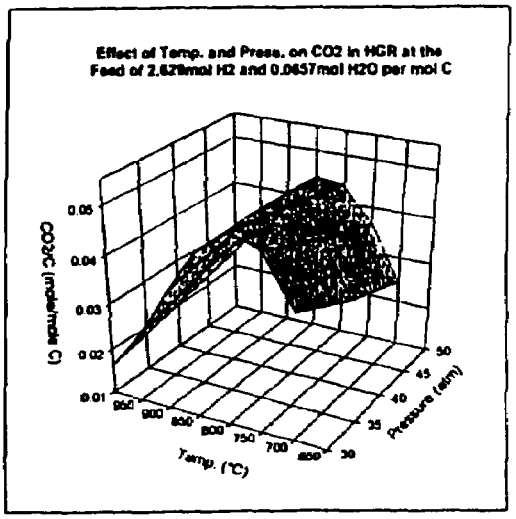
FIG. 6 is a graph showing the effects of Temperature and Pressure conditions on $CO_2/H$ ration the hydro-gasifier reactor (HGR) at fixed feed of 2.629 moles of $H_2$ and 0.0657 moles of $H_2O$ per mole of C.
Figure 7:
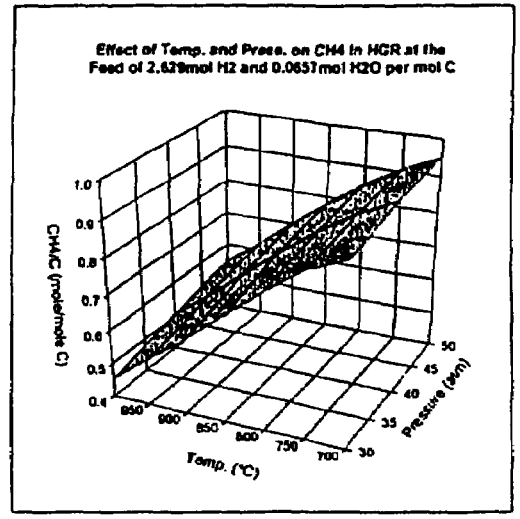
FIG. 7 is a graph showing the effect of Temperature and Pressure conditions on $CH_4/H$ ratio in the HGR at fixed feed of 2.629 moles of $H_2$ and 0.0657 moles of $H_2O$ per mole of C.
Figure 8:
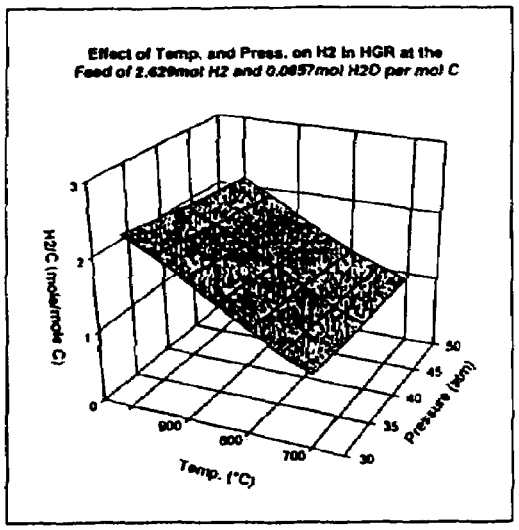
FIG. 8 is a graph showing the effect of Temperature and Pressure conditions on $H_2/C$ ratio in the HGR at fixed feed of 2.629 moles of $H_2$ and 0.0657 moles of $H_2O$ per mole of C.
Figure 9:
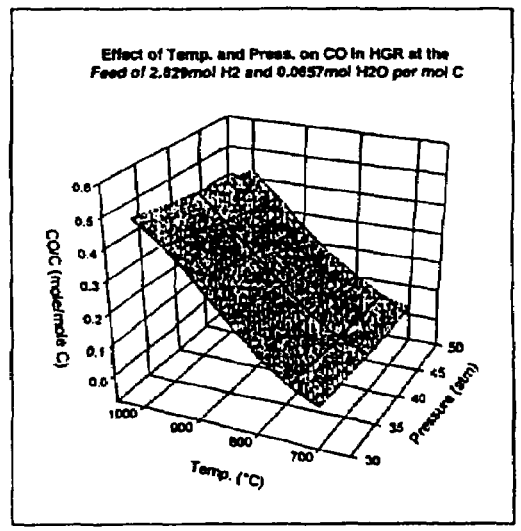
FIG. 9 is a graph showing the effect of Temperature and Pressure conditions on CO/H in the HGR at fixed feed of 2.629 moles of $H_2$ and 0.0657moles of $H_2O$ per mole of C.

Referring to FIG. 2, the effect of varying the water or steam and hydrogen ratios on the conversion efficiency of carbon in feedstock in the HGR is shown at 800° C. and 30 atm. As the hydrogen and water input to the HGR increases, the conversion efficiency of carbon in feedstock increases until it reaches 100%. The condition that falls in the area of 100% conversion efficiency achieves one of the modeling objectives, and these conditions were used. In order to avoid the cost of recycling of $H_2$, the minimum amount of $H_2$ recycled to the HGR must be chosen. FIG. 3 shows the effect of $H_2$ and $H_2O$ on $CH_4$ in the HGR at 800° C. and 30 atm. FIG. 4 shows the effect of $H_2$ and $H_2O$ on $CO_2$ in the HGR at 800° C. and 30 atm. At a high amount of $H_2$ and low amount of $H_2O$ input, the amount of $CO_2$ is low. Although the objective is to minimize the amount of $CO_2$ in the synthesis gas, it is not necessary to minimize $CO_2$ in the HGR because $CO_2$ is gauged in the SPR reactions through the water-gas-shift reaction to obtain a proper ratio of $H_2$ and CO for a maximum Fischer-Tropsch diesel fraction. FIG. 5 shows the effect of $H_2$ and $H_2O$ on CO in the HGR at 800° C. and 30 atm.

FIGS. 6, 7, 8 and 9 show the effects of varying temperature and pressure on the chemical composition of the effluent gases from the HGR at feed of 2.76 mol $H_2$ and 0.066 mol $H_2O$ per mole C in the feed stock. At these conditions of $H_2$ and $H_2O$ input to the HGR, the carbon conversion efficiency is estimated to close to 100% in a temperature range of 800 to 1000°C. and a pressure range of 30 atm. to 50 atm, for equilibrium chemistry.

Figure 10:
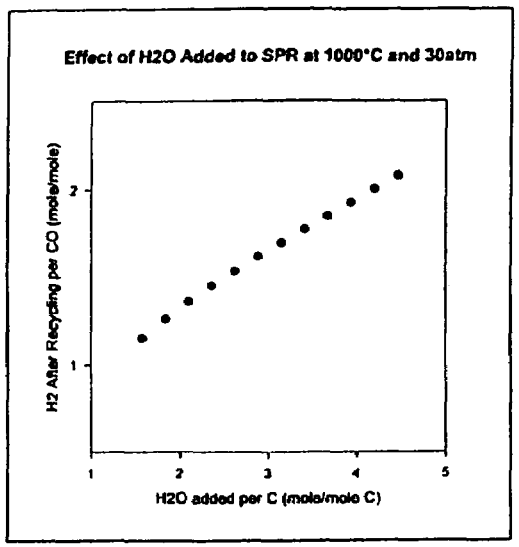
FIG. 10 is a graph showing the effect of input $H_2O/C$ ratio on steam reformer (SPR) performance measure by the net $H_2/CO$ ratio after H2 recycling for the HGR at 1000° C. and 30 atm.
Figure 11:
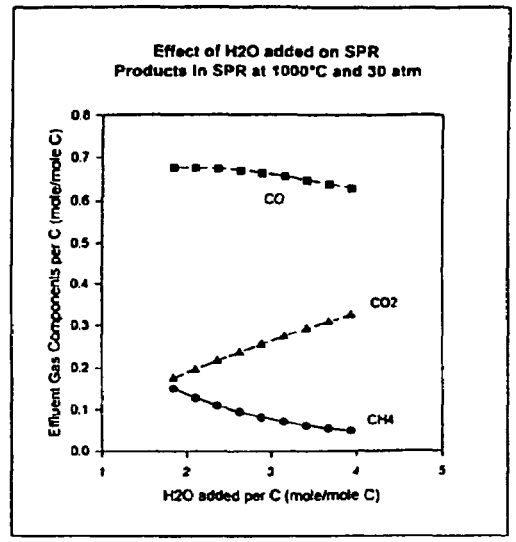
FIG. 11 is a graph showing the effect of changing the input $H_2O/C$ ratio on SPR products, CO, $CO_2$ and $CH_4$ in the SPR at 1000° C. and 30 atm.
Figure 12:
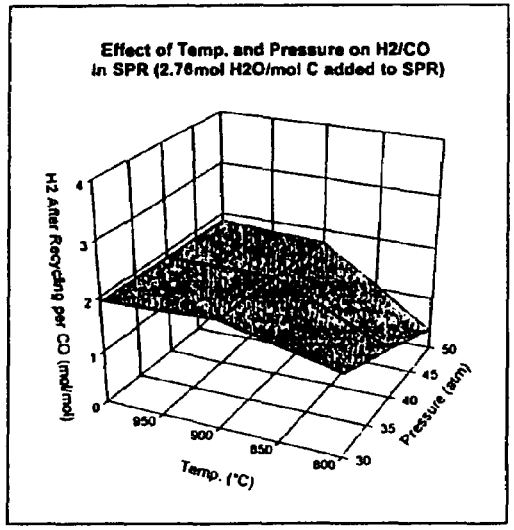
FIG. 12 is a graph showing the effect of Temperature and Pressure conditions on $H_2/CO$ ratio in the SPR (2.76 moles of $H_2O$/mole of C added to the SPR)
Figure 13:
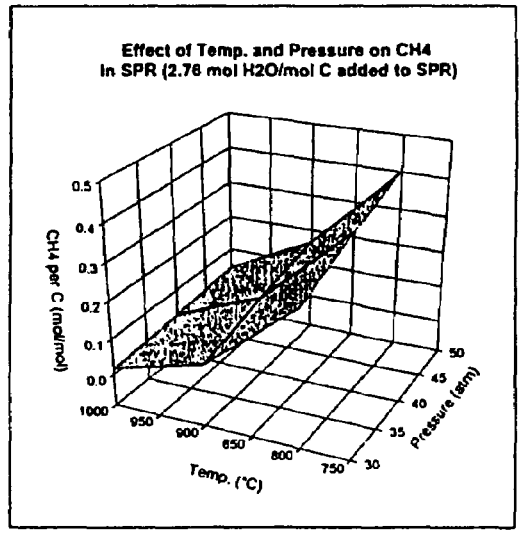
FIG. 13 is a graph showing the effect of Temperature and Pressure conditions on $CH_4/C$ ratio in the SPR (2.76 moles of $H_2O$/mole of C added to the SPR)
Figure 14:
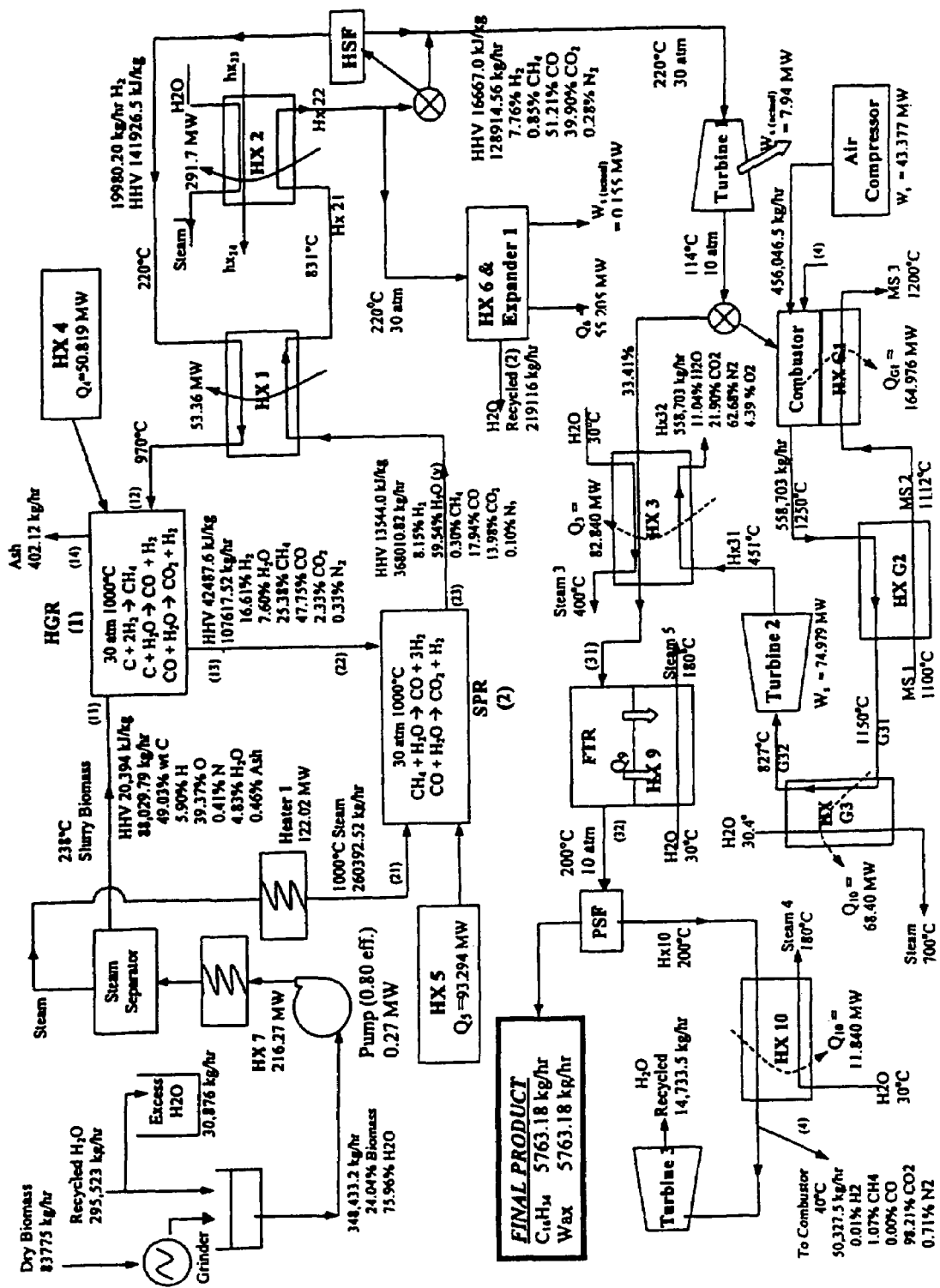
FIG. 14 is a diagram showing the Mass Flow Schematic of Biomass Hydro-gasification for production of Fischer-Tropsch paraffin fuels.
Figure 15:
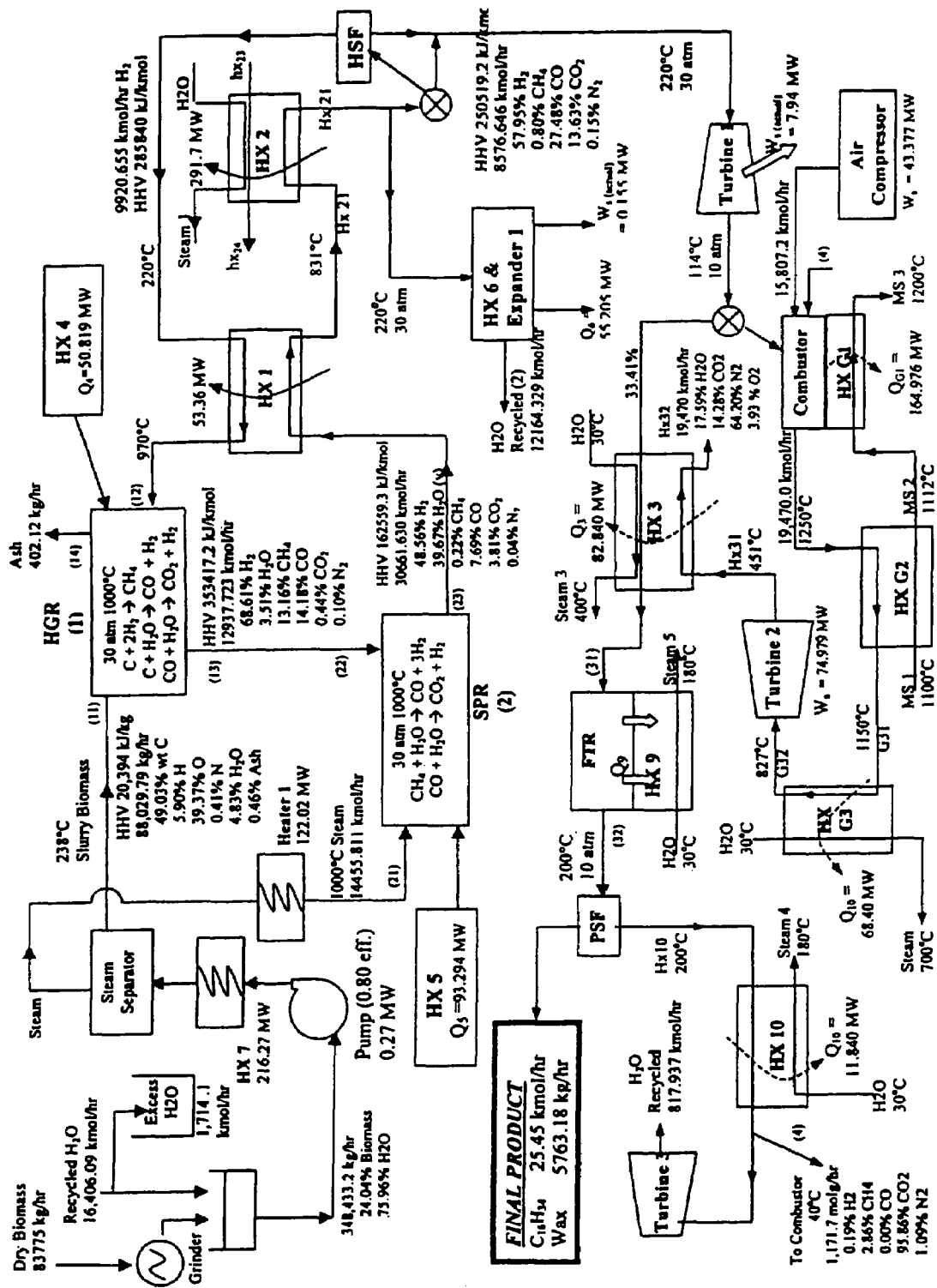
FIG. 15 is a diagram showing the Molal Flow Schematic of Biomass Hydro-gasification for production of Fischer-Tropsch paraffin fuels.
Figure 16:
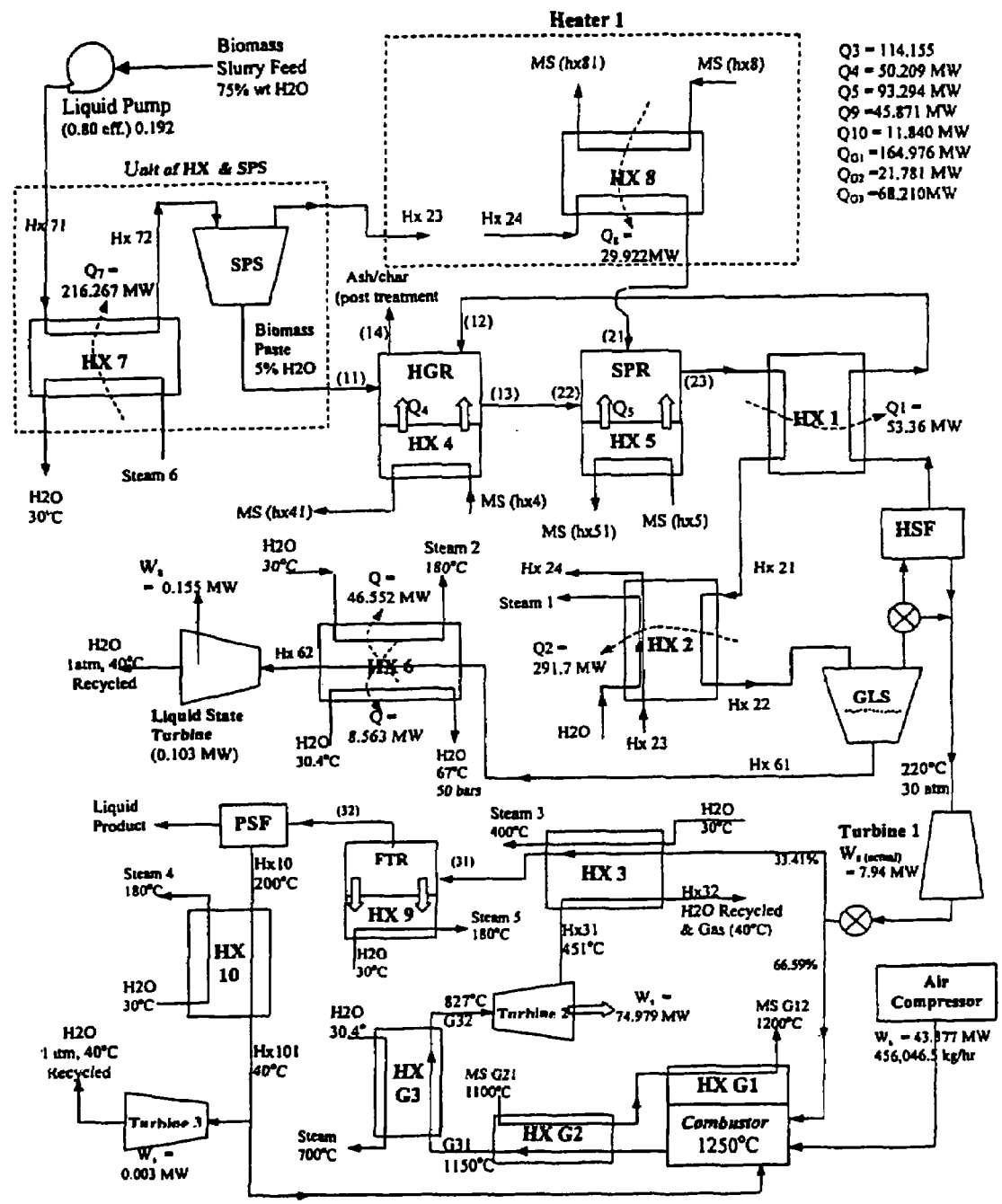
FIG. 16 is a diagram showing the Thermal Energy Management Schematic of Biomass Hydro-gasification for production of Fischer-Tropsch paraffin fuels.
Figure 17:
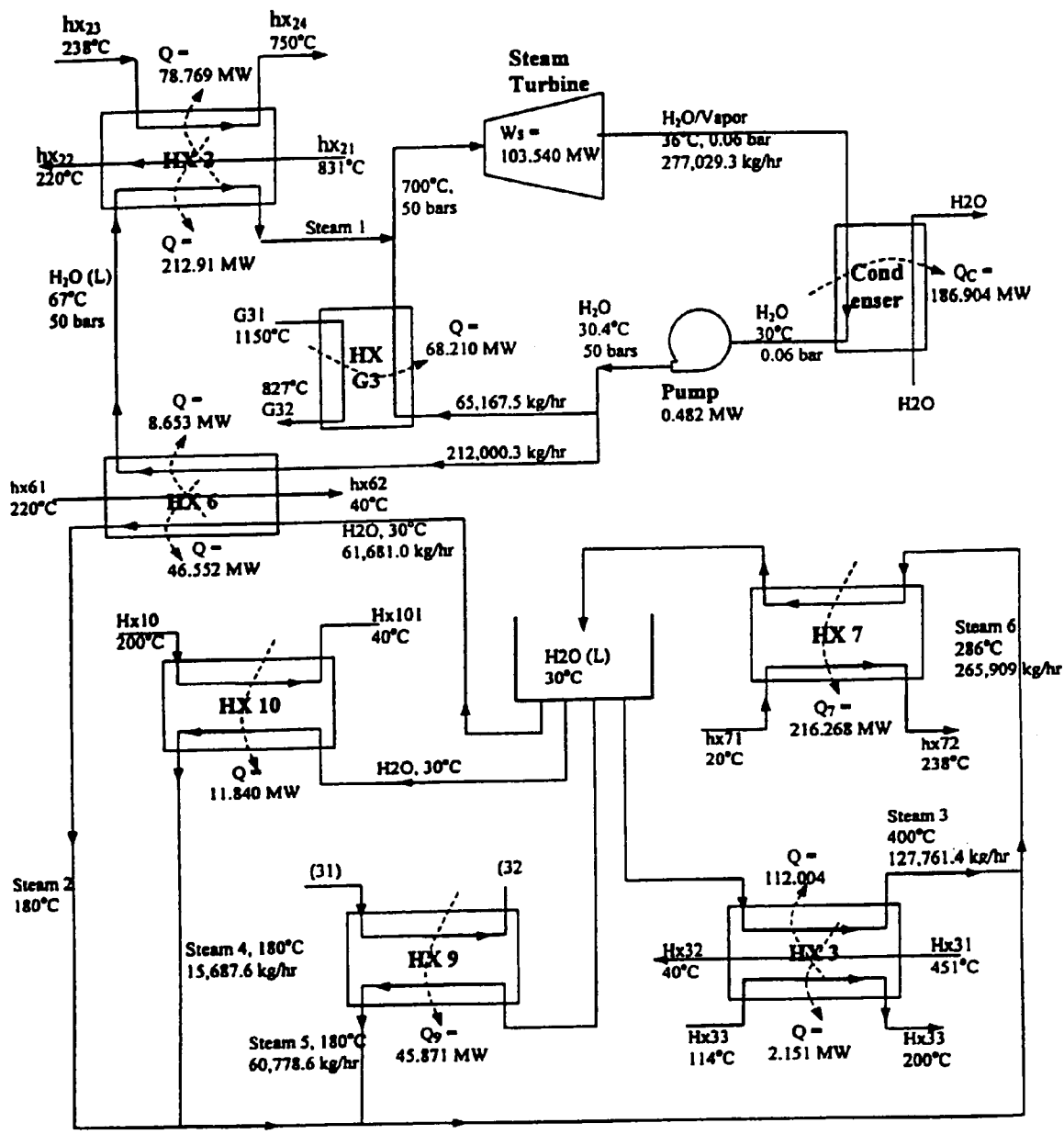
FIG. 17 is a diagram showing the Water/Steam Flow Schematic of Biomass Hydro-gasification for production of Fischer-Tropsch paraffin fuels.
Figure 18:
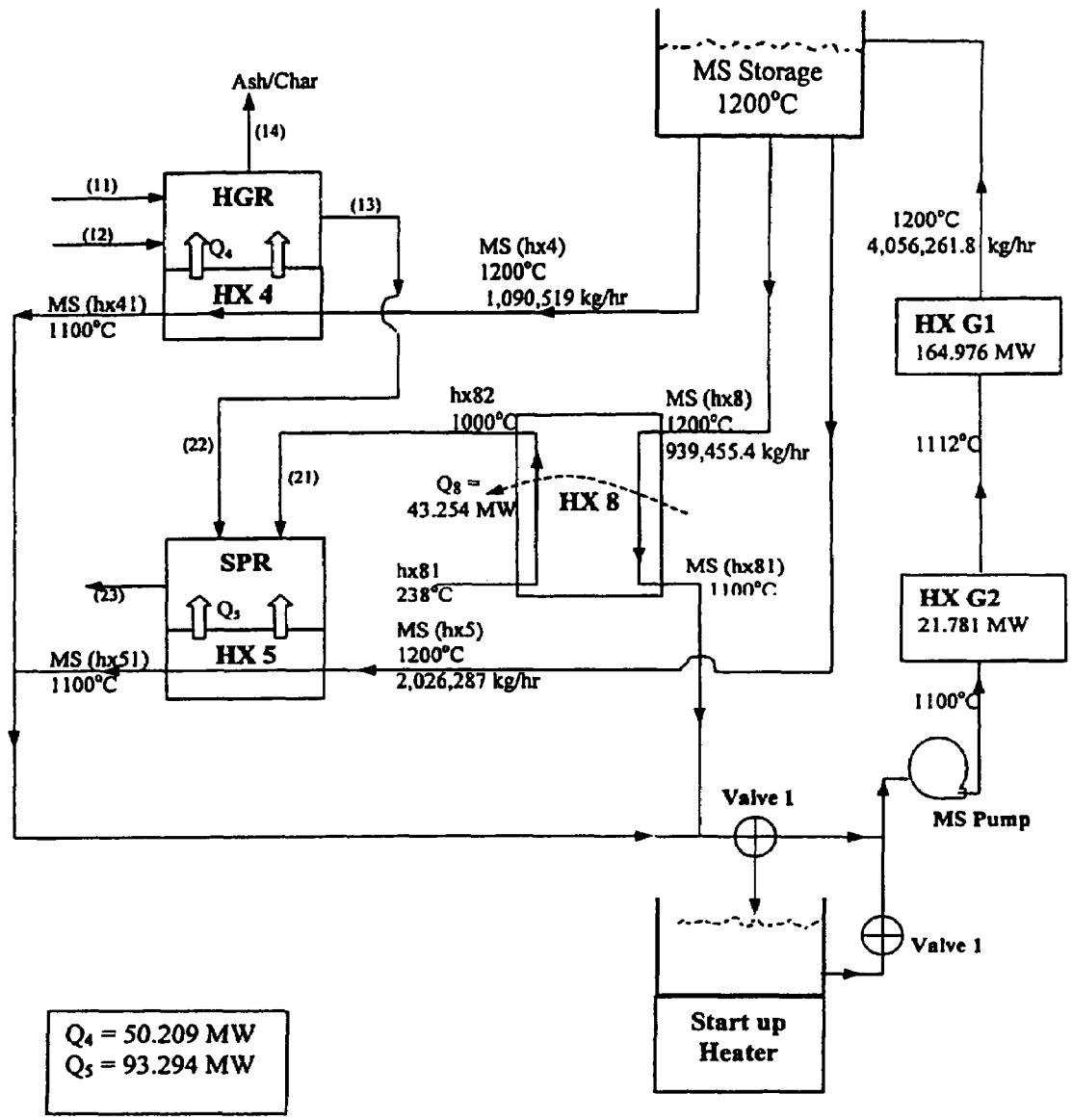
FIG. 18 is a diagram showing Molten Salt Flow Schematic of Biomass Hydro-gasification for production of Fischer-Tropsch paraffin fuels.
Figure 19:
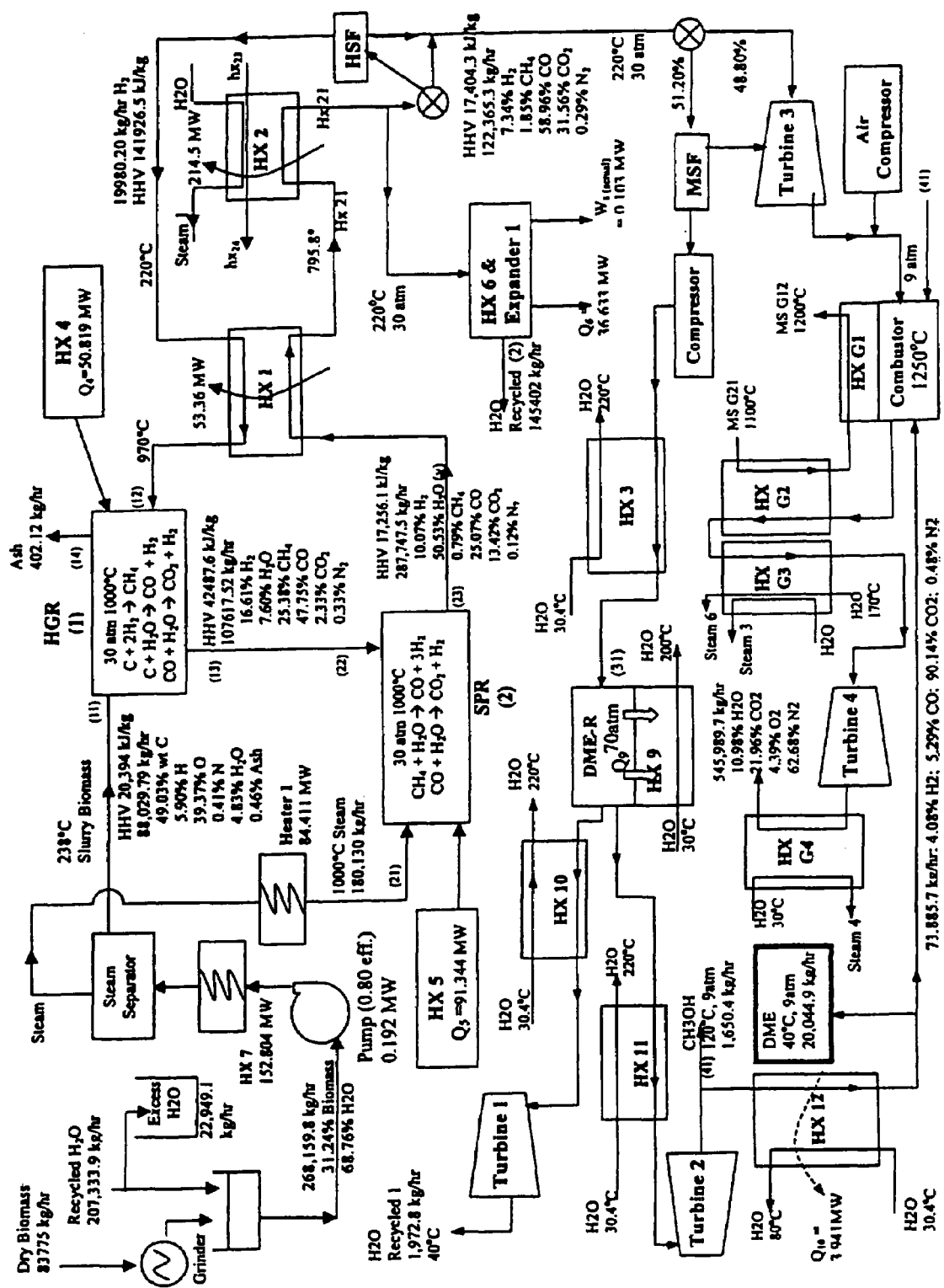
FIG. 19 is a diagram showing Mass Flow Schematic of Biomass Hydro-gasification for production of dimethyl ether.
Figure 20:
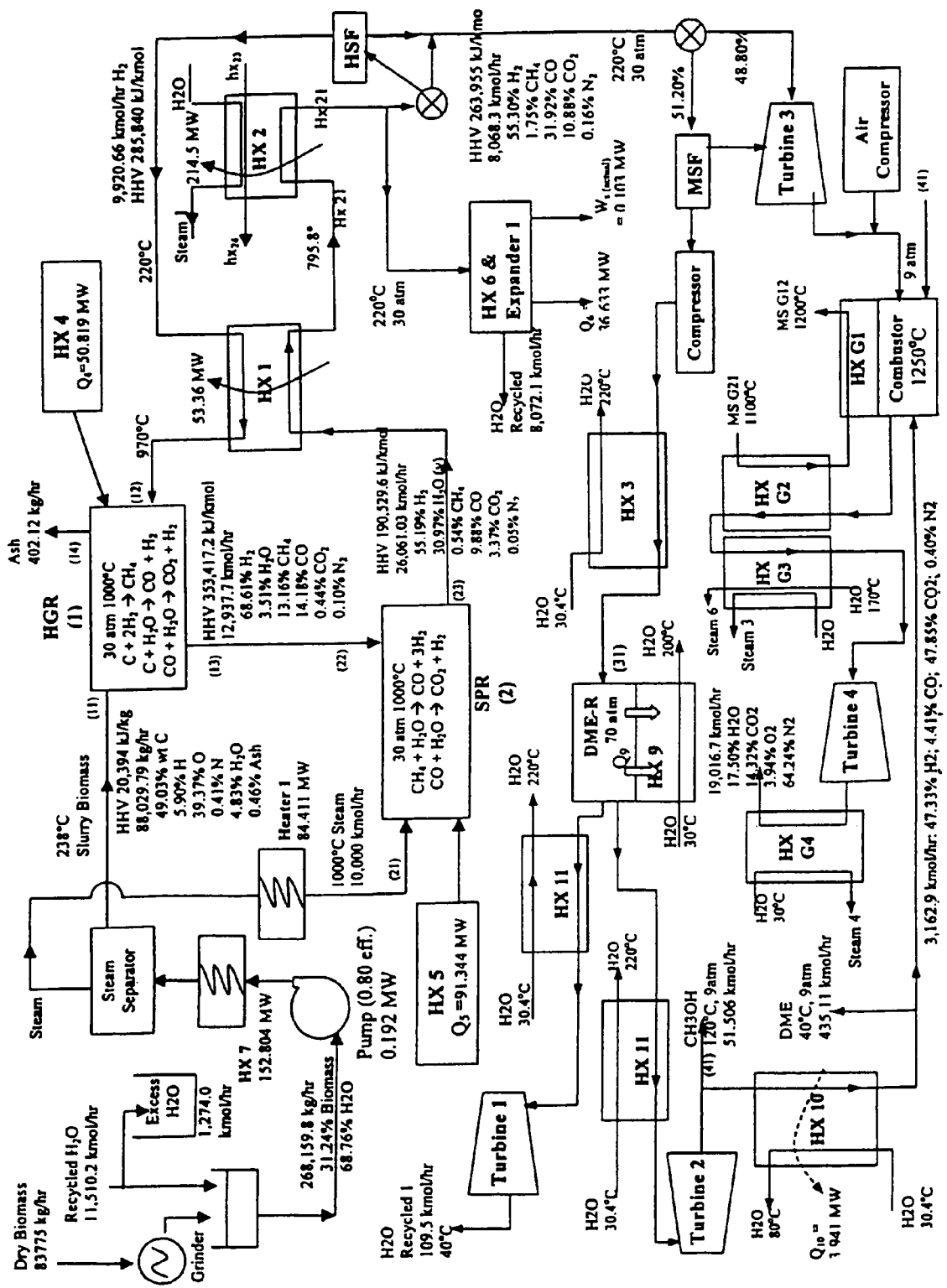
FIG. 20 is a diagram showing Mole Flow Schematic of Biomass Hydro-gasification for production of dimethyl ether.
Figure 21:
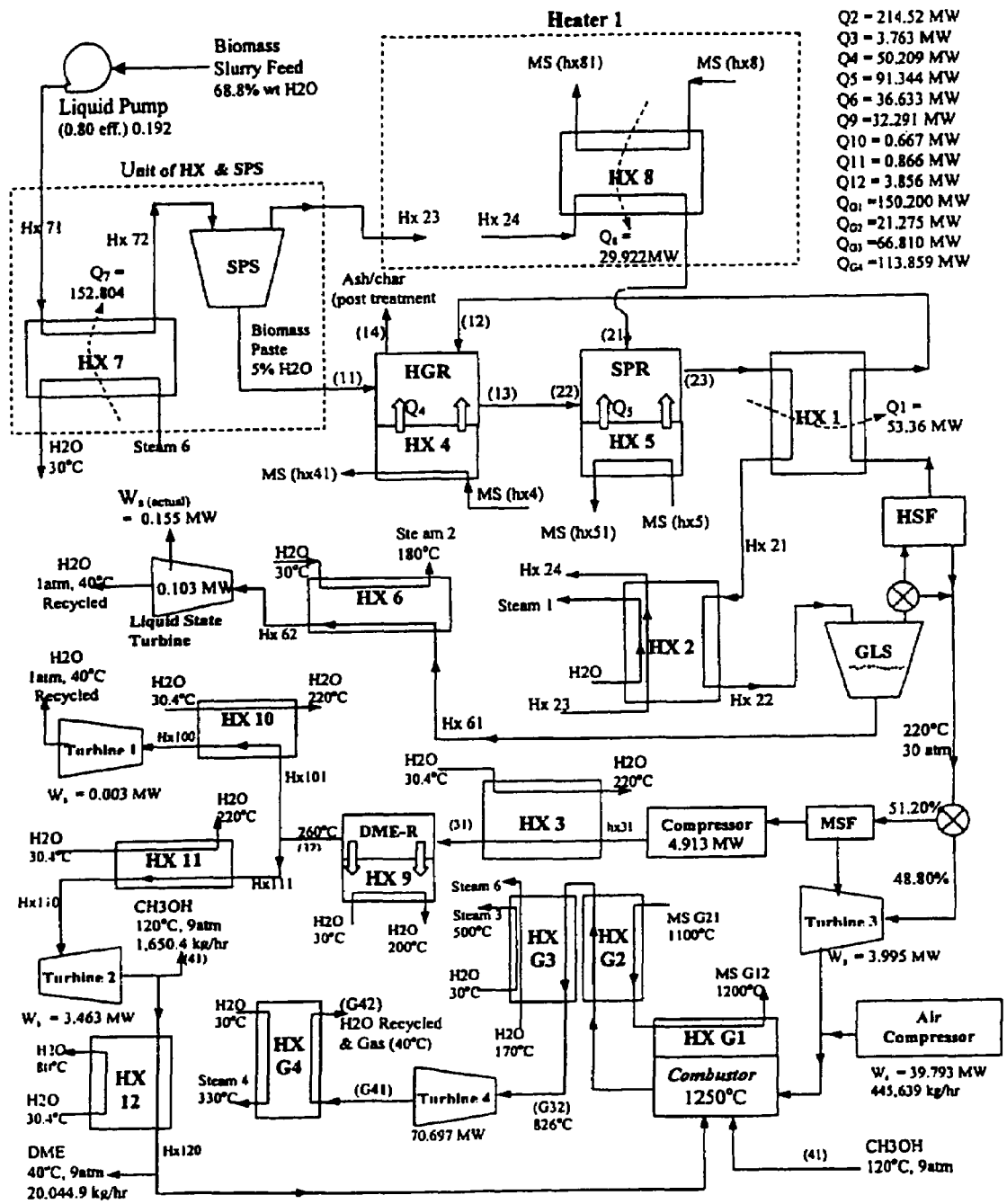
FIG. 21 is a diagram showing Thermal Energy Management Schematic of Biomass Hydro-gasification for production of dimethyl ether.
Figure 22:
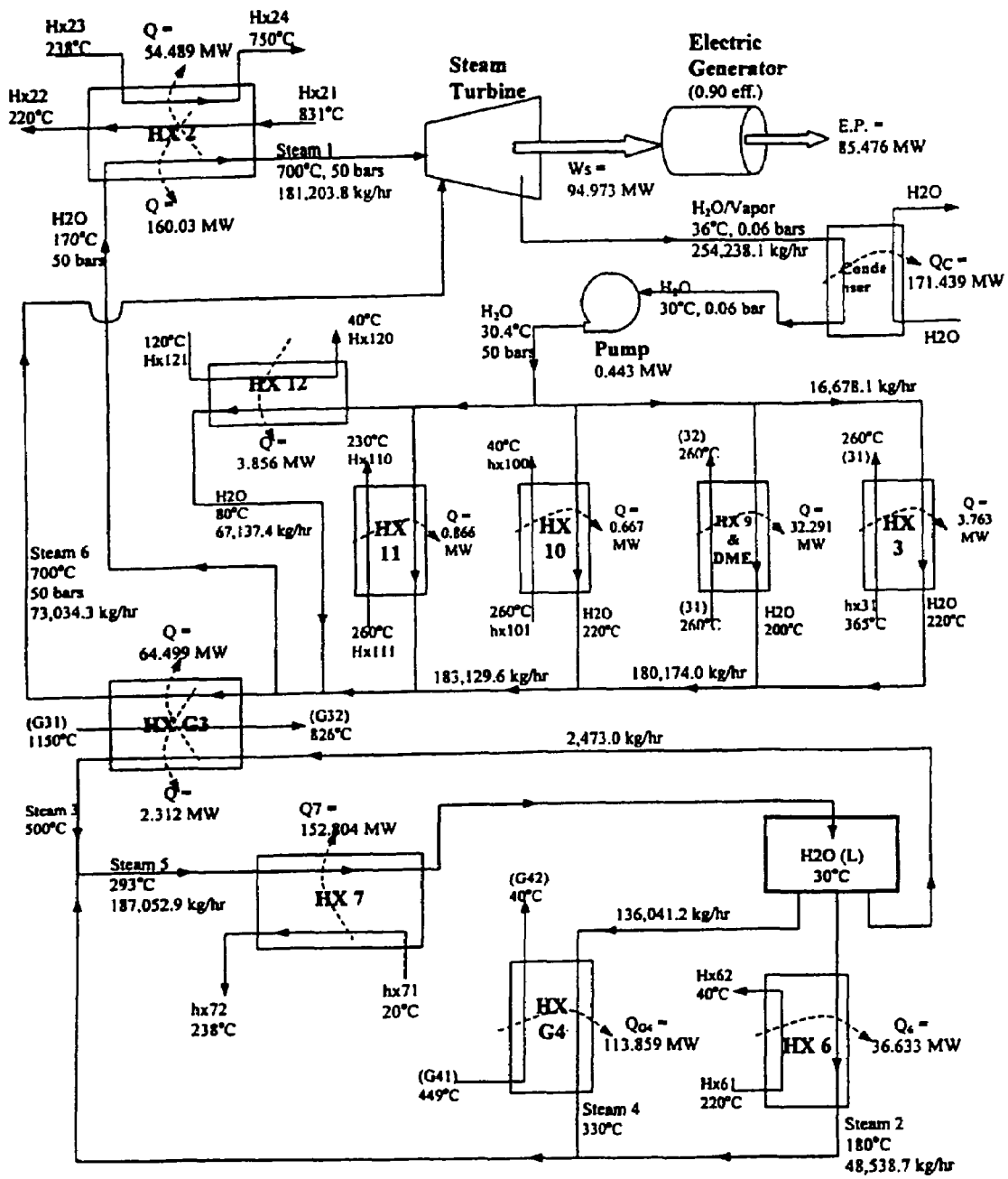
FIG. 22 is a diagram showing Water/Steam Flow Schematic of Biomass Hydro-gasification for production of dimethyl ether.
Figure 23:
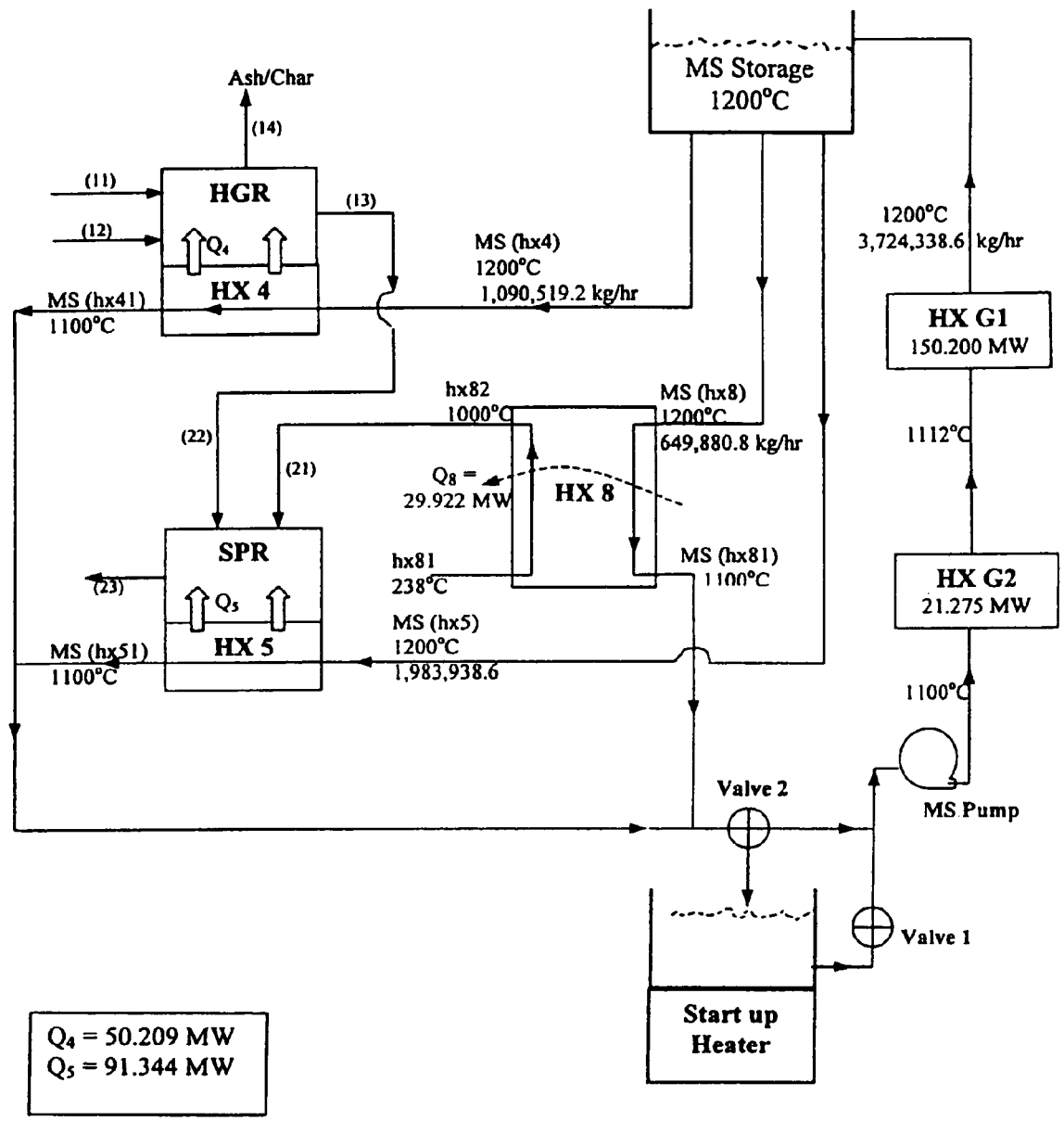
FIG. 23 is a diagram showing Molten Salt Flow Schematic of Biomass Hydro-gasification for production of dimethyl ether.
Figure 24:
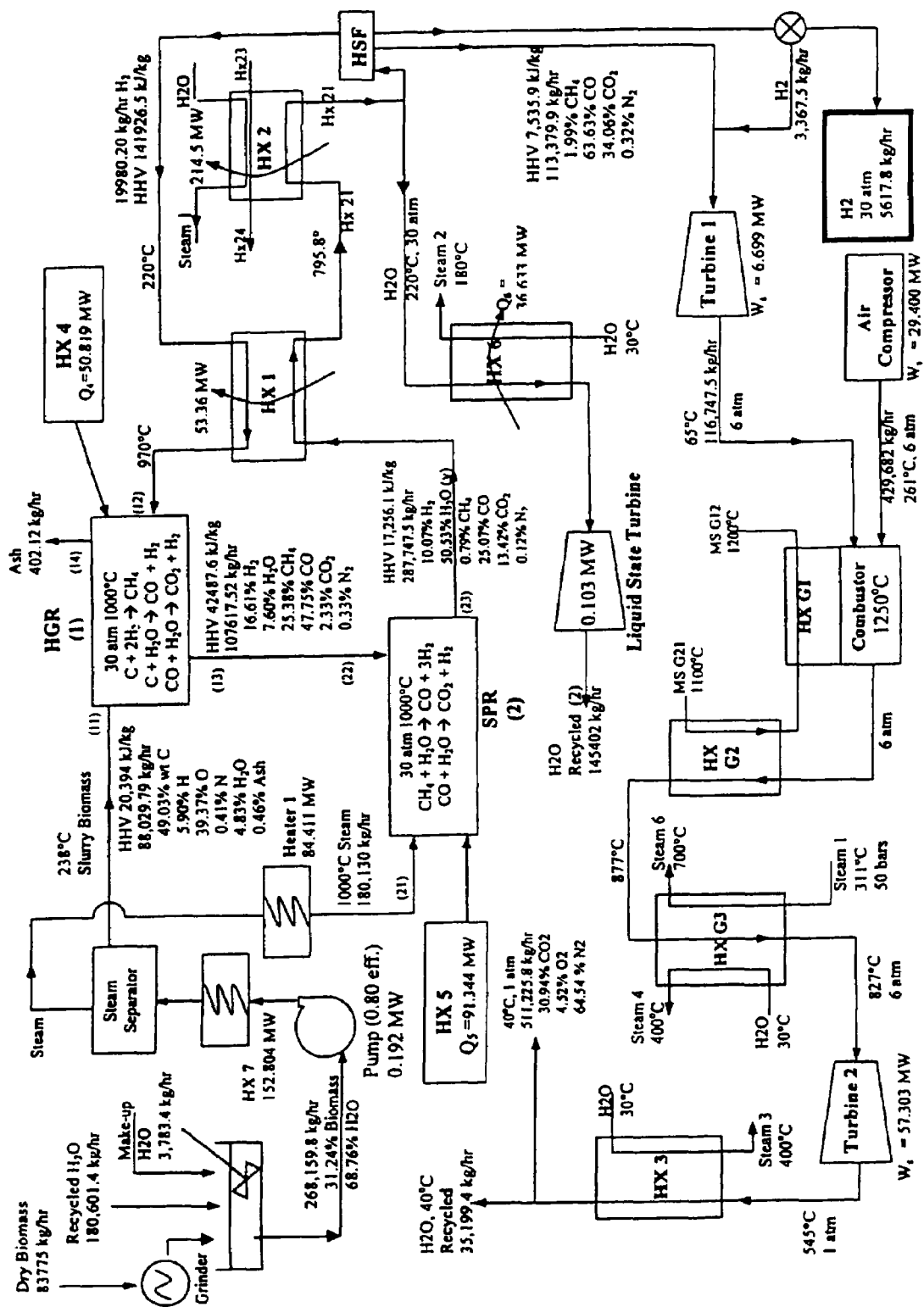
FIG. 24 is a diagram showing Mass Flow Schematic of Biomass Hydro-gasification for production of gaseous hydrogen fuel.
Figure 25:
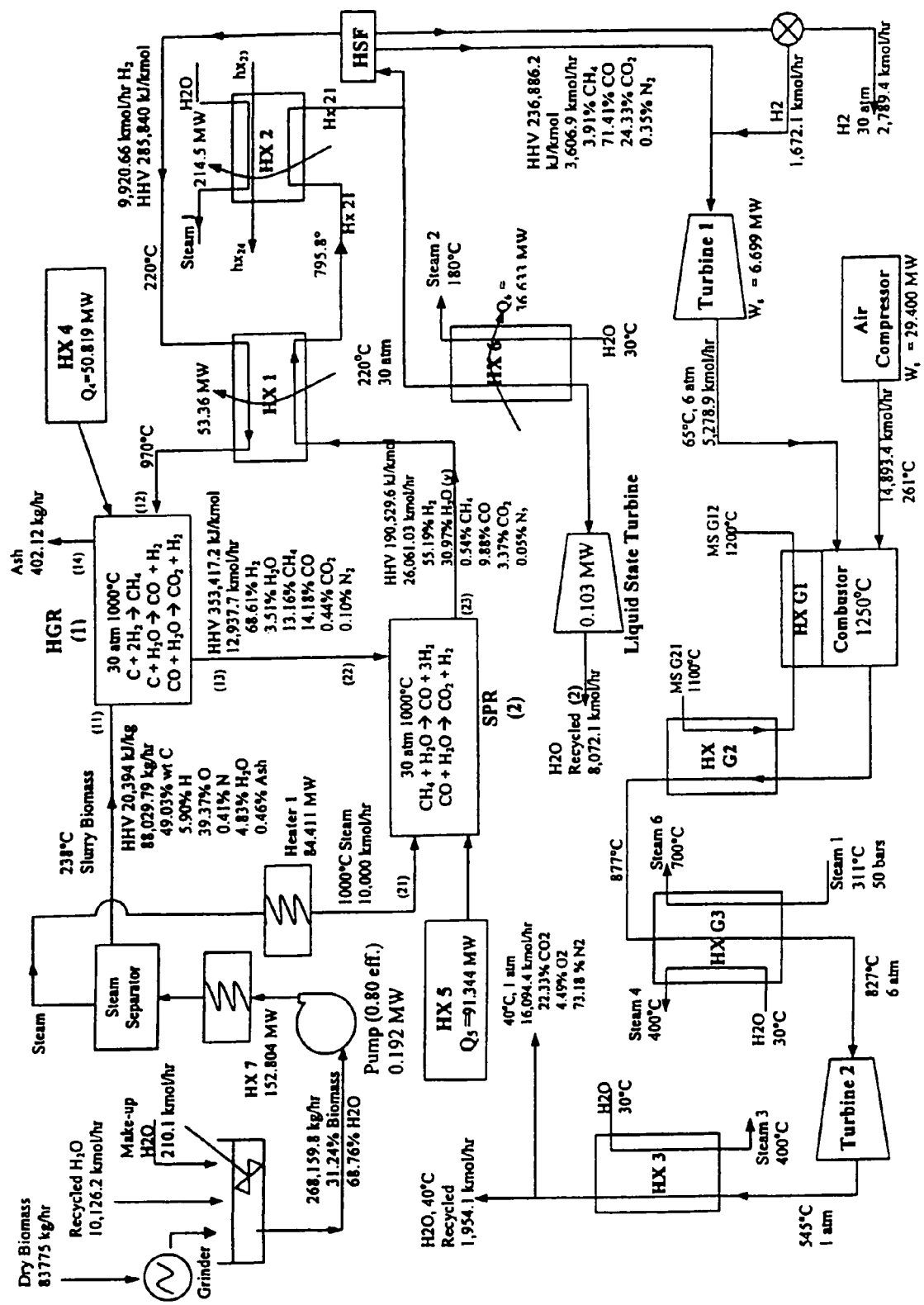
FIG. 25 is a diagram showing Mole Flow Schematic of Biomass Hydro-gasification for production of gaseous hydrogen fuel.
Figure 26:
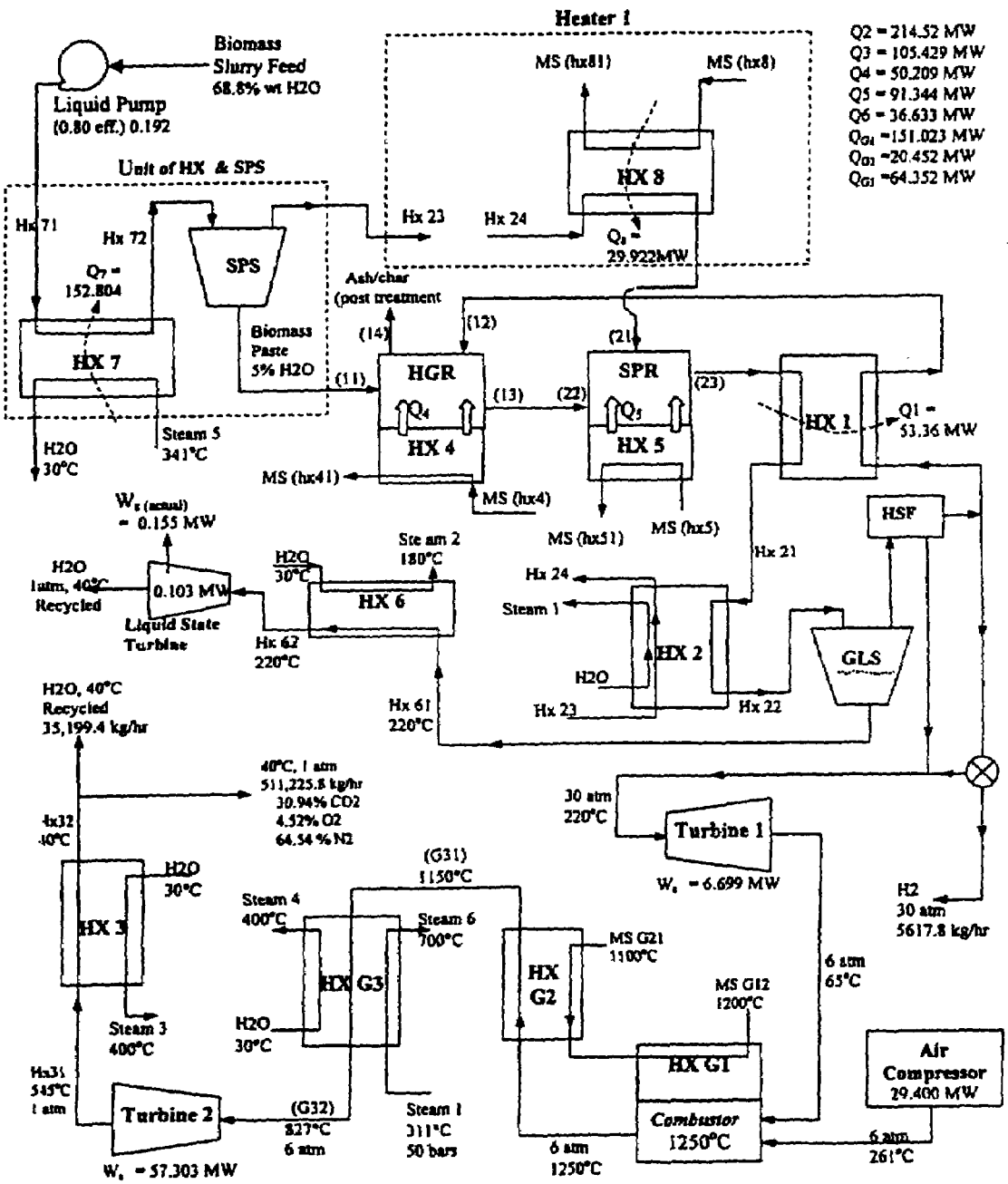
FIG. 26 is a diagram showing Thermal Energy Management Schematic of Biomass Hydro-gasification for production of gaseous hydrogen fuel.
Figure 27:
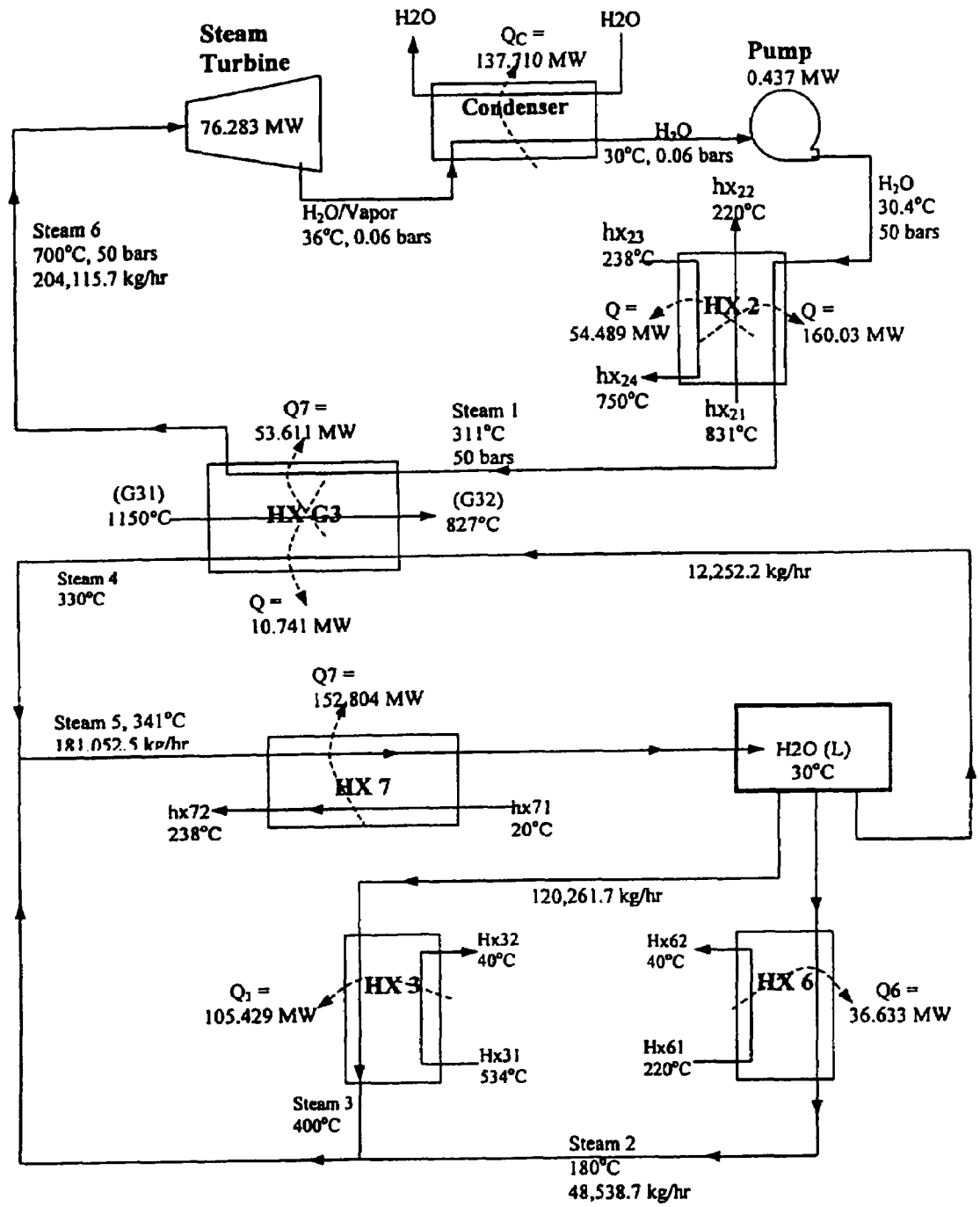
FIG. 27 is a diagram showing Water/Steam Flow Schematic of Biomass Hydro-gasification for production of gaseous hydrogen fuel.
Figure 28:
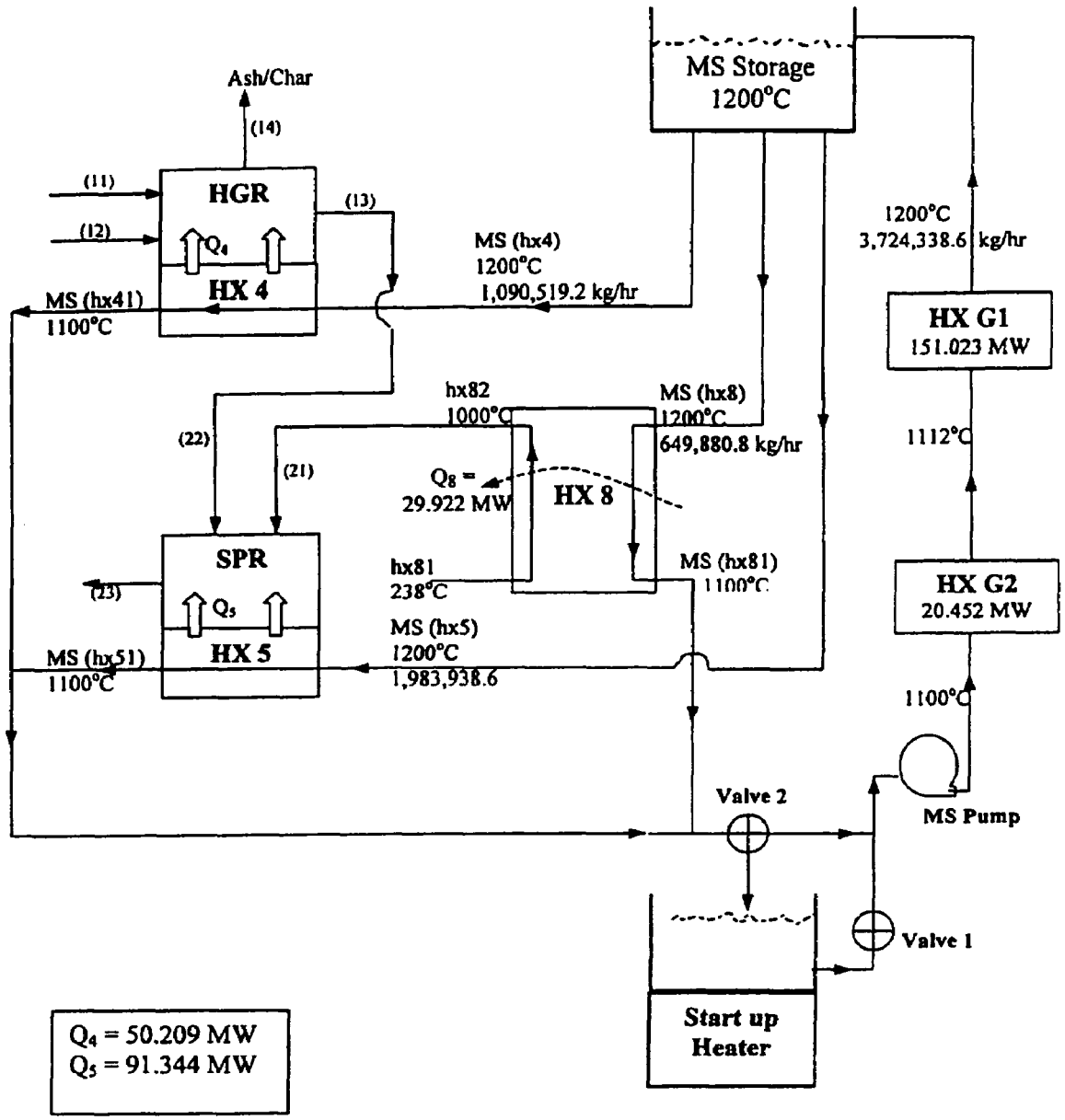
FIG. 28 is a diagram showing Molten Salt Flow Schematic of Biomass Hydro-gasification for production of gaseous hydrogen fuel.
Figure 29:
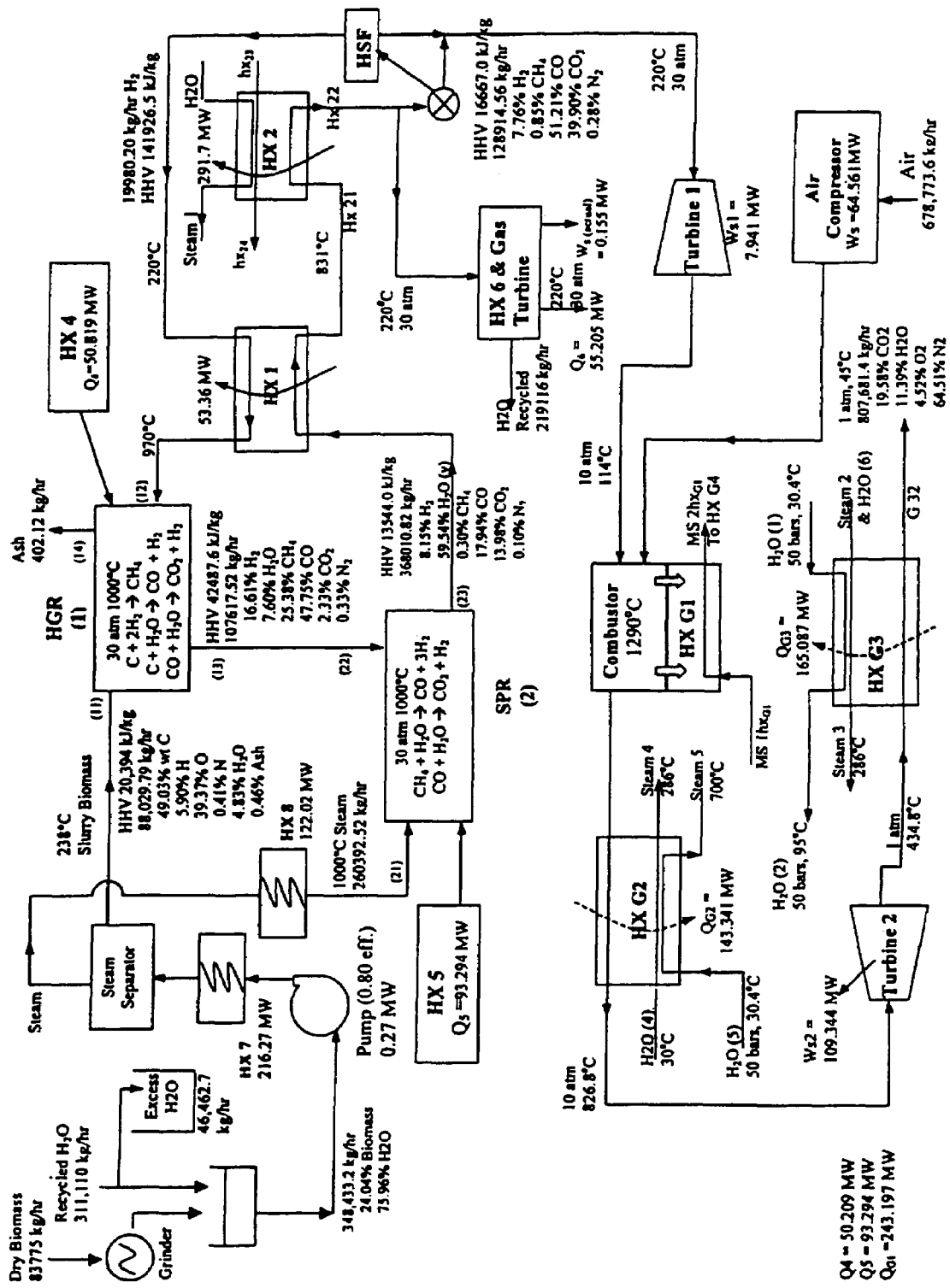
FIG. 29 is a diagram showing Mass Flow Schematic of Biomass Hydro-gasification for production of electricity.
Figure 30:
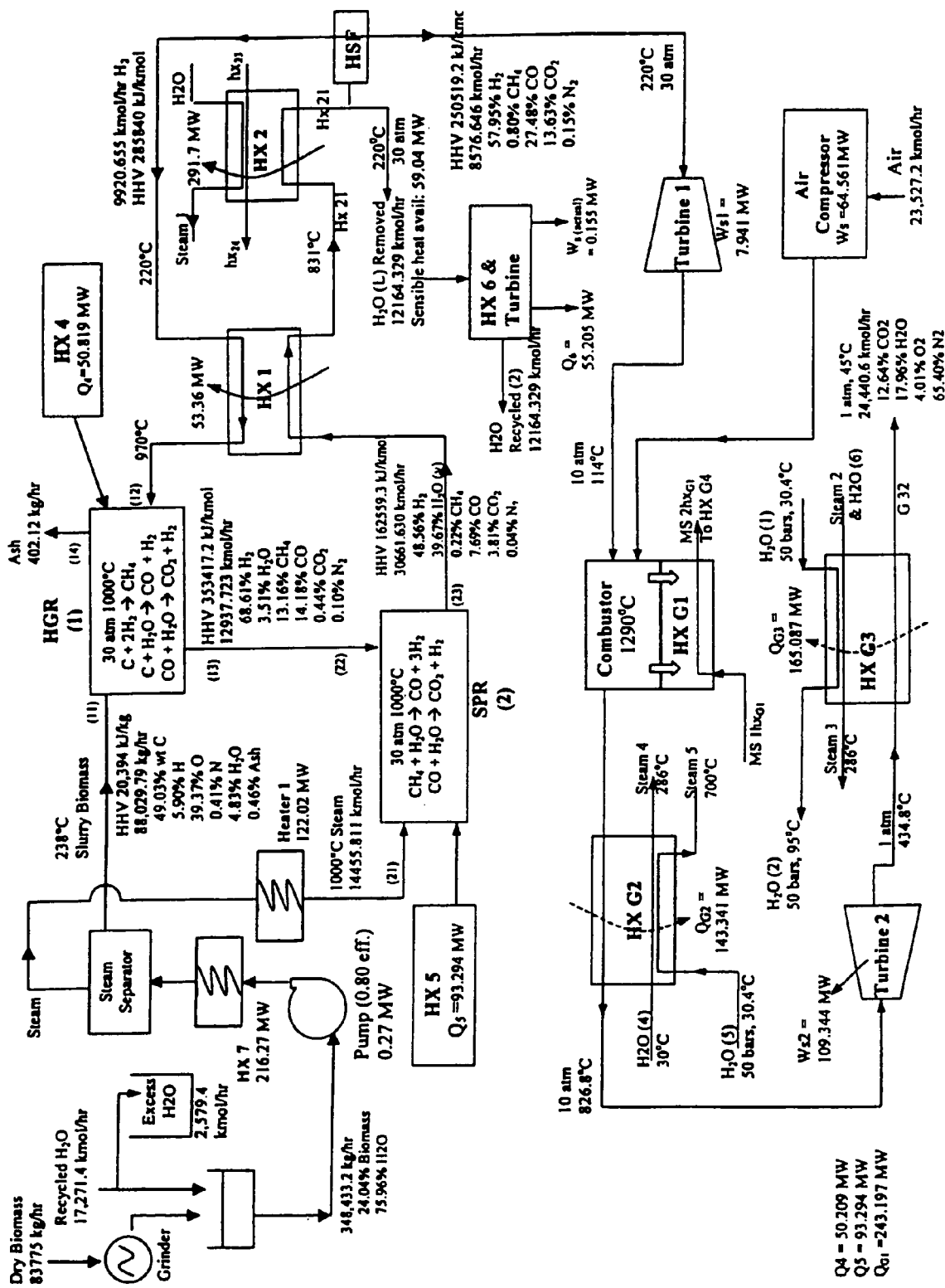
FIG. 30 is a diagram showing Mole Flow Schematic of Biomass Hydro-gasification for production of electricity.
Figure 31:
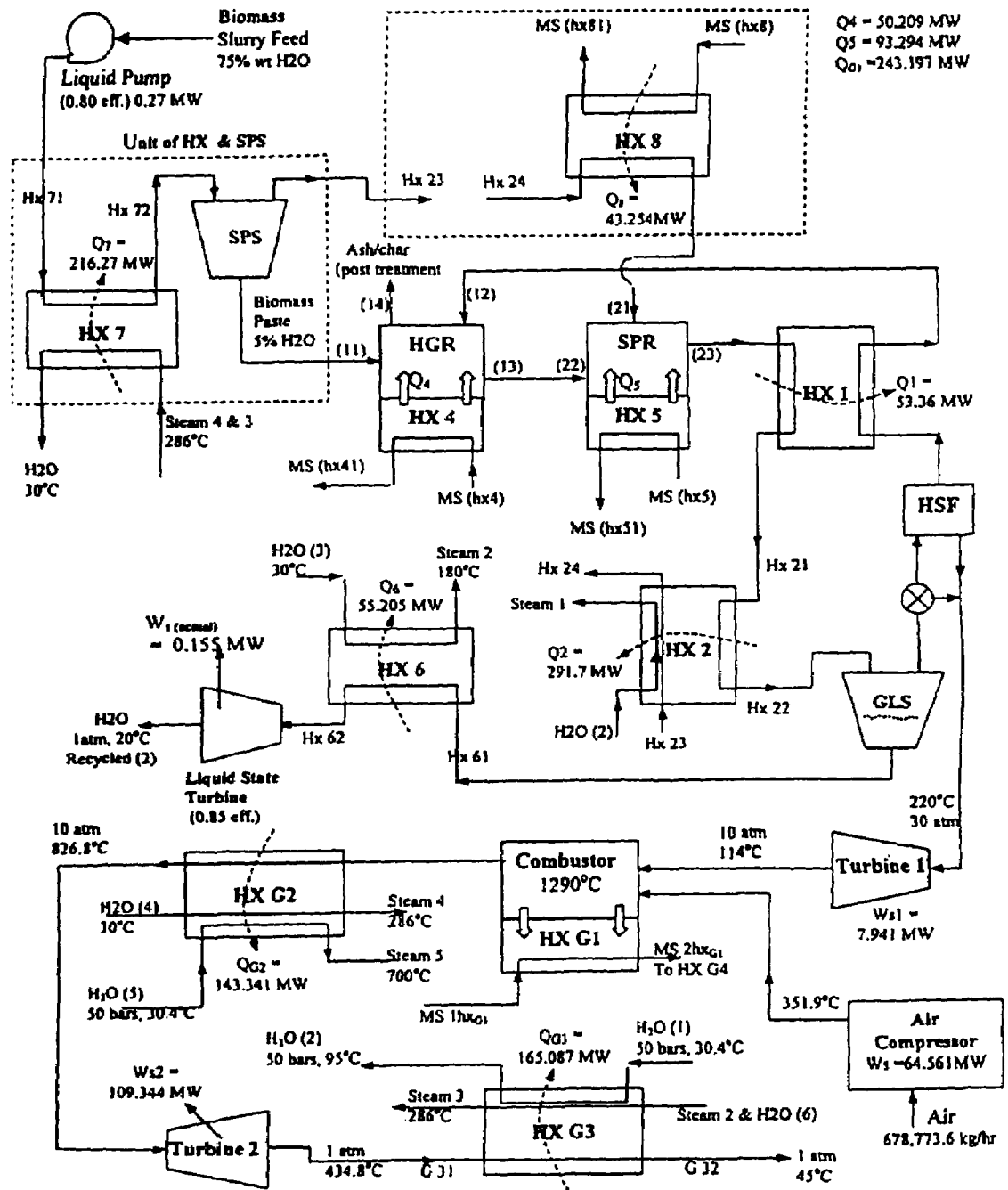
FIG. 31 is a diagram showing Thermal energy Management Schematic of Biomass Hydro-gasification for production of electricity.
Figure 32:
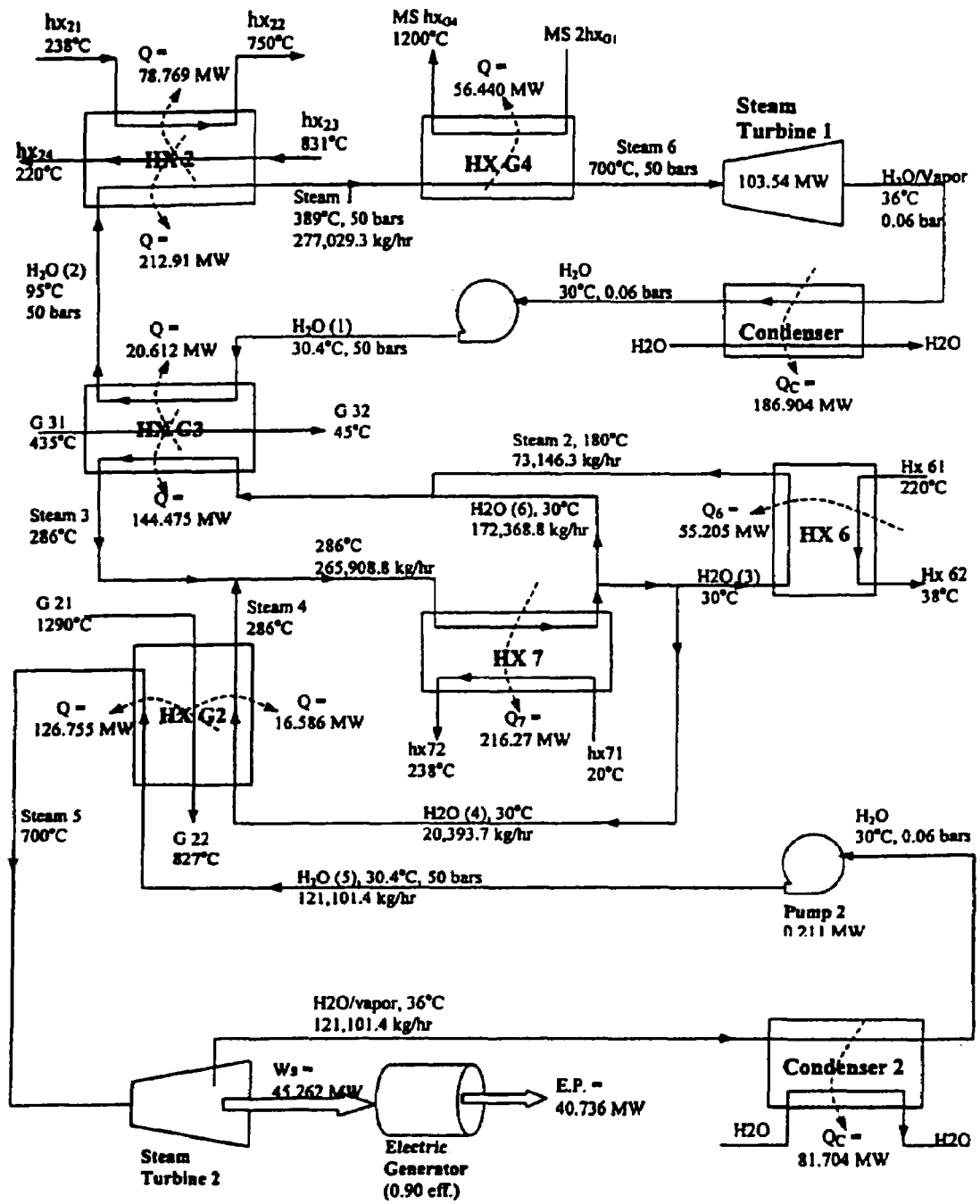
FIG. 32 is a diagram showing Water/Steam Flow Schematic of Biomass Hydro-gasification for production of electricity.
Figure 33:
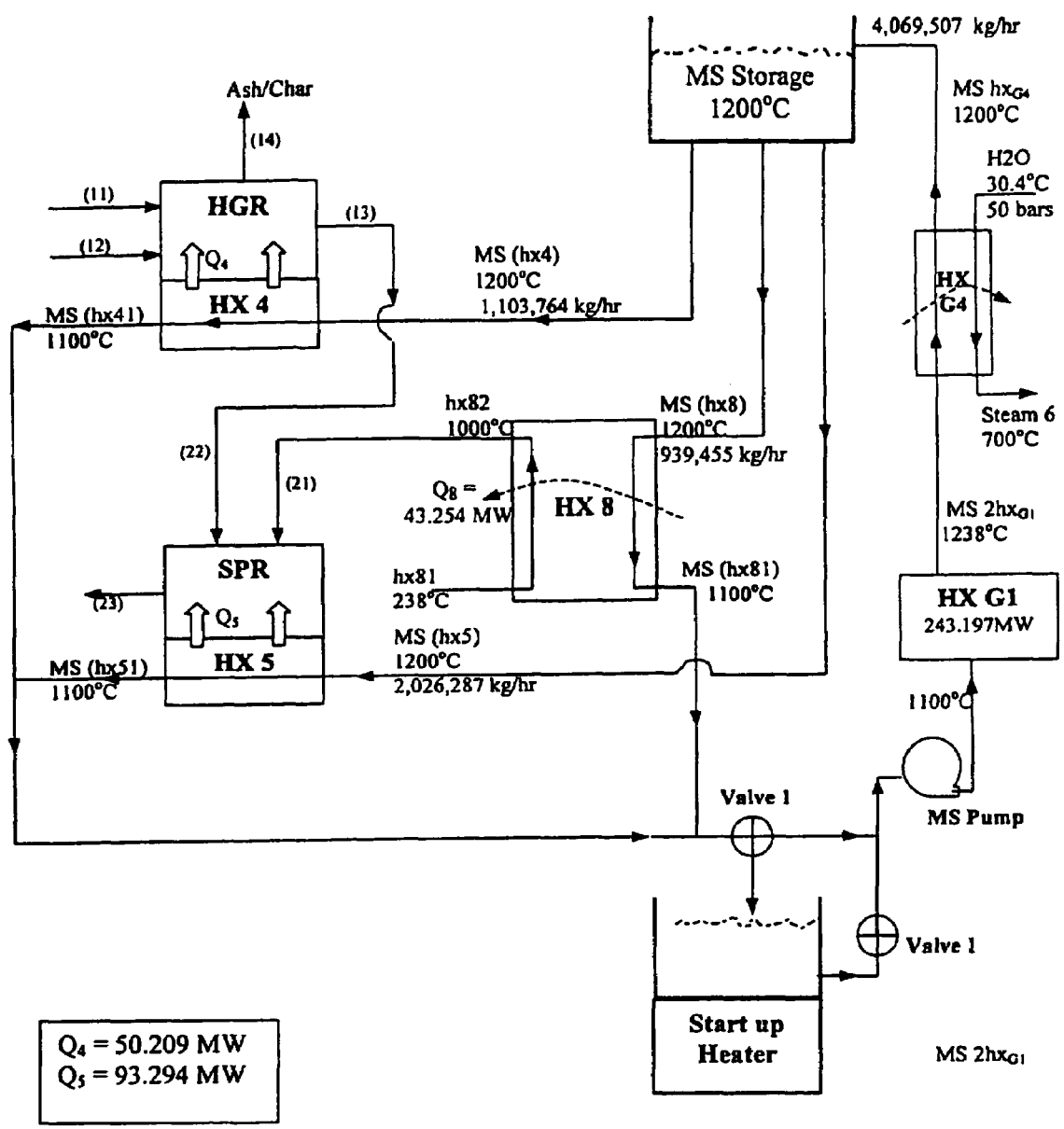
FIG. 33 is a diagram showing Molten Salt Flow Schematic of Biomass Hydro-gasification for production of electricity.
Figure 34:
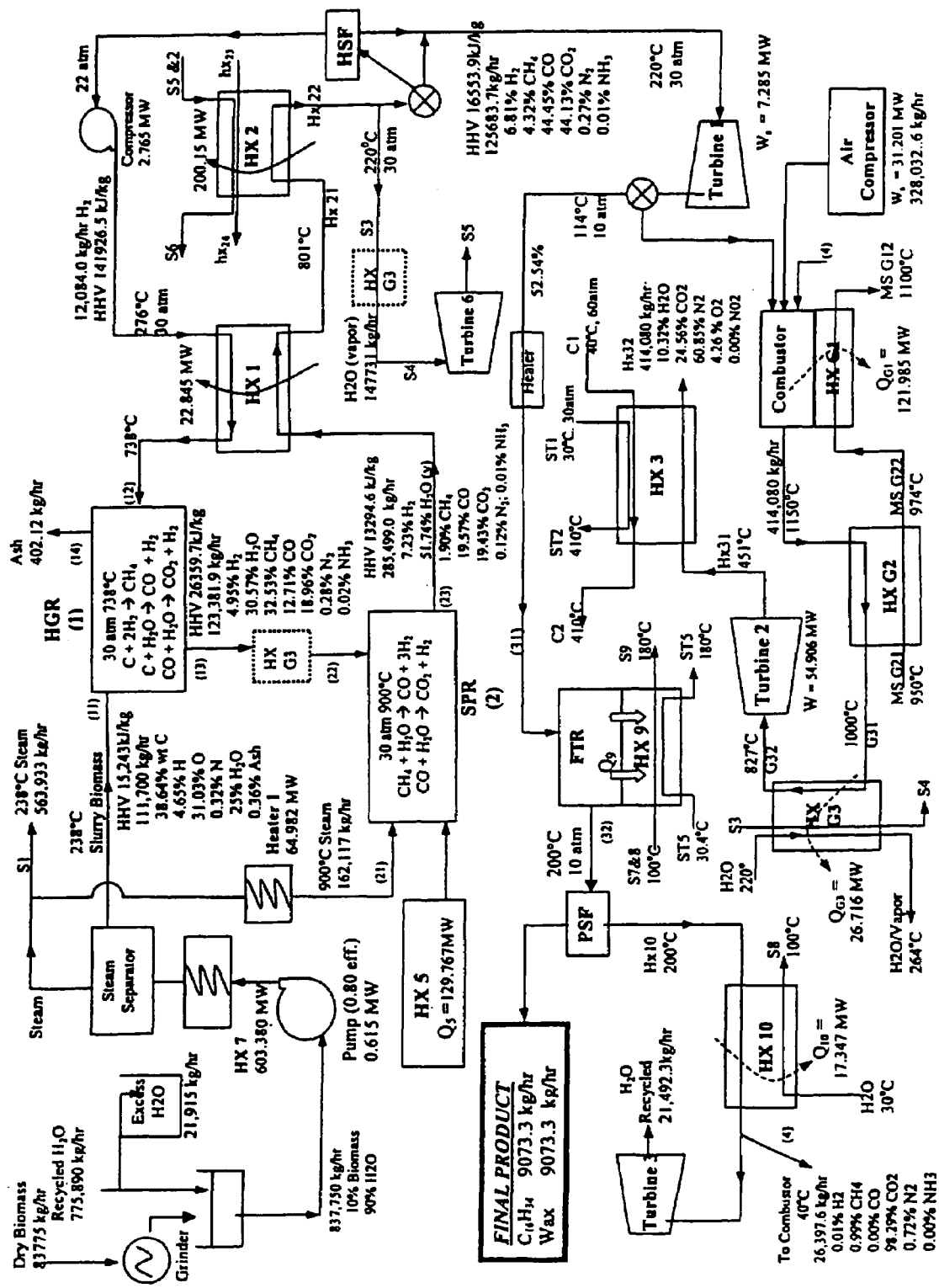
FIG. 34 is a mass flow schematic of biomass hydro-gasification for Fischer-Tropsch paraffin fuel production using an adiabatic HGR and a 9:1 water feed.
Figure 35:
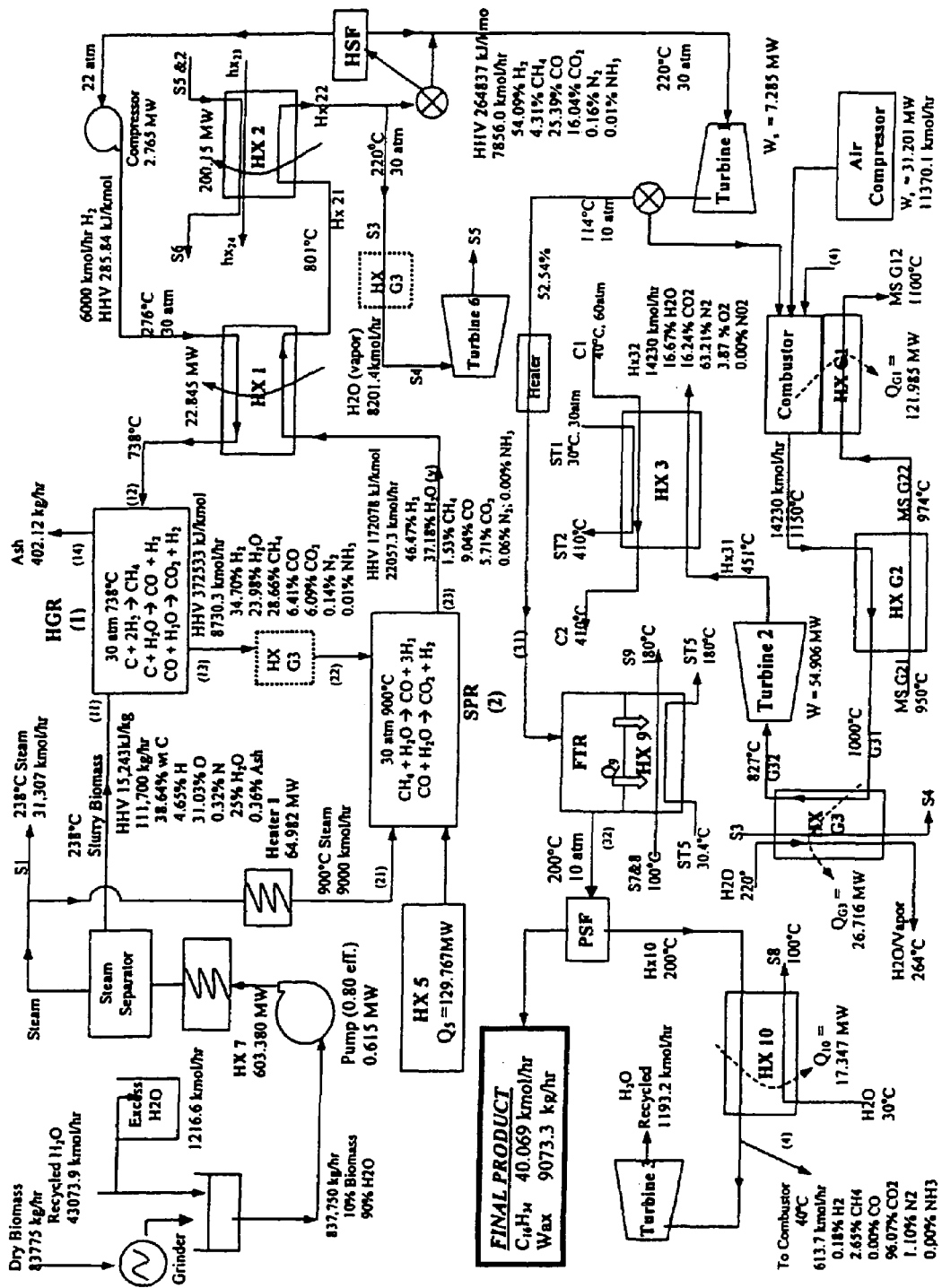
FIG. 35 is a molal flow schematic of biomass hydro-gasification for Fischer-Tropsch paraffin fuel production using an adiabatic HGR and a 9:1 water feed.
Figure 36:
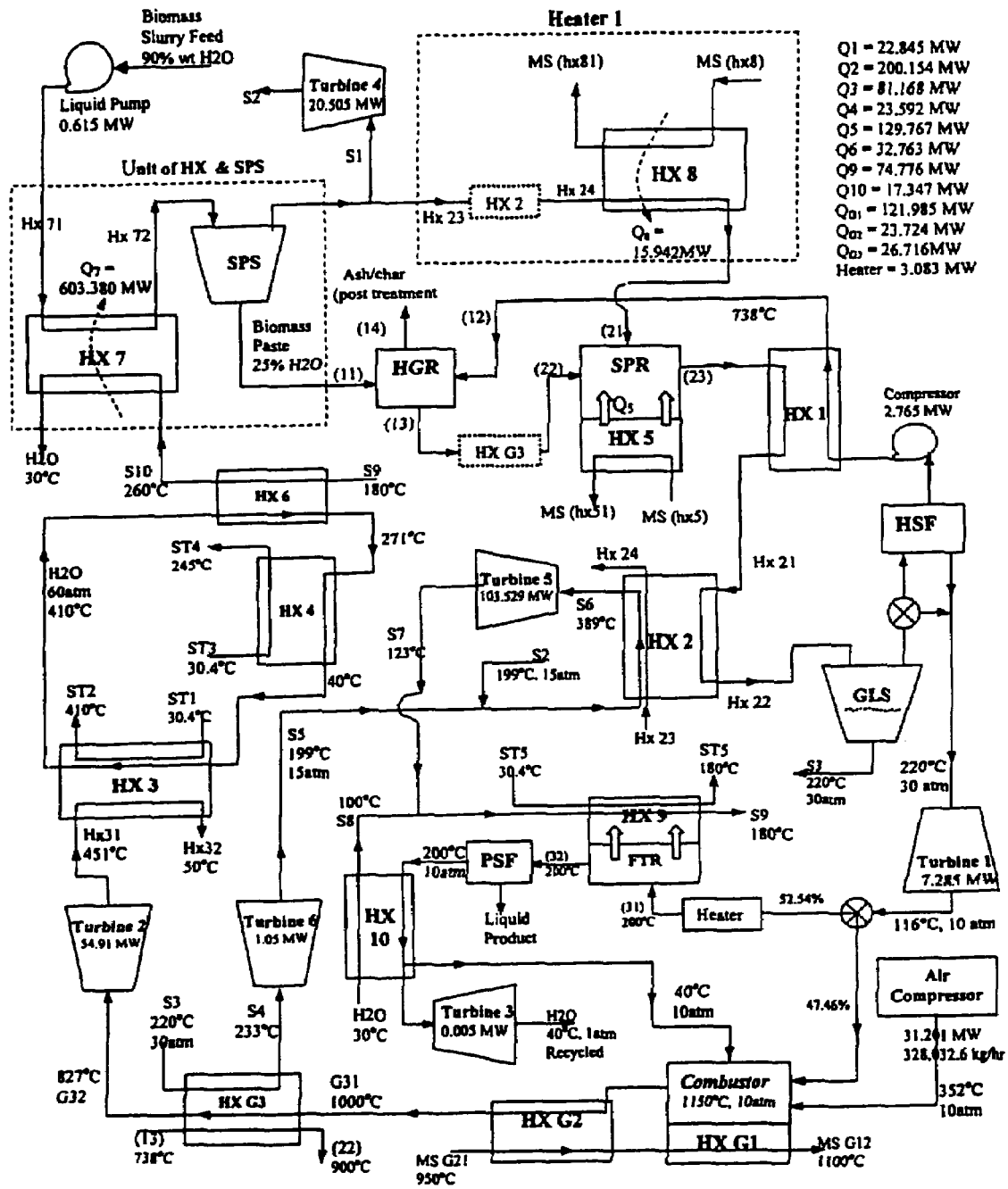
FIG. 36 is a thermal energy management schematic of biomass hydro-gasification for Fischer-Tropsch paraffin fuel production using an adiabatic HGR and a 9:1 water feed.
Figure 37:
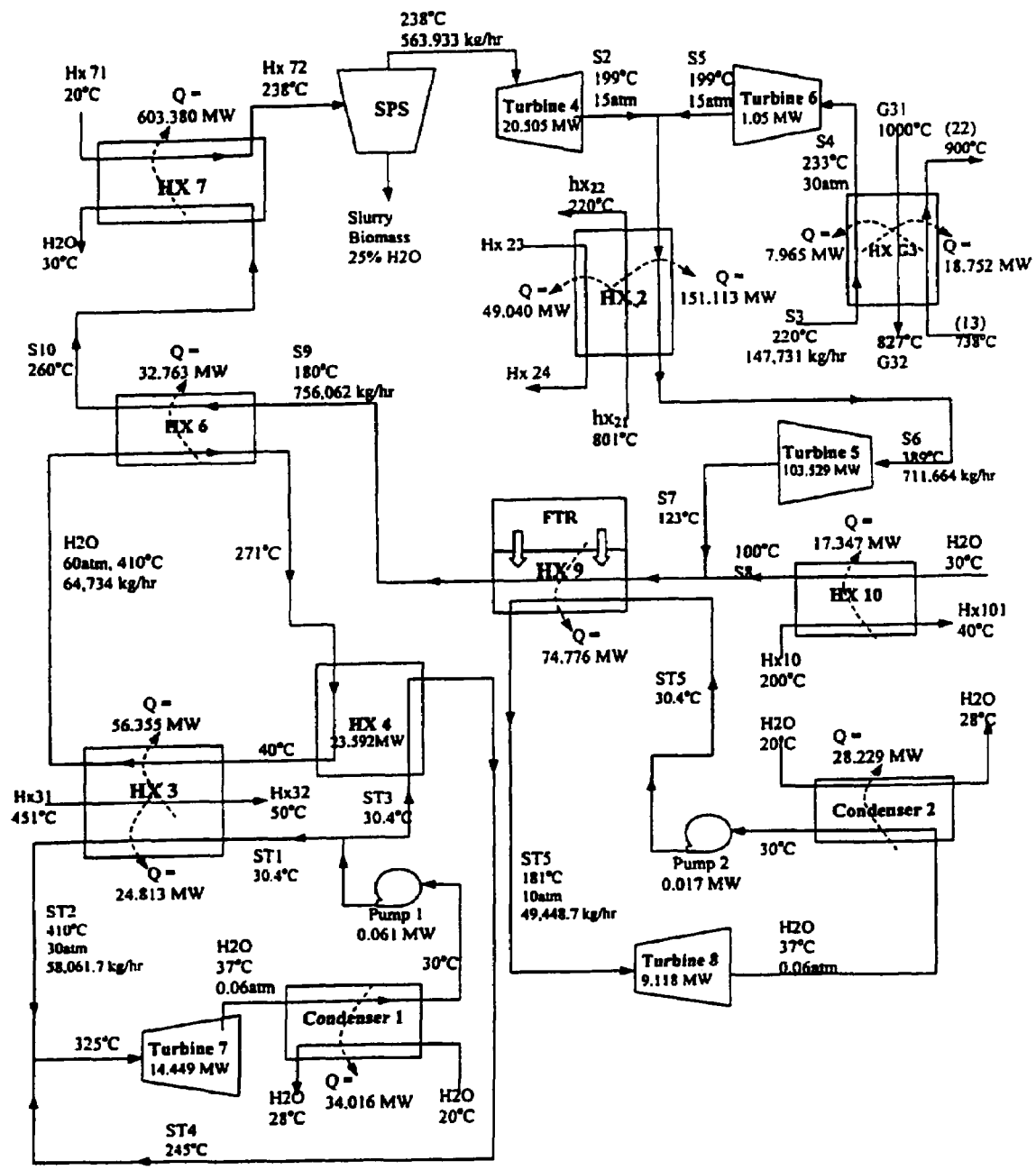
FIG. 37 is a water/steam flow schematic of biomass hydro-gasification for Fischer-Tropsch paraffin fuel production using an adiabatic HGR and a 9:1 water feed.
Figure 38:
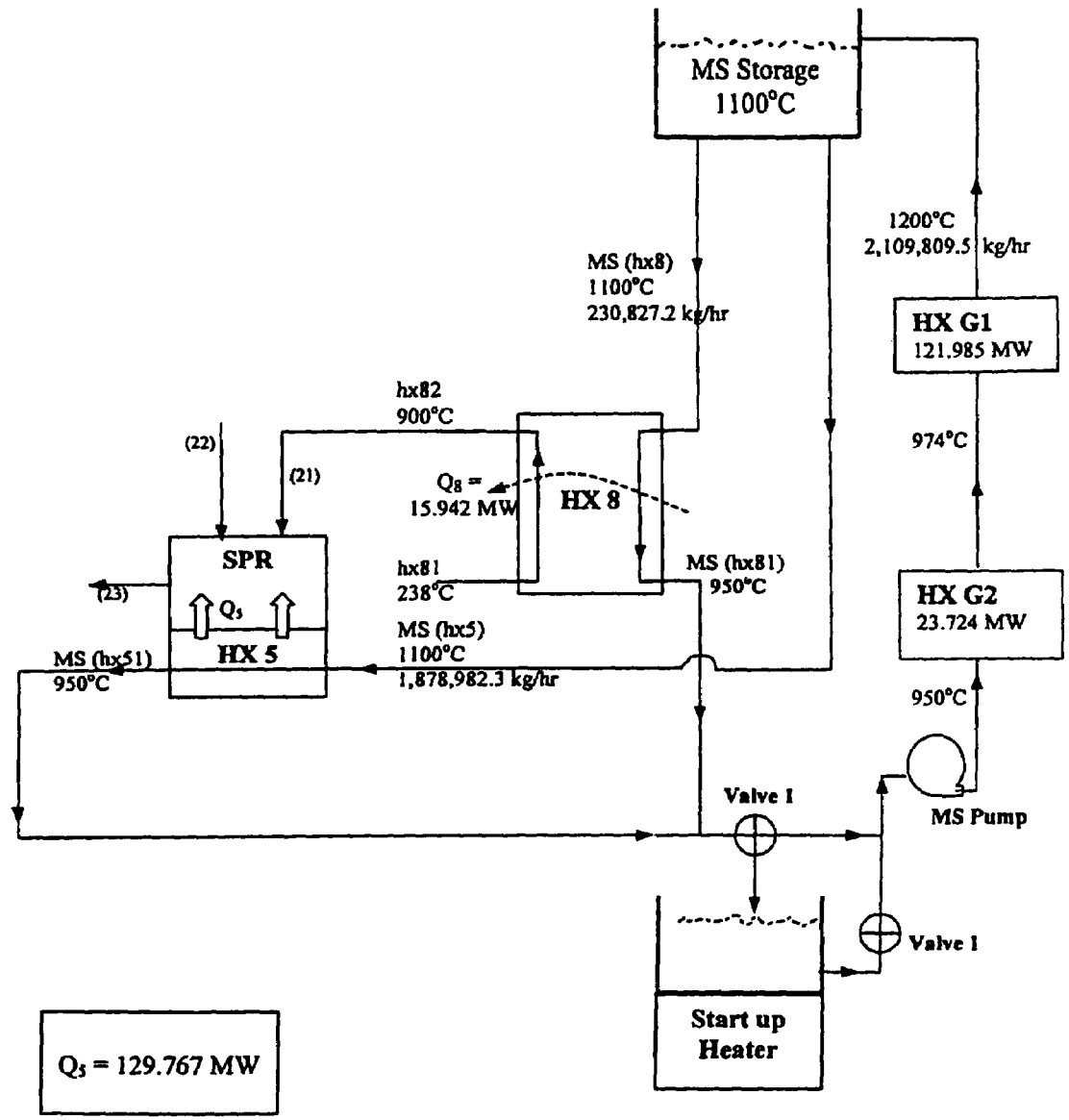
FIG. 38 is a molten salt flow schematic of biomass hydro-gasification for Fischer-Tropsch paraffin fuel production using an adiabatic HGR and a 9:1 water feed.

FIG. 10 shows the ratio of $H_2$ and CO available for feed into the Fischer-Tropsch fuel synthesis reactor, against the steam content added to the SPR at 800° C. and 30 atm. This ratio increases with the increasing amount of steam added to the SPR and reaches 2.1 at about 3.94 mol steam (or water) added per mol C in feedstock. With this amount of steam added, the system will achieve chemical and thermal self-sustainability and provide a proper ratio of $H_2$ and CO for Fischer-Tropsch synthesis of cetane. FIG. 11 shows the effect of $H_2O$ added to the SPR at 800° C. and 30 atm. FIGS. 12 and 13 show the effect of temperature and pressure on the $H_2$ and CO ratio and the conversion of $CH_4$ in the SPR. At higher temperature and lower pressure, this ratio is higher. In a similar trend with the $H_2$ and CO ratio, the conversion of $CH_4$ increases with increasing temperature and with decreasing pressure. It is thus high temperature and low pressure favored in the SPR.

The products of Fischer-Tropsch paraffinic liquid fuels are in a wide range of carbon number. According to the above Rentech report, about half of the products are diesel fuel. Also about half of the products come in the form of wax, with minor amounts of gases such as un-reacted reactants and hydrocarbon gases (methane, ethane, propane and so forth).

To exemplify the present invention, cetane, which is in middle position of diesel range ($C_{11}$ to $C_{20}$), was chosen as diesel fuel.

The results of thermo-chemical and thermodynamic modeling of the hydro-gasified conversion of waste wood (biomass), as a prototypical carbonaceous feed material, were used to examine the details and illustrate the features of this invention. These simulations of the novel sequence of process reactors were undertaken to discover the thermo-chemical conditions needed to achieve the production of synthetic fuels. For example, in the production of synthetic diesel fuel, the objectives were to attain self-sustained operation of the first stage hydro-gasifier. In a particular embodiment, this is accomplished at an equilibrium temperature of 1000° C. (738° C. when adiabatic) and 30 atmospheres pressure with a total hydrogen to carbon feed mole ratio of at least 3.48:1 (1.67:1 when adiabatic), and water to carbon feed ratio of at least 0.07:1 (0.43 when adiabatic), a water steam to carbon feed mole ratio of at least 3.91:1 (1.67:1 when adiabatic) into the second stage steam reforming reactor also operating at an equilibrium temperature of 1000° C. (900° C. when adiabatic) and 30 atmospheres pressure, to obtain conditions for simultaneous optimal quantities of product hydrogen for self-sustained operation of the first stage hydro-gasification reactor and an adequate hydrogen to carbon mole ratio of at least 2.1:1 in the residual synthesis gas stream to feed the third stage Fischer-Tropsch reactor, operating at 200° C. and 10 atmospheres pressure, and adiabatic self-sustained operation of a special HGR and SPR combination reactor, followed by a conventionally operated SPR and Fischer-Tropsch reactors, with full thermal and chemical potential energy management. The inventors have found that higher temperature Fischer-Tropsch reactors can provide higher quality exothermic heat up to 350° C., with appropriate change in catalyst.

Tables 1 through 5 show the overall energy transfer rates into and out from each heat exchanger and power conversion component for each operating mode of the conversion process. The mass flow, molal flow, thermal energy management, water/steam and molten salt schematic diagrams for each of the five operating modes of the conversion process are also shown as FIGS. 14-18, 19-23, 24-28, 29-33 and 34-38 respectively. Tables 6 and 7 summarize the results of the performance studies and process configuration parameters for each of the five operating modes of the conversion process.

The inventors have found that adequate kinetic performance of the processes described can be achieved at temperatures of about 750° C. At lower operating temperatures, about 800° C. or lower, a lower temperature heat transfer fluid such as a molten salt system or a water-steam system could be used to transfer heat. Thus, water-steam heat transfer loops can replace the molten salt loops for transferring heat at lower operating temperatures.

The carbonaceous material feed process initially described above uses a water slurry suspension feed technology, originally developed by Texaco for use in its partial-oxidation gasifiers, that can accept a wide variety of carbonaceous materials, and can be metered by controlled pumping into the first stage hydrogen gasification reactor (HGR) to produce a methane rich gas with high conversion efficiency (measured to have at least 85% carbon feed chemical utilization efficiency). Enough heat is available to be able to generate superheated steam from the biomass-water slurry feed to supply and operate the second stage steam-methane reformer. The reformer product gas is fed into a hydrogen membrane filter that allows almost pure hydrogen to pass back into the first stage reactor to sustain the hydro-gasification of the biomass. The remaining second stage product gas, not passing through the hydrogen filter, is cooled to condense and re-cycle any water vapor present back into the slurry carbonaceous feed system. The unfiltered gas is fed into the fuel synthesis reactors, which comprise a Fischer-Tropsch paraffin hydro-carbon synthesis reactor, which operates at 200° C. and 10 atmospheres pressure. Process modeling reveals that the hydrogen/carbon molecular feed ratio must be at least 2.1:1 to optimize production of chemically pure and clean-burning [sulfur-free] diesel-like liquid fuels and high value chemically pure paraffin-like waxes, without additional fuel or energy. (FIGS. 14-18 and Tables 1, 6 and 7 or FIGS. 34-38 and Tables 5, 6 and 7 for adiabatic first stage reactor operation), or a dimethyl ether synthesis reactor, which operates at 200° C. and 70 atmospheres pressure. This reactor produces approximately 92.4% DME and 7.1% methanol. The methanol is combusted to co-generate about 30 MW of electricity and 20 MW of process heat for exchange with the molten salt and water/steam heat transfer loops (see FIGS. 19-23 and Tables 2, 6 and 7), hydrogen gaseous fuel synthesis (see FIGS. 24-28 and Tables 3, 6 and 7), and all electric power production without fuel synthesis (see FIGS. 29-33 and Table 4, 6 and 7).

Net export of electric power is possible in all five modes of operation of the simulated biomass hydro-gasification process plant. The results of these simulations are summarized in Table 6 and 7. The overall energy utilization goes from 50.7% (71.2% when adiabatic) for Fischer-Tropsch synthesis to 67.2% for hydrogen production. Optimized electric power production utilizes about 38.2% of the chemical potential energy in the biomass feed stock for clean-burning power conversion. In general the process modes could be switched using an appropriate proportional valve to distribute the synthesis gas production after separation of enough pure hydrogen gas for the first stage hydro-gasification reactor.

The results of the overall modeling shown in FIG. 1 are summarized as follows.
1. Optimum conditions of the HGR: Operating at 1000° C. and 30 atm; 2.76 mol $H_2$ per mol C in feedstock to maintain self-sustainability; 0.066 mol $H_2O$ per mol C in feedstock.
2. Optimum conditions of the SPR: Operating at 1000° C. and 30 atm; 4.022 mol $H_2O$ per mol C in feedstock.
3. Fischer-Tropsch products: 0.199 ton wax per ton of feedstock; 68.3 gallons of cetane ($C_{16}H_{34}$) diesel per ton of feedstock.

In another embodiment of the invention, a process is provided that combines steam pyrolysis and hydro-gasification into a single step for the production of energetic gases from carbonaceous material. The process comprises heating carbonaceous material simultaneously in the presence of both hydrogen and steam. At sufficient temperatures and pressures, steam pyrolysis can enhance the hydro-gasification of carbonaceous materials.

The combination of steam pyrolysis and hydro-gasification can enhance the rates at which hydrocarbon gases are produced from natural and synthetic carbonaceous substances such as plant material, coal and synthetic polymers, and from carbonaceous materials such as biomass and municipal waste containing such natural and synthetic substances.

By combining steam pyrolysis and hydro-gasification into a single step, a carbonaceous material can be effectively converted into energetic gases without first subjecting the material to a separate steam pyrolysis step. More particularly, in accordance with the present invention, non-pyrolyzed carbonaceous material can bypass the steam generator and go directly into the hydro-gasification reactor, where the non-pyrolyzed carbonaceous material can undergo the combined process of steam pyrolysis and hydro-gasification. The carbonaceous material can be prepared as a slurry, which is fed into the hydro-gasification reactor through piping that connects a source of the slurry to the reactor. Steam can be fed into the reactor through piping from the steam generator, and hydrogen can be fed into the reactor through piping from the steam pyrolytic reformer.

The following Examples illustrate the process of combining steam pyrolysis and hydro-gasification in the production of energetic gases from wood (Examples 1-7), synthetic polymers (Examples 8-10), and coal (Example 11).

EXAMPLE 1

This example provides a way to carry out steam pyrolysis and hydro-gasification in a micro-batch reactor using real time analysis of gases.

Figure 39:
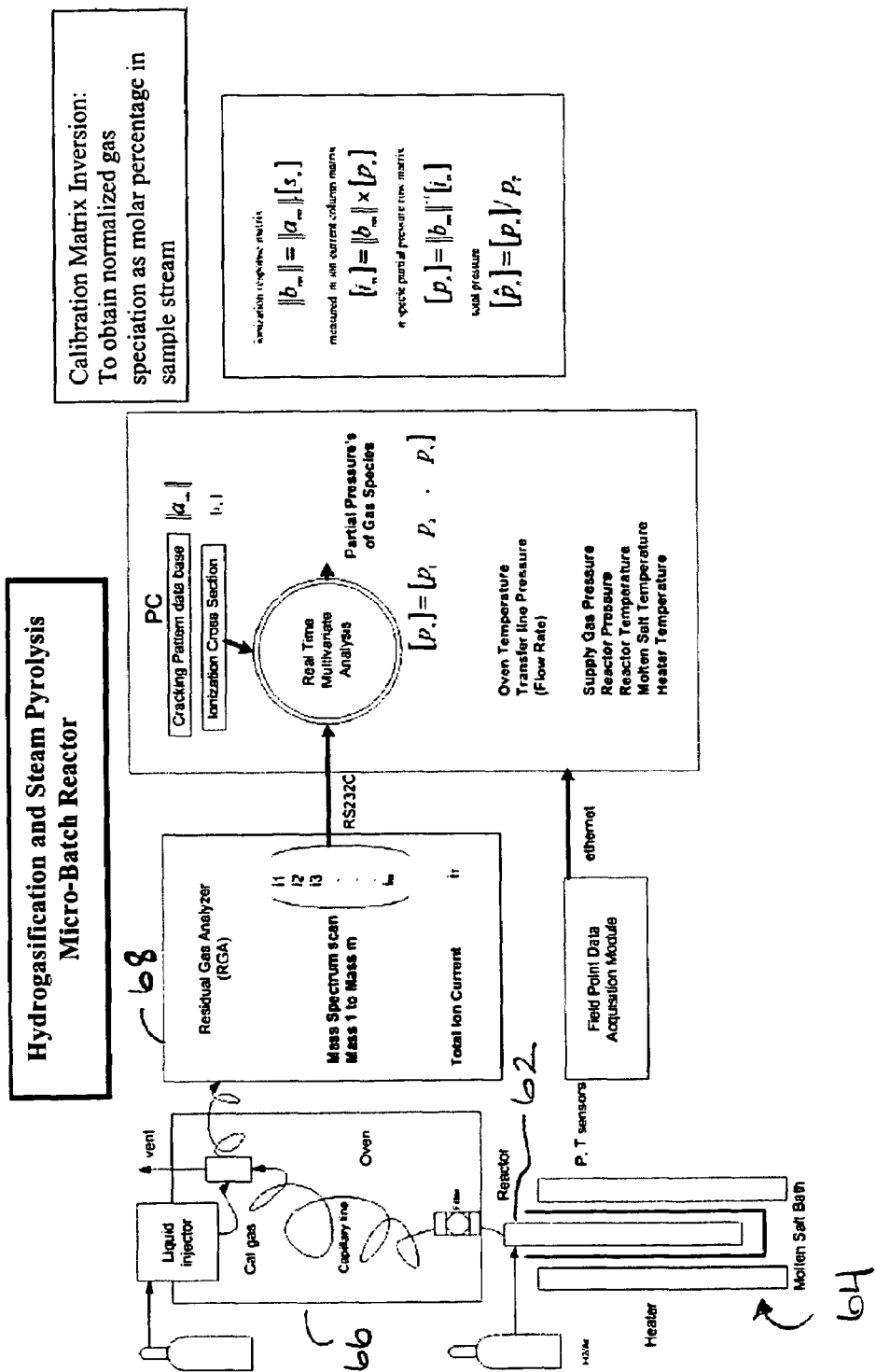
FIG. 39 is a schematic diagram of a steam pyrolysis/hydro-gasification micro-batch reactor coupled to a residual gas analyzer, in another embodiment of the invention.

Pine wood bedding chip material was used as a representative carbonaceous material. Referring to FIG. 39, the pine wood material, water and a gas were added to a reactor vessel 62 and quickly brought to a desired temperature by immersing the vessel in a molten salt bath 64. The vessel was directly coupled to a sample injector 66 and a residual gas analyzer 68 for real-time analysis of the various gas species produced by pyrolysis and hydro-gasification. The partial pressures of the gas species were determined over the course the reaction.

Figure 40:
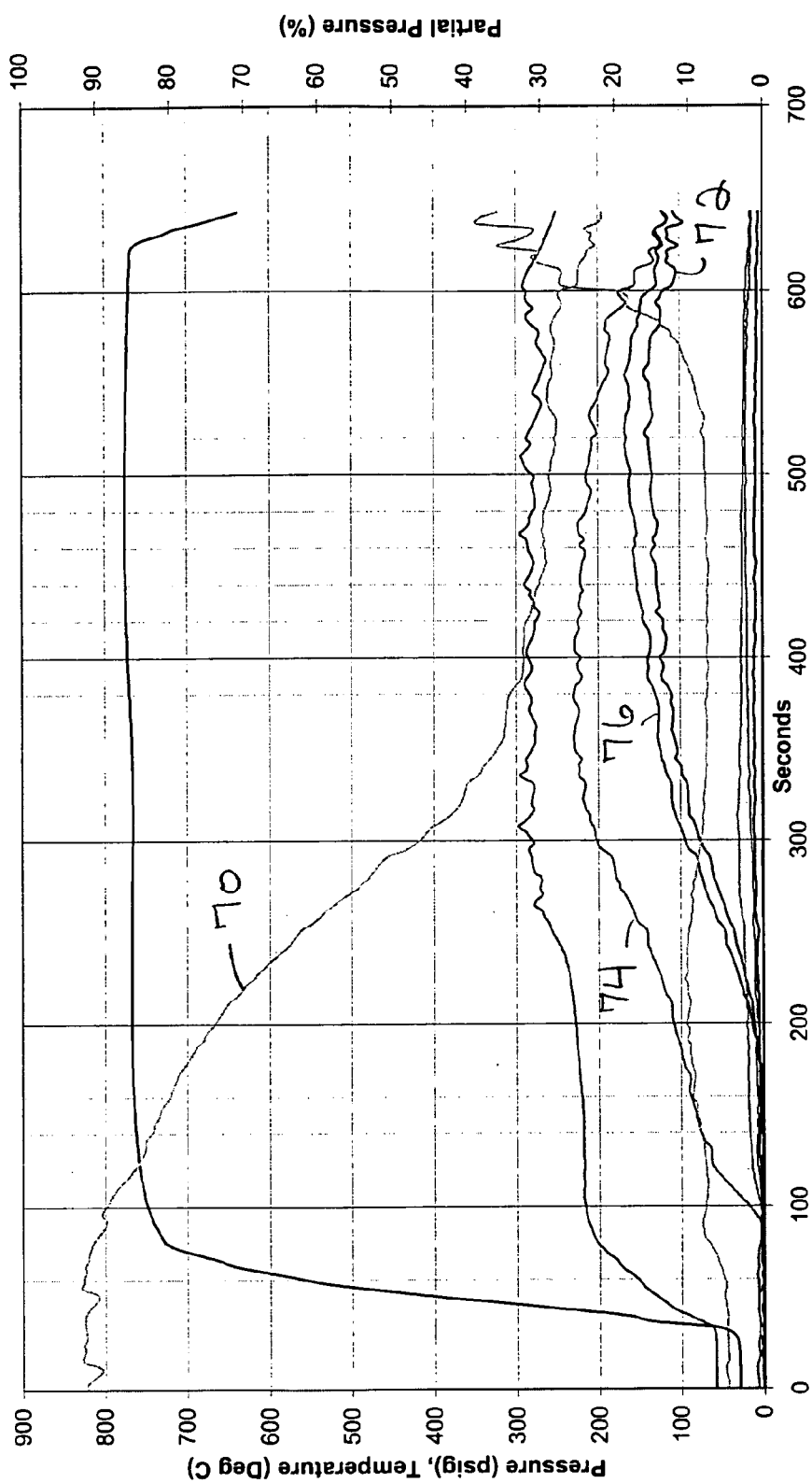
FIG. 40 is a data record display of gas species produced in a micro-batch reactor.

FIG. 40 provides a typical data record display of the experimental results. Partial pressures values over time are shown for hydrogen 70, methane 72, carbon monoxide 74, and carbon dioxide 76, as well as other gas species.

In a typical set of experiments, the process combining steam pyrolysis and hydro-gasification was compared with three other types of pyrolytic processes—dry pyrolysis with helium gas, dry pyrolysis with hydrogen gas, and steam pyrolysis with helium gas.

The dry pyrolysis process with helium gas was carried out by adding a pine wood sample and helium to the reactor vessel, then heating. Although no water was added to the reactor vessel, some water may have been present in the pine wood sample due to incomplete drying of the pine wood material. Because helium is an inert gas, this process can be considered to generate products only as a result of thermolysis.

The dry pyrolysis process with hydrogen gas was carried out by adding a pine wood sample and hydrogen to the reactor vessel, then heating. No water was added. Since hydrogen gas is not inert, the dry pyrolysis of the pine wood sample in the presence of hydrogen will induce reduction reactions with elements in the biomass molecules as well as any pyrolytic action dissociating the biomass molecules by thermolysis.

The steam pyrolysis process with helium gas is considered representative of the steam pyrolysis process by itself. The process was carried out by adding pine wood material, water and helium to the reactor vessel, then heating.

Table 8 provides an analysis of the pine wood material used in the example compared with pine wood material used by others in previous studies. Values for the elemental (or "ultimate") analysis indicate that the pine wood used in the example is comparable to that studied by others.

EXAMPLE 2

This example provides rate constant measurements for the production of methane gas and carbon monoxide from pine wood material subjected to the four pyrolytic processes.

Each pyrolytic process was carried out as described in Example 1. Process temperatures were about 580-600° C. ("600° C."), 670-690° C. ("670° C."), and 770-790° C. ("770° C."). The nominal particle size of the pine wood samples was less than about 425 microns (0.425 mm diameter).

Figure 41:
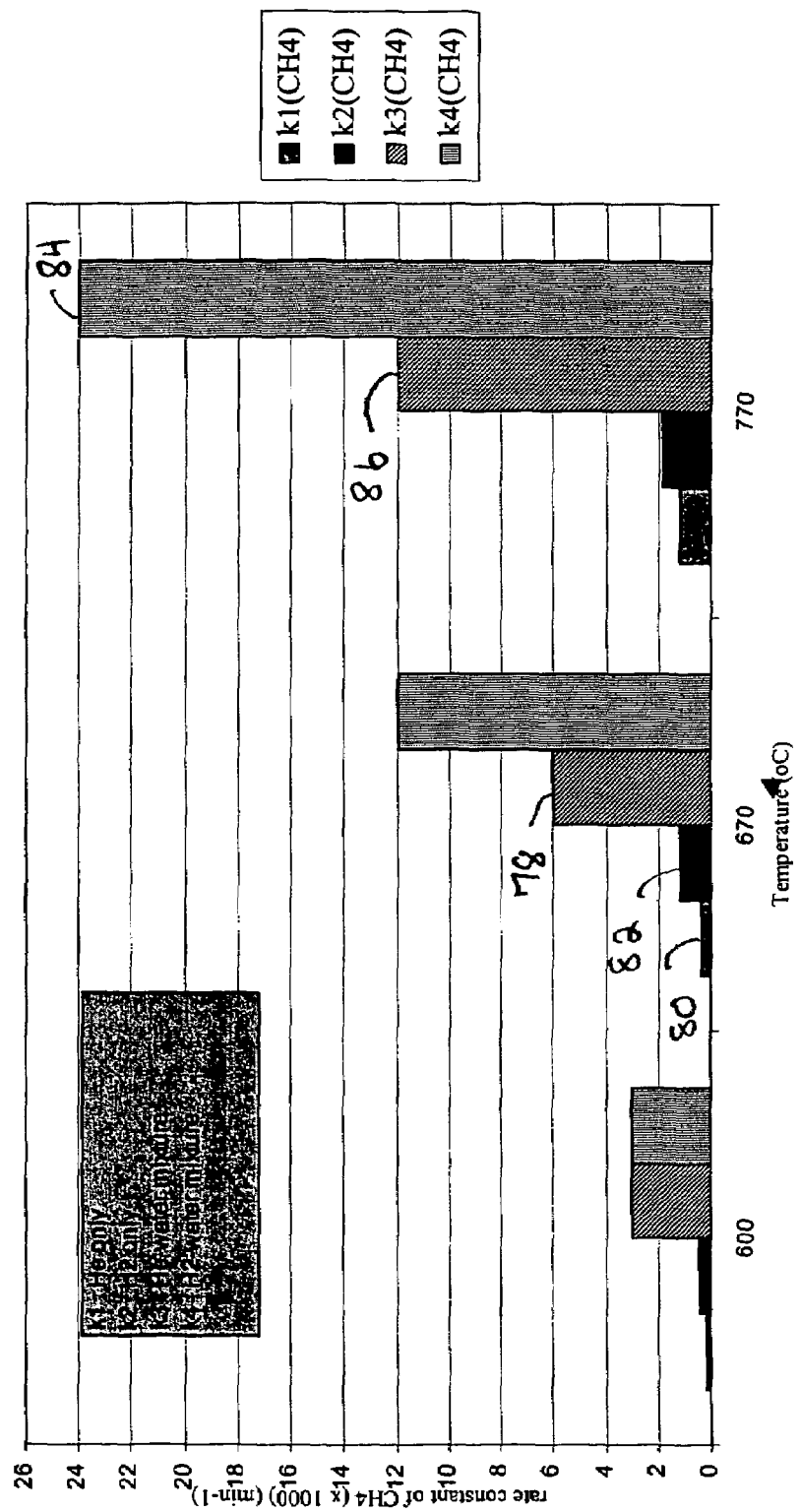
FIG. 41 is a graph of rate constant measurements for methane gas produced from pine wood material.

FIG. 41 provides a bar graph showing rate constants in moles per minute for the production of methane gas at different temperatures. At each temperature, the rate constant for steam pyrolysis with helium was greater than the rate constant for either dry pyrolysis process. For example, the rate constant 78 for steam pyrolysis at 670° C. was greater than the rate constant 80 for dry pyrolysis with helium and the rate constant 82 for dry pyrolysis with hydrogen. Further, at both 670° C. and 770° C., the rate constants for the combined process of steam pyrolysis and hydro-gasification were greater than the rate constants for steam pyrolysis alone. For example, at 770° C., the rate constant 84 for steam pyrolysis and hydro-gasification was about twice as great as the rate constant 86 for steam pyrolysis.

Figure 42:
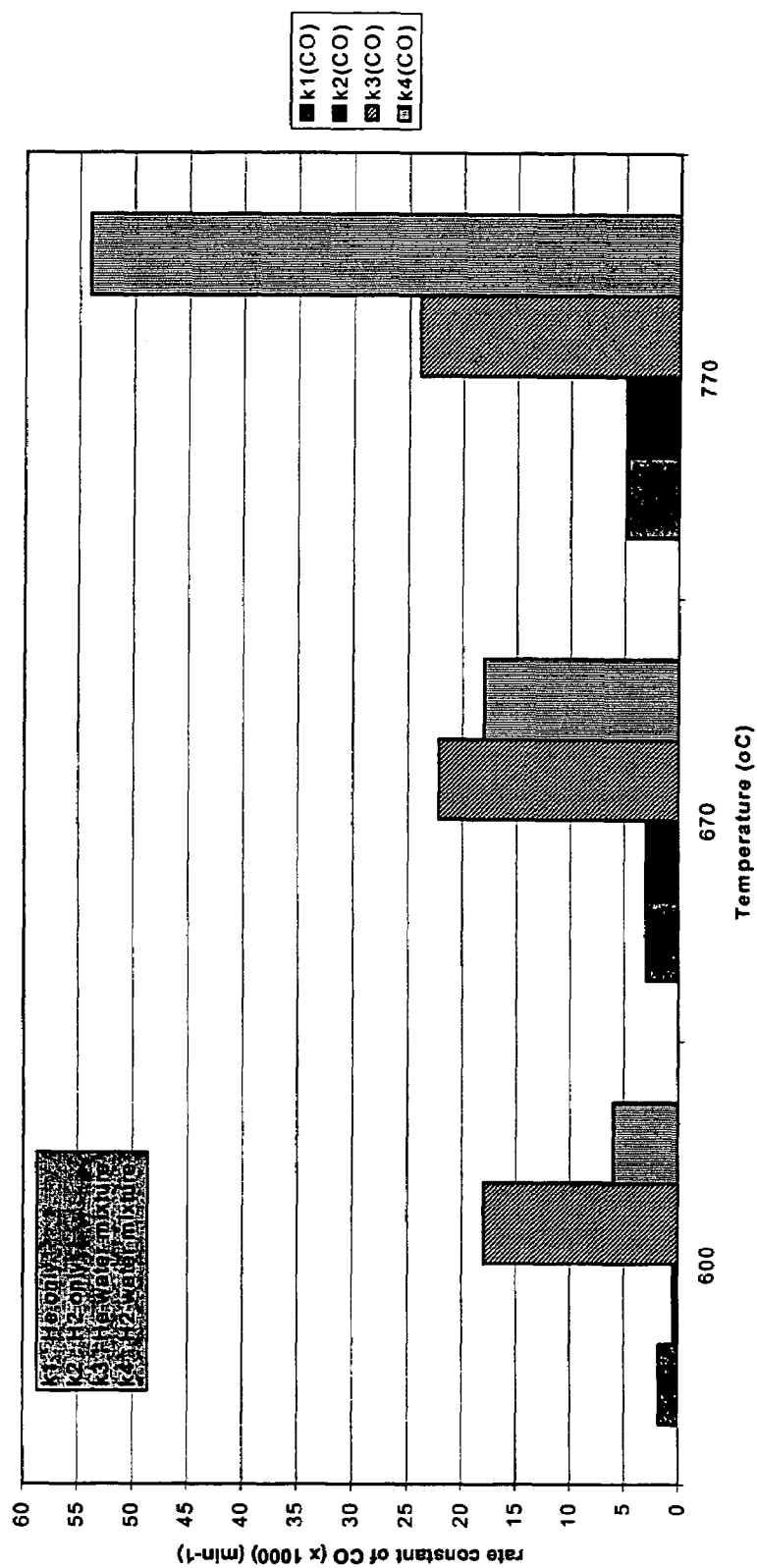
FIG. 42 is a graph of rate constant measurements for carbon dioxide gas produced from pine wood material.

Similar results are shown in FIG. 42, which provides a bar graph showing rate constants for the production of carbon monoxide at various temperatures. Again, at each temperature, the rate constant was greater for steam pyrolysis than for either dry pyrolysis process. Also, at 770° C., the rate constant for steam pyrolysis and hydro-gasification was greater than the rate constant for steam pyrolysis alone.

These results indicate that steam pyrolysis alone, or combined with hydro-gasification, can provide increased rates of production of methane gas and carbon monoxide from carbonaceous material, and that rates of production for the process of steam pyrolysis and hydro-gasification can exceed rates of production for the process of steam pyrolysis alone.

EXAMPLE 3

This example provides measurements of the total conversion of carbon to carbon containing gases for pine wood material subjected to the four pyrolytic processes.

Each pyrolytic process was carried out as described in Example 2.

Figure 43:
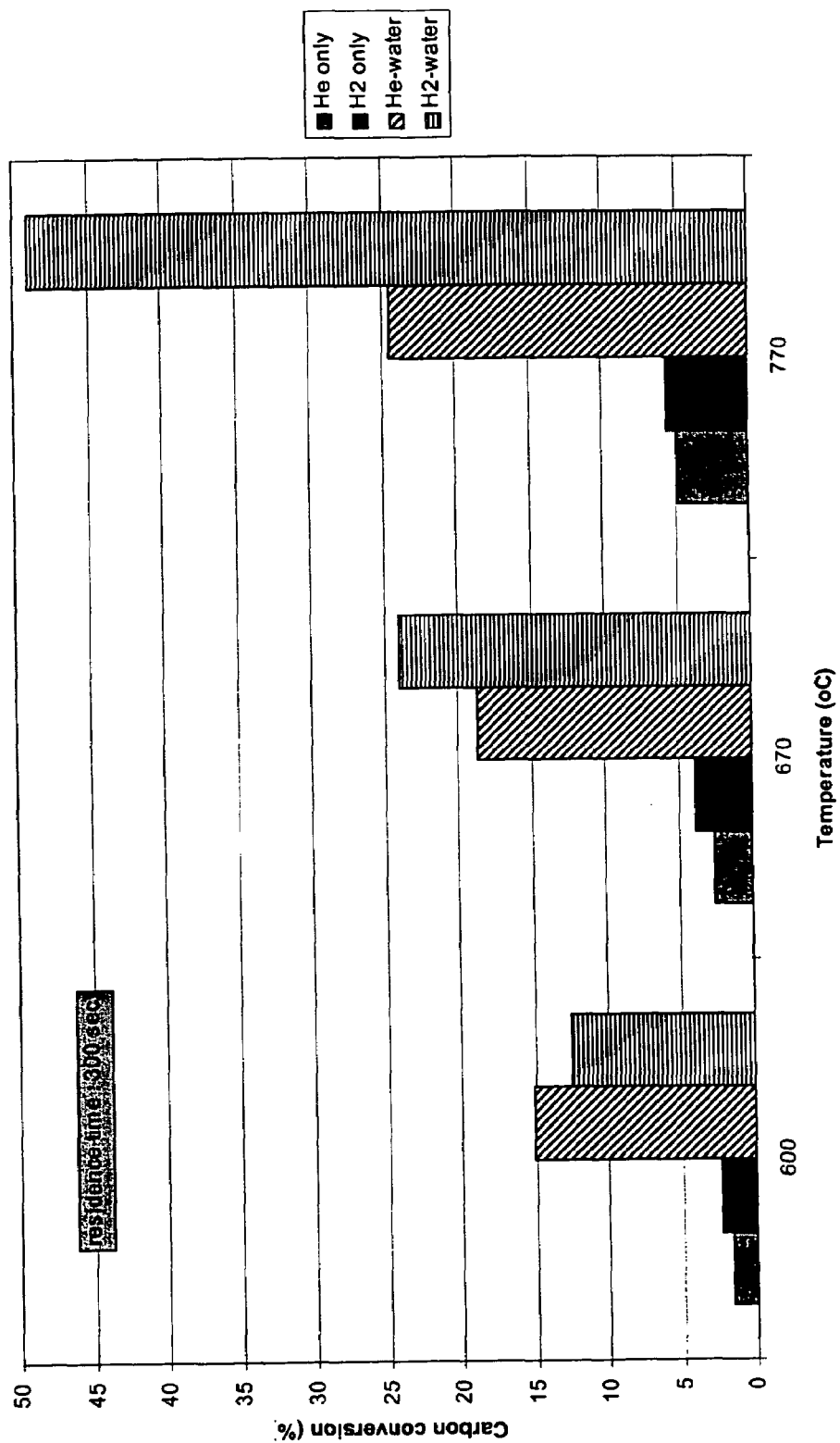
FIG. 43 is a graph showing the % carbon conversion for pine wood material at various temperatures.

FIG. 43 is a bar graph showing the % conversion of carbon to carbon containing gases at different temperatures. At each temperature, the % conversion was greater for steam pyrolysis than for either dry pyrolysis process. In addition, at 670° C., and 770° C., the % conversion for steam pyrolysis and hydro-gasification was greater than the % conversion for steam pyrolysis alone.

These data indicate that steam pyrolysis alone, or combined with hydro-gasification, can enhance the total conversion of carbon to carbon containing gases, and that conversion by steam pyrolysis and hydro-gasification can be greater than by steam pyrolysis alone. Further, the advantages of steam pyrolysis and hydro-gasification can improve with increasing temperature.

EXAMPLE 4

This example provides an analysis of the gas species produced from pine wood material subjected to one of the four pyrolytic processes.

Each pyrolytic reaction was carried out as in Example 1 at a reactor temperature of about 770° C.

Figure 44:
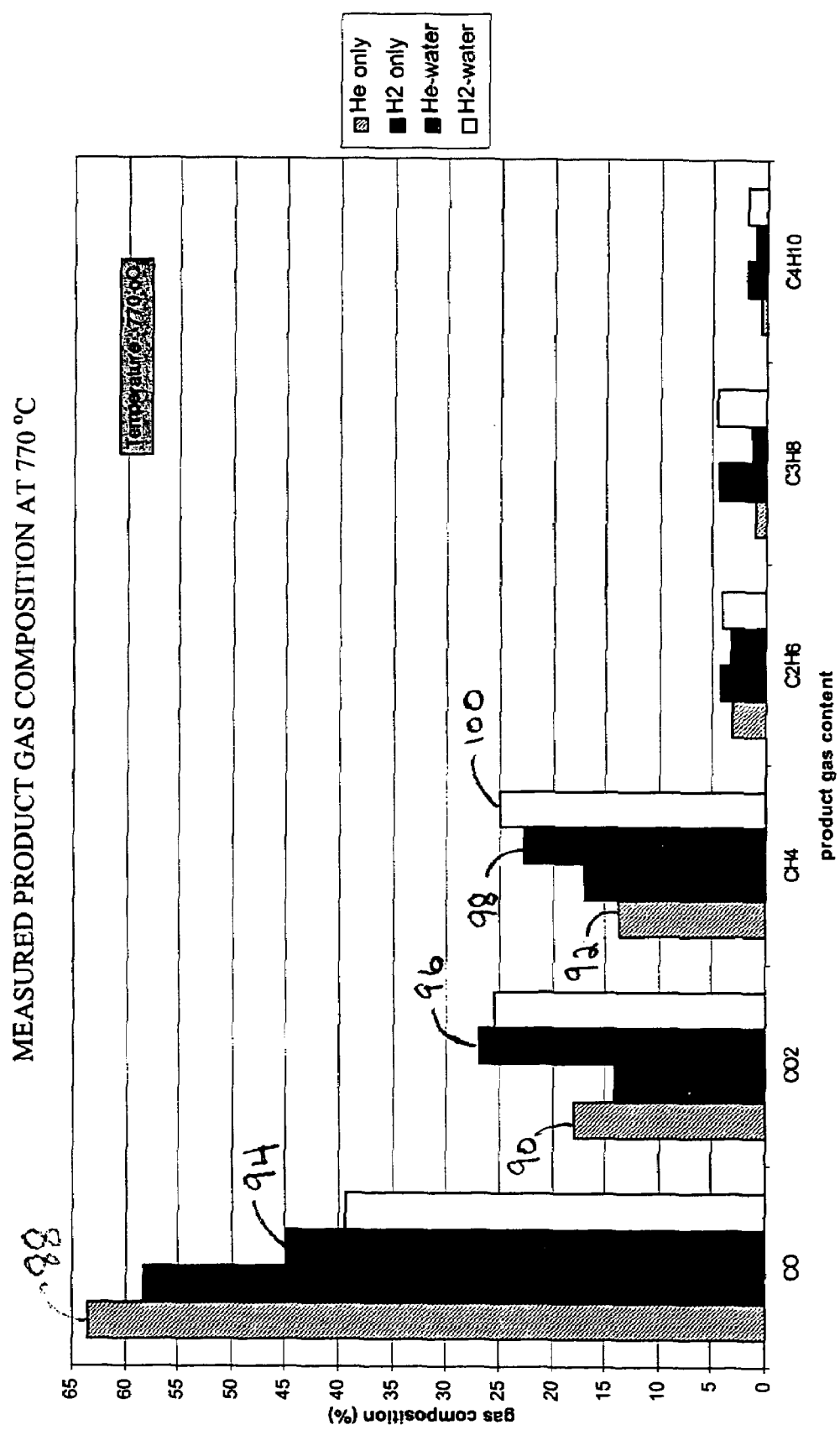
FIG. 44 is a graph of product gas composition at 770° C. for pine wood material.

FIG. 44 is a bar graph showing the product gas composition for each pyrolytic process. The results indicate that steam pyrolysis can shift the product gases away from the oxides of carbon and to the hydrocarbon gases, with methane in the lead. For example, dry pyrolysis with helium produced a gas composition 88 for carbon monoxide of about 64% and a gas composition 90 for carbon dioxide of about 18%, for a total carbon oxides composition of about 82%. The gas composition 92 for methane was about 14% for dry pyrolysis with helium. With steam pyrolysis, the gas composition 94 for carbon monoxide was about 45% and the gas composition 96 for carbon dioxide about 26%, for a total carbon oxides composition of about 71%, while the gas composition 98 for methane was raised to about 22%.

In addition, the methane composition 100 for steam pyrolysis and hydro-gasification was greater than the methane composition 98 for steam pyrolysis alone. The results indicate that the process of steam pyrolysis and hydro-gasification can provide more hydrocarbon gases than steam pyrolysis alone.

EXAMPLE 5

This example provides measurements of carbon conversion into energetic gases for pine wood subjected to the four pyrolytic processes.

Each pyrolytic reaction was carried out as described in Example 2.

Figure 45:
FIG. 45 is a graph showing carbon conversion into energetic gases for pine wood material at various temperatures.

FIG. 45 is a bar graph showing the % carbon conversion into energetic gases at different temperatures. The energetic gases included all gases produced except carbon dioxide and water vapor. The % carbon conversion was greater for steam pyrolysis than for either dry pyrolysis process. Also, at 670° C. and 770° C., the % carbon conversion for steam pyrolysis and hydro-gasification was greater than the % carbon conversion for steam pyrolysis alone.

These results indicate that steam pyrolysis alone, or steam pyrolysis combined with hydro-gasification, can enhance the total conversion of carbon into energetic gases, and also indicate that conversion by steam pyrolysis and hydro-gasification can be greater than by steam pyrolysis alone. In addition, the advantages of steam pyrolysis and hydro-gasification over steam pyrolysis alone can improve with increasing temperature.

EXAMPLE 6

This example provides % carbon conversion at various particle sizes in a micro-batch reactor.

Dry pyrolysis with hydrogen, and steam pyrolysis combined with hydro-gasification, were carried out as in Example 1. The temperature range was about 660-680° C. Three nominal particle size ranges were evaluated: less than about 425 microns (0.425 mm diameter); about 425-500 microns (0.425-0.500 mm diameter); and about 500-1000 microns (0.500-1 mm diameter).

Figure 46:
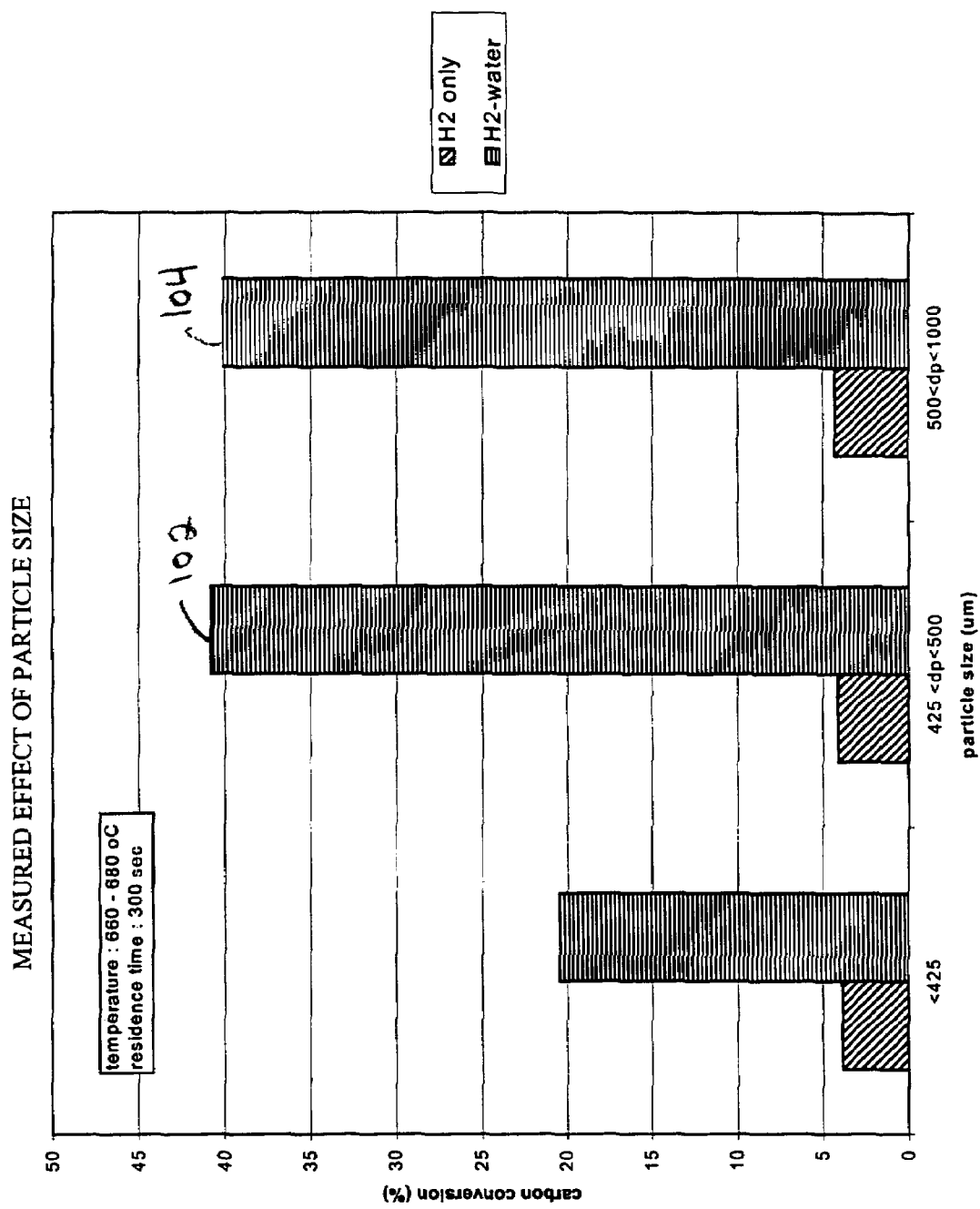
FIG. 46 is a graph of % carbon conversion of pine wood material at various particle sizes.

FIG. 46 is a bar graph showing % carbon conversion at different particle size ranges. The % carbon conversion 102 for steam pyrolysis and hydro-gasification in the 425-500 micron particle size range was similar to the % carbon conversion 104 for steam pyrolysis and hydro-gasification in the 500-1000 microns particle size range. In this experiment, particle sizes less than 1000 microns did not appear to enhance carbon conversion in the micro-batch reactor under the experimental conditions employed.

EXAMPLE 7

This example shows gas production from pine wood material at various micro-batch reactor pressures.

Steam pyrolysis combined with hydro-gasification was performed as in Example 1 at a temperature range of about 770-790° C., with a nominal pine wood particle size of less than about 425 microns, and a pressure of about 10 bar (132 psig) or 39 bar (560 pi).

Figure 47:
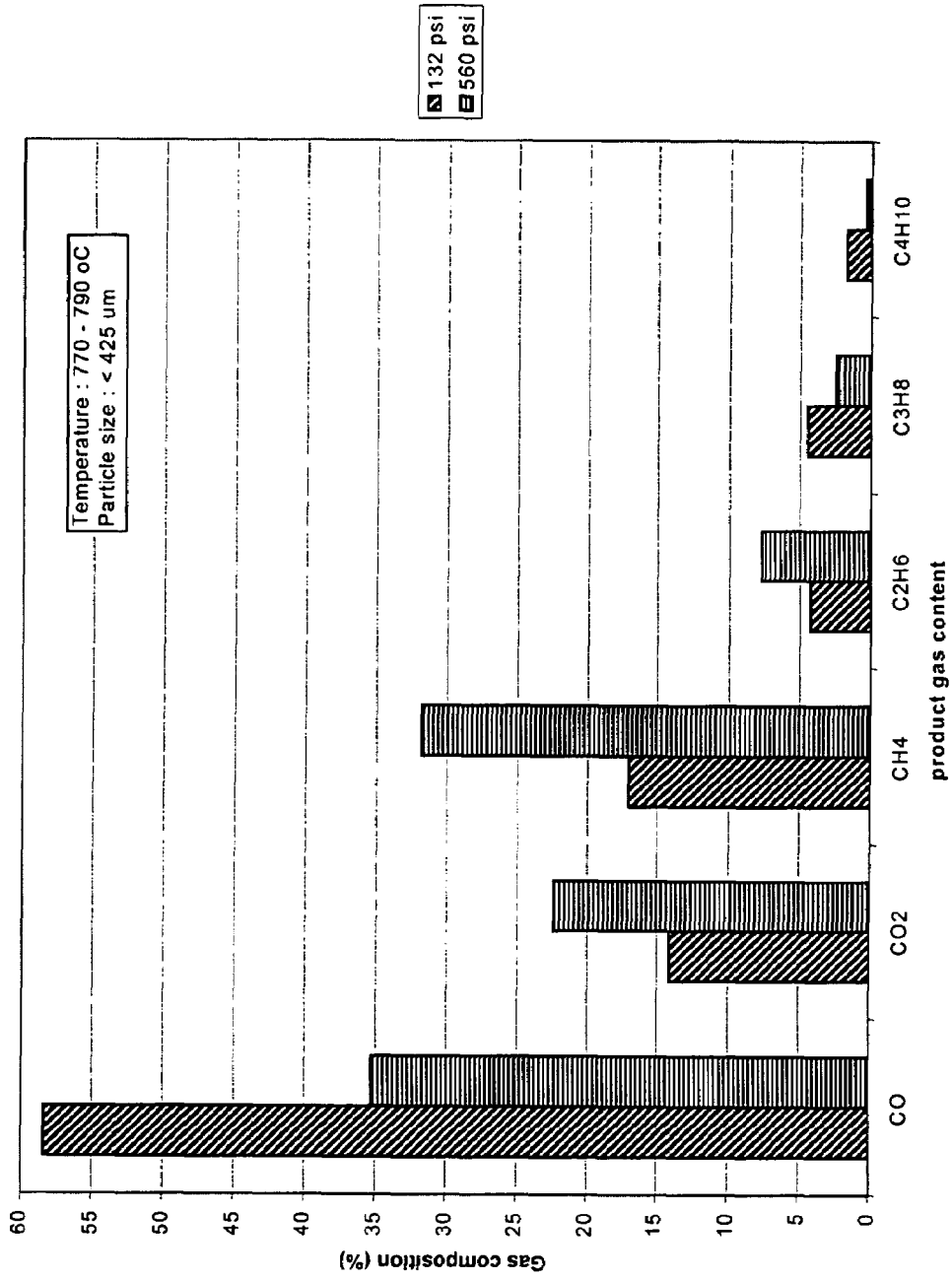
FIG. 47 is a graph of gas production from pine wood material at various reactor pressures.

FIG. 47 is a graph showing the product gas composition for each of the most abundant gas species produced at the two different pressures. Similar to the results of Example 4 and FIG. 6, the total gas composition of carbon monoxide and carbon dioxide at high pressure was less than the total gas composition of the carbon oxides at low pressure. Also, the methane composition was greater at higher pressure. These results indicate that an increase in pressure can push the reduction of carbon in the direction of hydrocarbon gases at the expense of carbon oxides. This can provide a process which promotes the production of methane gas while simultaneously reducing the production of carbon oxides.

EXAMPLE 8

This example provides the results of experiments in which polyurethane foam material was subjected to steam pyrolysis and hydro-gasification at different temperatures and pressures.

Figure 48:
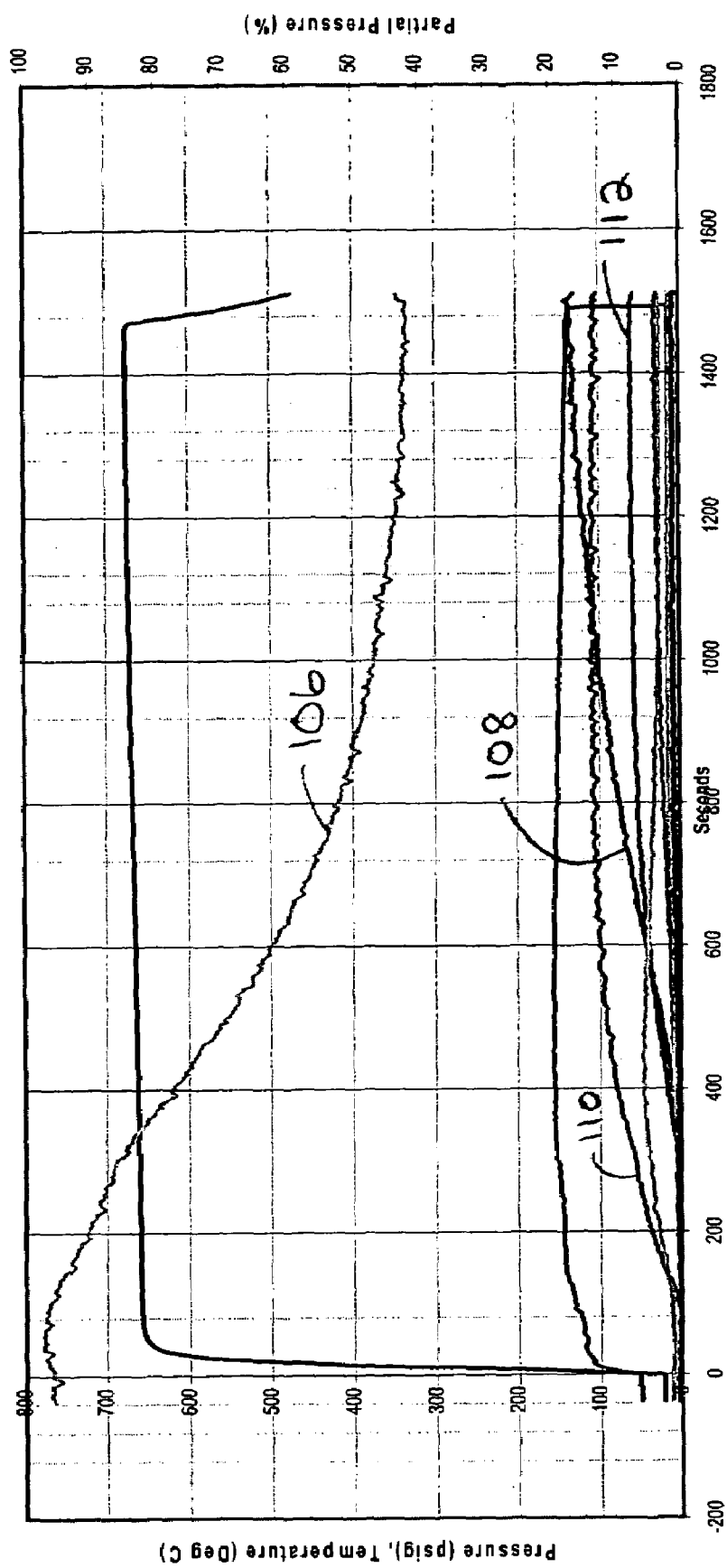
FIG. 48 is data record display of gas species produced from polyurethane foam material at 660° C.

The combination of steam pyrolysis and hydro-gasification was carried out as in Example 1, with ground polyurethane foam material of about 0.5 to 1 mm in diameter as the carbonaceous material. FIG. 48 provides the results for a reaction carried out at a temperature of about 660° C., a starting pressure of about 11.0 bar, and a steam to sample mass ratio of about 0.5:1. Partial pressure values over time are shown for hydrogen 106, methane 108, carbon monoxide 110, and carbon dioxide 112.

Figure 49:
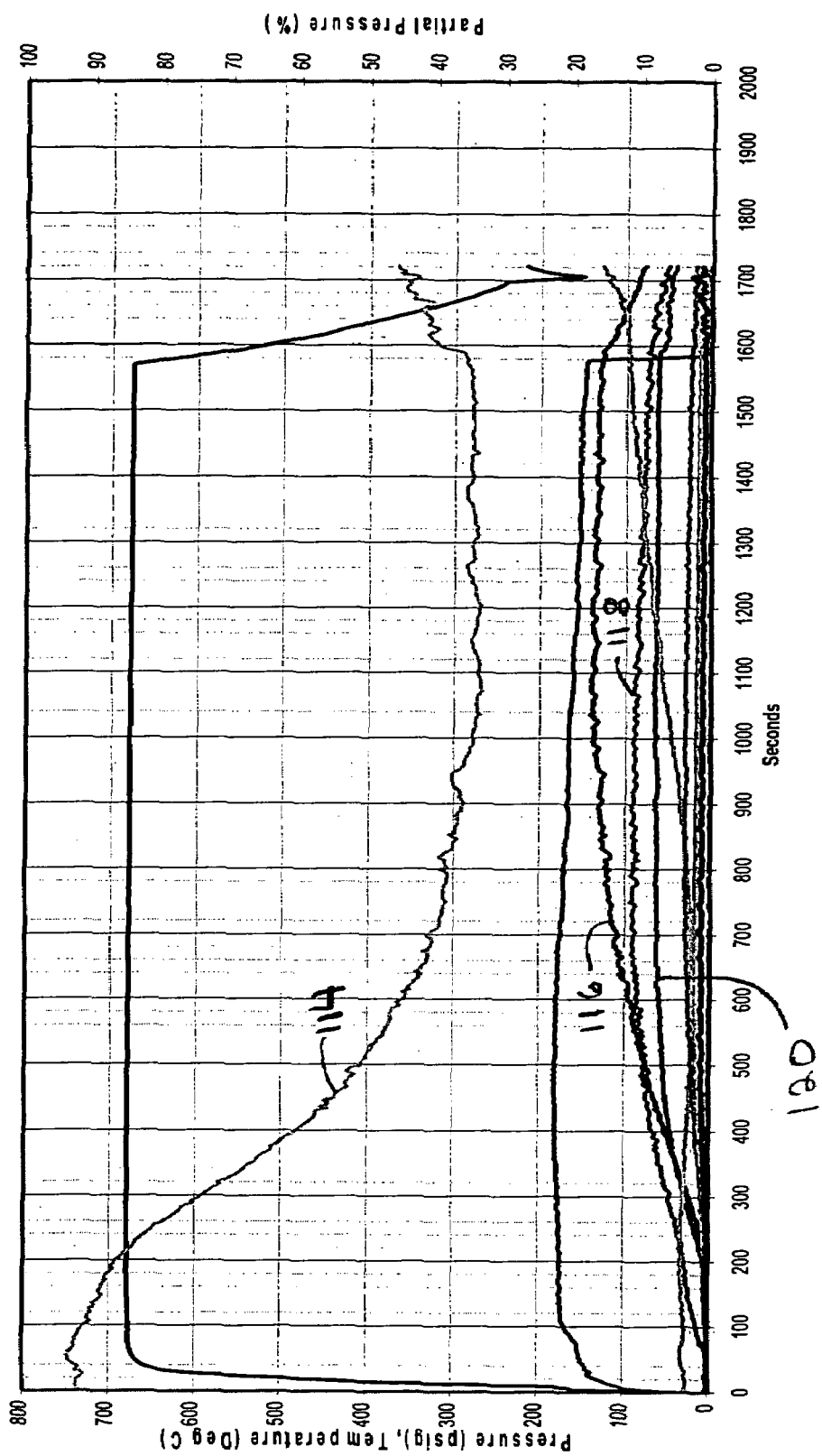
FIG. 49 is data record display of gas species produced from polyurethane foam material at 680° C. and a starting pressure of 12.4 bar.

FIG. 49 provides the results for a reaction carried out at a temperature of about 680° C., a starting pressure of about 12.4 bar, and a steam to sample mass ratio of about 1:1. Partial pressure values over time are shown for hydrogen 114, methane 116, carbon monoxide 118, and carbon dioxide 120.

Figure 50:
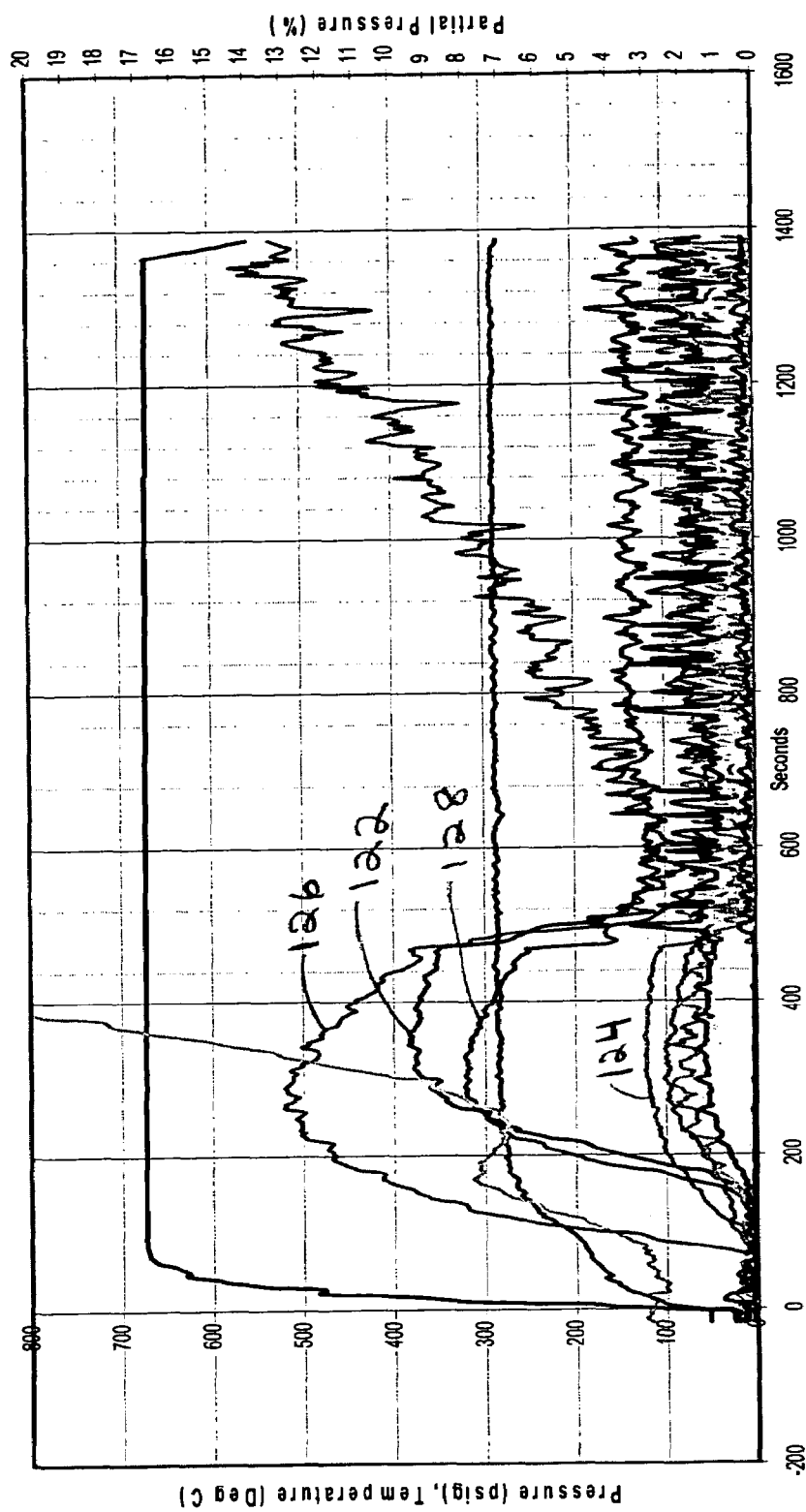
FIG. 50 is data record display of gas species produced from polyurethane foam material at 680° C. and a starting pressure of 19.3 bar.

FIG. 50 provides the results for a reaction carried out at a temperature of about 680° C., a starting pressure of about 19.3 bar, and a steam to sample mass ratio of about 2:1. Partial pressure values over time are shown for methane 122, $C_3H_8$ 124, carbon monoxide 126, and carbon dioxide 128.

EXAMPLE 9

This example provides the results of experiments in which polyvinylchloride ("PVC") material was subjected to steam pyrolysis and hydro-gasification.

Figure 51:
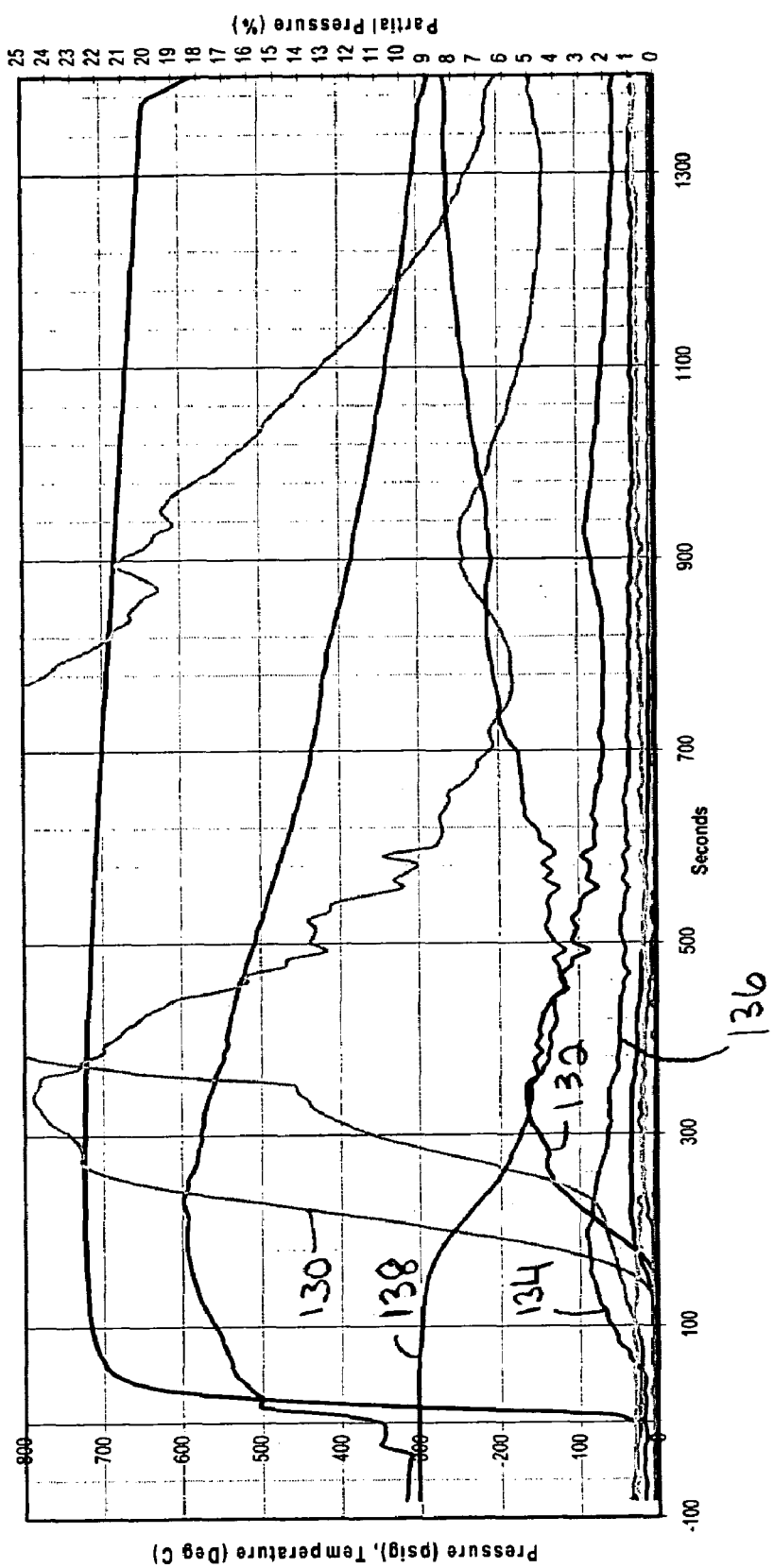
FIG. 51 is data record display of gas species produced from polyvinylchloride material at 720° C.

Steam pyrolysis was carried out as in Example 1, with ground PVC material of about 0.5 to 1 mm in diameter as the carbonaceous material and argon gas substituting for helium as the inert gas. FIG. 51 provides the results for a steam pyrolysis reaction carried out at a temperature of about 720° C., a starting pressure of about 41.4 bar, and a steam to sample mass ratio of about 1:1. Partial pressure values over time are shown for hydrogen 130, methane 132, carbon monoxide 134, carbon dioxide 136, and argon gas 138.

Figure 52:
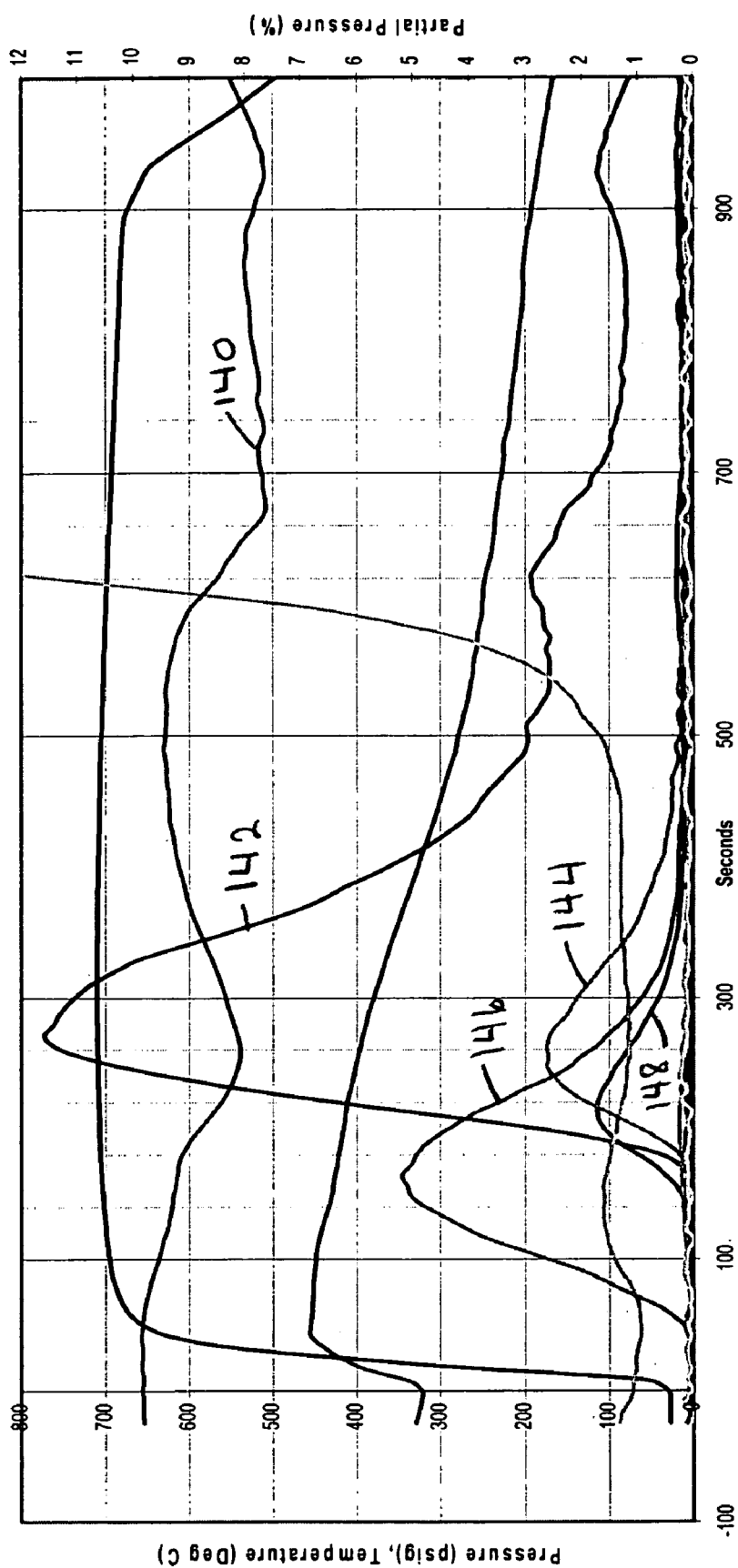
FIG. 52 is data record display of gas species produced from polyvinylchloride material at 700° C.

The combination of steam pyrolysis and hydro-gasification was carried out as in Example 1, at a temperature of about 700° C., a starting pressure of about 31.0 bar, and a steam to sample mass ratio of about 1:1. FIG. 52 provides the results of the reaction. Partial pressure values over time are shown for hydrogen 140 (values shown as $H_2/10$), methane 142, $C_2H_6$ 144, carbon monoxide 146, and carbon dioxide 148.

EXAMPLE 10

This example provides the results of experiments in which polymeric tire rubber material was subjected to steam pyrolysis and hydro-gasification.

Figure 53:
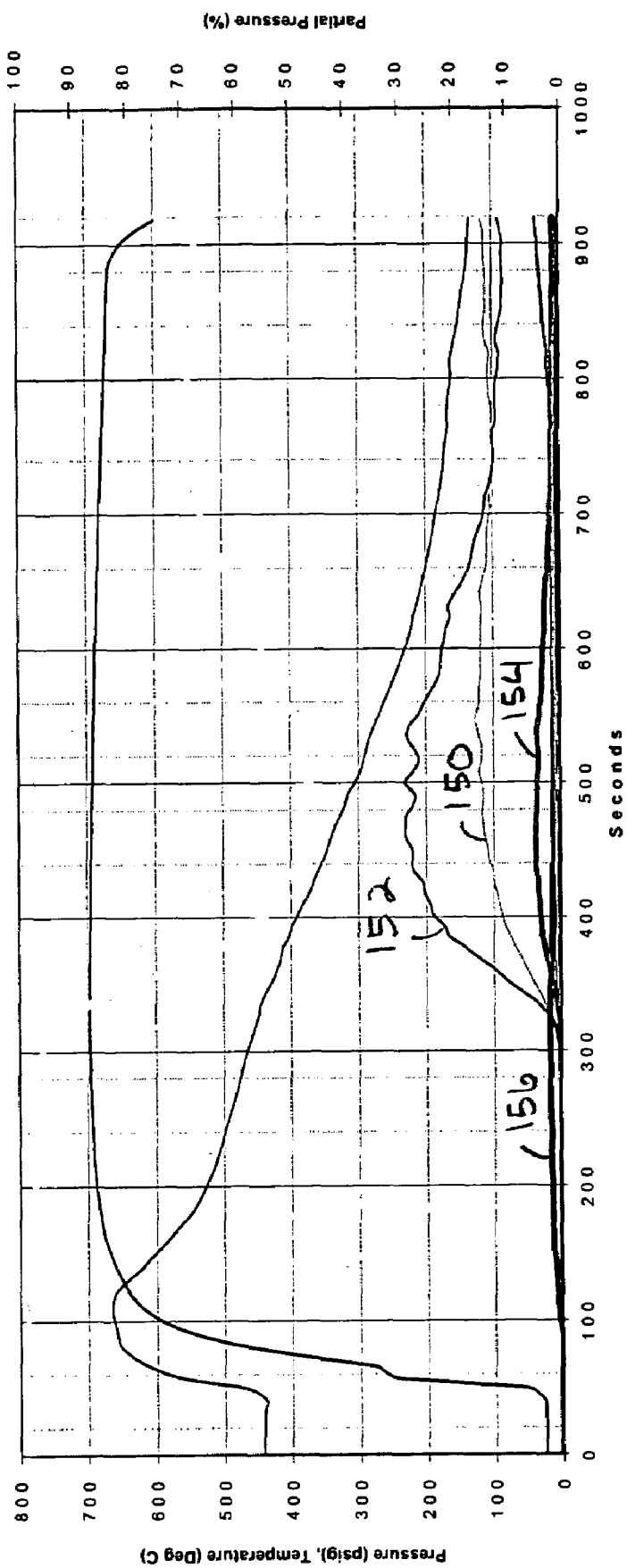
FIG. 53 is data record display of gas species produced from polymeric tire rubber material at 700° C. and a starting pressure of 45.5 bar.

Steam pyrolysis in helium gas was carried out as in Example 1, with ground polymeric tire rubber material of about 0.5 to 1 mm in diameter as the carbonaceous material. FIG. 53 provides the results for a reaction carried out at a temperature of about 700° C., a starting pressure of about 45.5 bar, and a steam to rubber mass ratio of about 1:1. Partial pressure values over time are shown for hydrogen 150, methane 152, $C_2H_6$ 154, and carbon monoxide 156.

Figure 54:
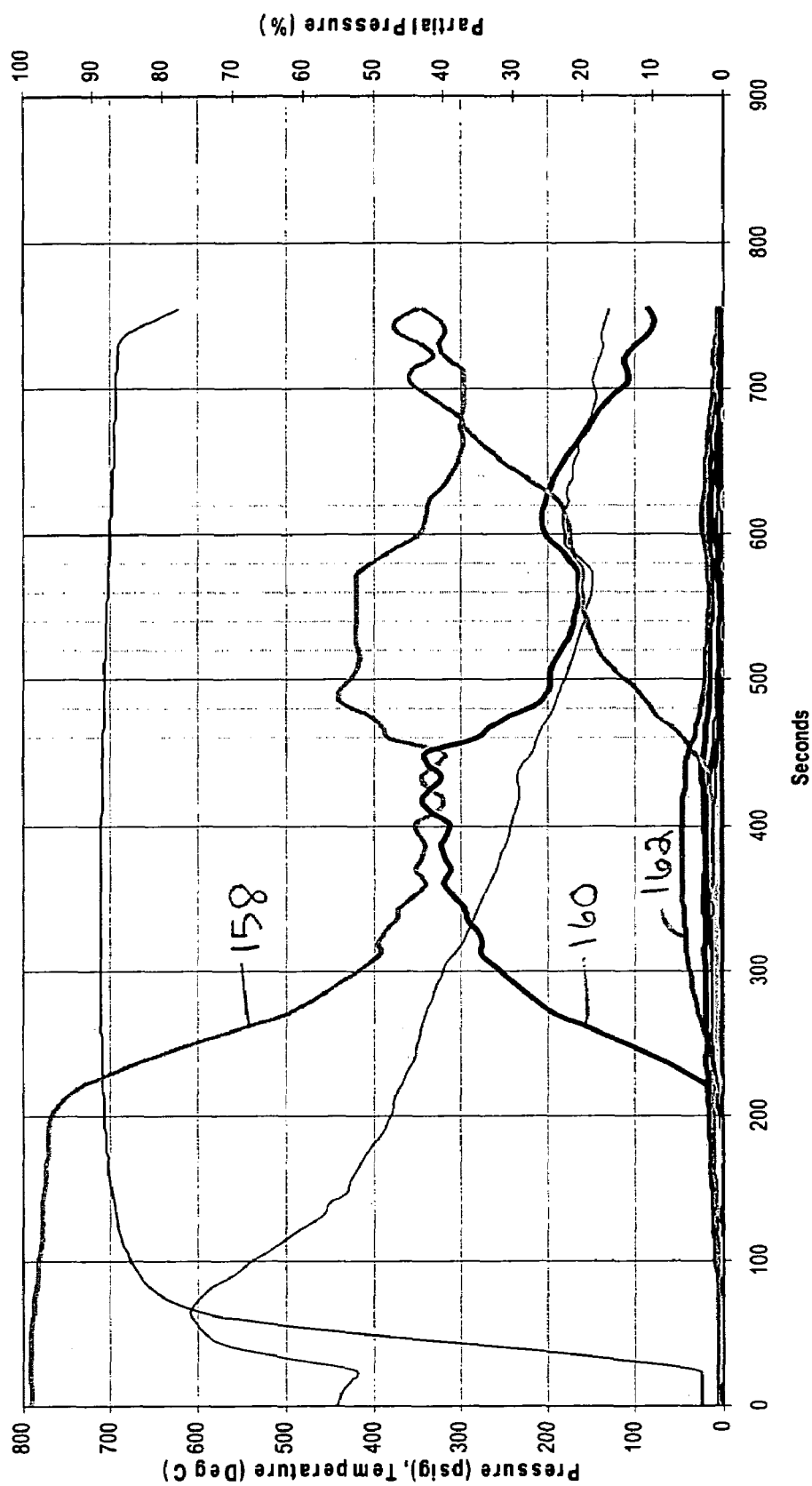
FIG. 54 is data record display of gas species produced from polymeric tire rubber material at 700° C. and a starting pressure of 41.4 bar.

FIG. 54 provides the results for a reaction combining steam pyrolysis and hydro-gasification, carried out at a temperature of about 700° C., a starting pressure of about 41.4 bar, and a steam to sample mass ratio of about 1:1. Partial pressure values over time are shown for hydrogen 158, methane 160, and $C_2H_6$ 162.

Quantitative data obtained from the experiments presented in Examples 8-10 are summarized in Table 9 for polyurethane foam ("PUF"), polyvinylchloride, and polymeric tire rubber ("TR"). The table lists: a) the process used—hydro-gasification ("HGR") and/or steam pyrolysis ("SPY"); b) the steam to sample mass ratio; c) the batch-reactor temperature maintained by the molten salt bath; d) the maximum internal batch-reactor pressure attained during the experiment; e) the time ("t m rate") from the start of the experiment for the major gaseous product, methane, to achieve its maximum production rate; f) the measured maximum rate of methane production ("d[CH4]/dt") in mole percent per second; and g) the ratio of the value defined above to the standard value for hydro-gasification without steam pyrolysis.

The results for the polyurethane foam material show that the use of steam pyrolysis can enhance the kinetic rate for the production of methane. In these experiments, the maximum enhancement measured, for a steam to sample mass ratio of 2, is a factor of 5.9 faster than the rate measured for a steam to sample mass ratio of 0.5. Thus, increasing the quantity of steam used in the steam pyrolysis process can enhance the hydro-gasification rate for the production of methane.

The results for the PVC material are listed next in Table 9. The measured rate of production of methane by steam pyrolysis and hydro-gasification was increased by a factor of 3 above that for steam pyrolysis alone.

Finally, the results of testing the polymeric tire rubber material are listed. The measured rate of production of methane by steam pyrolysis and hydro-gasification was increased by a factor of 1.5 above that for steam pyrolysis alone.

The results summarized in Table 9 indicate that increased methane production rates can be achieved in a hydrogasifier reactor when co-processing plastic and polymeric samples with steam pyrolysis.

EXAMPLE 11

In this example, coal was subjected to steam pyrolysis and hydro-gasification.

Steam pyrolysis and hydro-gasification were carried out as in Example 1, with coal as the carbonaceous material. The coal composition was about 74.9% wt carbon, 4.9% wt hydrogen, 1.2% wt nitrogen, 0.7% wt sulfur and 11.9% wt minerals. Proximate analysis of the coal showed about 24.0% wt moisture, 10.0% wt ash, 35.2% wt vol. mat., 52.4% wt Fix. [C], and mesh 60. The nominal start conditions for all experiments were sample mass of about 100 mg, salt bath set temperature of about 700° C., and gasification agent fill pressure of about 6.0 bar at about 22° C.

Table 10 provides the results for the processes of dry pyrolysis with hydrogen gas ("Dry HGR"), dry pyrolysis with helium gas ("Dry pyro."), steam pyrolysis with helium gas ("SPY"), and combined steam pyrolysis and hydro-gasification ("HGR+SPY"). The table lists: a) the gas used; b) the water to coal sample mass ratio ("[H2O]/[C]"); c) the measured methane production rate ("d[CH4]/dt"), normalized for any changes in the absolute pressure in the reactor; d) relative methane production rate ratio ("dry He [CH4]/dt"), normalized to the methane production rate of dry pyrolysis with helium gas; and e) relative methane production rate ratio ("dry H2 [CH4]/dt"), normalized to the methane production rate of dry pyrolysis with hydrogen gas.

The results show that combining steam pyrolysis and hydro-gasification can enhance the methane production from the volatile matter in the coal. In these experiments, the methane production rate of steam pyrolysis in the presence of helium gas was greater by a factor of over 42 times the rate without water present. Similarly, the methane production rate of dry pyrolysis with hydrogen gas was enhanced by about 40% over the rate of dry pyrolysis using an inert gas, helium. However, there was a significant increase in the methane production rate when hydro-gasification and steam pyrolysis were combined. For example, the methane production rate was increased by close to a factor of 10, when the water to coal mass ratio was about 1.5, and by a factor well over 100 times the dry hydropyrolysis rate when the water to coal mass ratio was about of 3.0.

Figure 55:
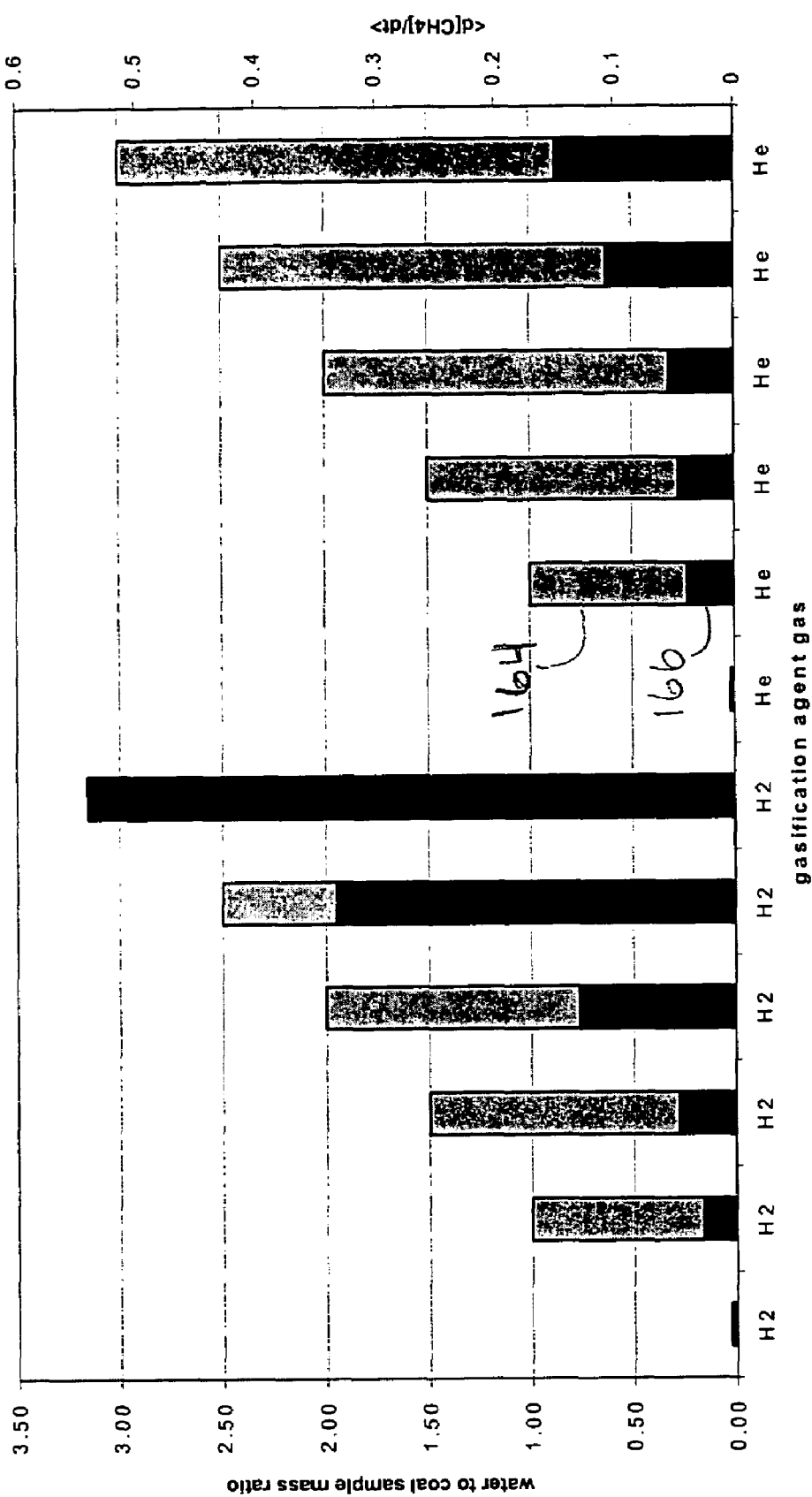
FIG. 55 is a graph of methane production rates under different pyrolysis conditions.

These same results are shown graphically in the form of a bar chart in FIG. 55, where, for example, the water to coal mass ratio 164 for one bar (read from the left axis) is positioned over the methane production rate 166 of the same bar (read from the right axis).

These results indicate that combining steam pyrolysis with hydro-gasification of coal can enhance methane production rates.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include within their scope such processes and apparatuses.

TABLE 1

| Biomass conversion optimized for production of Fischer-Tropsch Paraffins | | | | | | |
|---|---|---|---|---|---|---|
| | Energy rate in (MW) | | | Energy rate out (MW) | | |
| Component | PCE | Heat | Work | PCE | Heat | Work |
| Heat Exchangers | | | | | | |
| HX1 | | 53.4 | | | 53.4 | |
| HX 2 | | | | | | |
| Portion 1 | | | | | 78.8 | |
| Portion 2 | | | | | 212.9 | |

TABLE 1-continued

Biomass conversion optimized for production of Fischer-Tropsch Paraffins

| Component | Energy rate in (MW) PCE | Energy rate in (MW) Heat | Energy rate in (MW) Work | Energy rate out (MW) PCE | Energy rate out (MW) Heat | Energy rate out (MW) Work |
|---|---|---|---|---|---|---|
| HX 3 | | | | | | |
| Portion 1 | | 2.2 | | | 2.2 | |
| Portion 2 | | | | | 112.0 | |
| HX 4 (HGR) | | 50.2 | | | | |
| HX 5 (SPR) | | 93.3 | | | | |
| HX 6 | | | | | | |
| Portion 1 | | | | | 46.6 | |
| Portion 2 | | | | | 8.7 | |
| HX 7 | | 216.3 | | | | |
| HX 8 | | 43.3 | | | | |
| Portion 1 of HX 2 | | 78.8 | | | | |
| HX 9 (FTR) | | | | | 45.9 | |
| HX 10 | | | | | 11.8 | |
| HX G1 | | | | | 165.0 | |
| HX G2 | | | | | 21.8 | |
| HX G3 | | | | | 68.4 | |
| Hydraulic Power | | | | | | |
| Slurry Pump | | | 0.3 | | | |
| Liquid State Water Turbine | | | | | | 0.2 |
| Brayton Cycle | | | | | | |
| Turbine 1 | | | | | | 7.9 |
| Turbine 2 | | | | | | 75.0 |
| Turbine 3 | | | | | | 0.0 |
| Air Compressor | | | 43.4 | | | |
| Rankine Cycle | | | | | | |
| Heat | | 290.0 | | | | |
| Mechanical Power | | | 0.5 | | | 103.5 |
| Waste Heat From Steam Cycle | | | | | 186.9 | |
| Chemical Conversion Process | | | | | | |
| synthetic paraffins produced | | | | 137 | | |
| synthetic diesel fuel produced* | | | | 116 | | |
| Input into Conversion Process | | | | | | |
| Biomass (waste wood) input PCE | 473.0 | | | | | |
| Overall Energy Balances | | | | | | |
| Total Energy | 473.0 | 827.3 | 44.1 | 137 | 1014.2 | 186.6 |
| Net Waste Heat Rejected | | | | | 186.9 | |
| Net Input Energy Required | | 0.0 | | | | |
| Power Conversion Process | | | | | | |
| Net Electricity Production | | | | | | 123.8 |
| Total Electricity Available for Export | | | | | | 123.8 |

TABLE 1-continued

Biomass conversion optimized for production of Fischer-Tropsch Paraffins

| Component | Energy rate in (MW) PCE | Energy rate in (MW) Heat | Energy rate in (MW) Work | Energy rate out (MW) PCE | Energy rate out (MW) Heat | Energy rate out (MW) Work |
|---|---|---|---|---|---|---|
| Overall Thermodynamic Conversion Efficiency | | | | | | 50.7% | notes
*synthetic paraffins produced are considered to be 50% cetane and 50% wax
wax can be conventionally processed to produce cetane with 70% efficiency

TABLE 2

Biomass conversion optimized for production of dimethyl ether (DME)

| Component | Energy rate in (MW) PCE | Energy rate in (MW) Heat | Energy rate in (MW) Work | Energy rate out (MW) PCE | Energy rate out (MW) Heat | Energy rate out (MW) Work |
|---|---|---|---|---|---|---|
| Heat Exchangers | | | | | | |
| HX 1 | | 53.4 | | | 53.4 | |
| HX 2 | | | | | | |
| Portion 1 | | | | | 54.5 | |
| Portion 2 | | | | | 160.0 | |
| HX 3 | | | | | 3.8 | |
| HX 4 (HGR) | | 50.2 | | | | |
| HX 5 (SPR) | | 91.3 | | | | |
| HX 6 | | | | | 36.6 | |
| HX 7 | | 152.8 | | | | |
| HX 8 | | 29.9 | | | | |
| Portion 1 of HX 2 | | 54.5 | | | | |
| HX 9 (DME-R) | | | | | 32.3 | |
| HX 10 | | | | | 0.7 | |
| HX 11 | | | | | 1.6 | |
| HX 12 | | | | | 3.2 | |
| HX G1 | | | | | 150.2 | |
| HX G2 | | | | | 21.3 | |
| HX G3 | | | | | 66.8 | |
| HX G4 | | | | | | |
| Portion 1 (to HX 7) | | | | | 49.4 | |
| Portion 2 (to HX 2) | | | | | 64.5 | |
| Hydraulic Power | | | | | | |
| Slurry Pump | | | 0.2 | | | |
| Liquid State Water Turbine | | | | | | 0.1 |
| Brayton Cycles | | | | | | |
| Turbine 2 | | | | | | 3.4 |
| Turbine 3 | | | | | | 4.0 |
| Turbine 4 | | | | | | 70.7 |
| Compressor | | | 5.2 | | | |
| Air Compressor | | | 39.8 | | | |
| Rankine Cycle | | | | | | |
| Heat (HX 3, 9, 10, 11, 12 & G4) | | 266.1 | | | | |
| Mechanical Power | | | 0.4 | | | 95.0 |
| Waste Heat From Steam Cycle | | | | | 171.5 | |
| Chemical Conversion Process | | | | | | |
| dimethyl ether (DME) production | | | | | 160.6 | |
| Input into | | | | | | |

TABLE 2-continued

Biomass conversion optimized for production of dimethyl ether (DME)

| Component | Energy rate in (MW) PCE | Heat | Work | Energy rate out (MW) PCE | Heat | Work |
|---|---|---|---|---|---|---|
| Conversion Process | | | | | | |
| Biomass (waste wood) input PCE | 473.0 | | | | | |
| Overall Energy Balances | | | | | | |
| Total Energy | 473.0 | 698.2 | 45.6 | 160.6 | 869.8 | 173.2 |
| Net Waste Heat Rejected | | | | | 171.5 | |
| Net Input Energy Required | | 0.0 | | | | |
| Power Conversion Process | | | | | | |
| Net Electricity Production | | | | | | 110.3 |
| Electricity Available for Export | | | | | | 110.3 |
| Overall Thermodynamic Conversion Efficiency | | | | | | 57.3% |

TABLE 3

Biomass conversion optimized for production of gaseous hydrogen fuel

| Component | Energy rate in (MW) PCE | Heat | Work | Energy rate out (MW) PCE | Heat | Work |
|---|---|---|---|---|---|---|
| Heat Exchangers | | | | | | |
| HX 1 | | 53.4 | | | 53.4 | |
| HX 2 | | | | | | |
| Portion 1 | | | | | 54.5 | |
| Portion 2 | | | | | 160.0 | |
| HX 3 | | | | | 105.4 | |
| HX 4 (HGR) | | 50.2 | | | | |
| HX 5 (SPR) | | 91.3 | | | | |
| HX 6 | | | | | 36.6 | |
| HX 7 | | 152.8 | | | | |
| HX 8 | | 29.9 | | | | |
| Portion 1 of HX 2 | | 54.5 | | | | |
| HX G1 | | | | | 151.0 | |
| HX G2 | | | | | 20.5 | |
| HX G3 | | | | | | |
| Portion 1 (to HX 7) | | | | | 10.7 | |
| Portion 2 (to HX 2) | | | | | 53.6 | |
| Hydraulic Power | | | | | | |
| Slurry Pump | | | 0.2 | | | |
| Liquid State Water Turbine | | | | | | 0.1 |
| Brayton Cycle | | | | | | |
| Turbine 1 | | | | | | 6.7 |
| Turbine 2 | | | | | | 57.3 |
| Air Compressor | | | 29.4 | | | |
| Rankine Cycle | | | | | | |
| Heat | | 213.6 | | | | |
| Mechanical Power | | | 0.4 | | | 76.3 |
| Waste Heat From Steam Cycle | | | | | 137.7 | |
| Chemical Conversion Process | | | | | | |
| Gaseous H2 fuel production | | | | 221.4 | | |
| Input into Conversion Process | | | | | | |
| Biomass (waste wood) input PCE | 473.0 | | | | | |
| Overall Energy Balances | | | | | | |
| Total Energy | 473.0 | 645.8 | 29.9 | 221.4 | 783.5 | 140.4 |
| Net Waste Heat Rejected | | | | | 137.7 | |
| Net Input Energy Required | | 0.0 | | | | |
| Power Conversion Process | | | | | | |
| Net Electricity Production | | | | | | 96.4 |
| Total Electricity Available for Export | | | | | | 96.4 |
| Overall Thermodynamic Conversion Efficiency | | | | | | 67.2% |

TABLE 4

Biomass conversion optimized for production of electric power

| Component | Energy rate in (MW) PCE | Heat | Work | Energy rate out (MW) PCE | Heat | Work |
|---|---|---|---|---|---|---|
| Heat Exchangers | | | | | | |
| HX 1 | | 53.4 | | | 53.4 | |
| HX 2 | | | | | | |
| Portion 1 | | | | | 78.8 | |
| Portion 2 | | | | | 212.9 | |
| HX 4 (HGR) | | 50.2 | | | | |
| HX 5 (SPR) | | 93.3 | | | | |

TABLE 4-continued

Biomass conversion optimized for production of electric power

| Component | Energy rate in (MW) | | | Energy rate out (MW) | | |
|---|---|---|---|---|---|---|
| | PCE | Heat | Work | PCE | Heat | Work |
| HX 6 | | | | | 55.2 | |
| HX 7 | | 216.3 | | | | |
| HX 8 | | 43.3 | | | | |
| Portion 1 of HX 2 | | 78.8 | | | | |
| HX G1 | | | | | 243.2 | |
| HX G2 | | | | | | |
| Portion 1 | | | | | 73.0 | |
| Portion 2 (for Steam Turbine 2) | | | | | 70.3 | |
| HX G3 | | | | | | |
| Portion 1 (to HX 2) | | | | | 77.1 | |
| Portion 2 (to HX 7) | | | | | 88.0 | |
| HX G4 (from cold side of HX G1) | | 56.4 | | | 56.4 | |
| Hydraulic Power | | | | | | |
| Liquid Pump | | | 0.3 | | | |
| Liquid State Turbine | | | | | | 0.2 |
| Rankine Cycle #1 | | | | | | |
| HX 2 (portion 2) | | 212.9 | | | | |
| HX G3 | | 77.1 | | | | |
| Mechanical Power | | | 0.5 | | | 103.5 |
| Waste Heat From Steam Cycle | | | | | 186.9 | |
| CPE of syntheisis gas fuel | | | | 596.8 | | |
| Brayton Cycle #1 | | | | | | |
| Turbine 1 | | | | | | 7.9 |
| Air Compressor | | | 64.6 | | | |
| Combined Cycles | | | | | | |
| Gas Cycle | | | | | | |
| Turbine 2 | | | | | | 109.3 |
| Steam Cycle 2 | | | | | | |
| HX G2 | | 70.3 | | | | |
| HX G4 | | 56.4 | | | | |
| Mechanical Power | | | 0.2 | | | 45.3 |
| Waste Heat From Steam Cycle | | | | | 81.7 | |
| Input into Conversion Process | | | | | | |
| Biomass (waste wood) input PCE | 473.0 | | | | | |
| Overall Energy Balances | | | | | | |
| Total Energy | 473.0 | 1008.3 | 65.5 | 596.8 | 1276.9 | 266.2 |
| Net Waste Heat Rejected | | | | | 268.6 | |
| Net Input Energy Required | | 0.0 | | | | |
| Power Conversion Process | | | | | | |
| Net Electricity Production | | | | | 180.6 | |
| Total Electricity Available for Export | | | | | | 180.6 |
| Overall Thermodynamic Conversion Efficiency | | | | | | 38.2% |

TABLE 5

Biomass conversion optimized for production of Fischer-Tropsch Paraffins with increased input water:bimass ratio = 9:1 and adiabatic HGR (AHGR)

| Component | Energy rate in (MW) | | | Energy rate out (MW) | | |
|---|---|---|---|---|---|---|
| | PCE | Heat | Work | PCE | Heat | Work |
| Heat Exchangers | | | | | | |
| HX 1 | | 22.8 | | | 22.8 | |
| HX 2 | | | | | | |
| Portion 1 | | | | | 49.0 | |
| Portion 2 | | | | | 151.1 | |
| HX 3 | | | | | | |
| Portion 1 | | | | | 56.4 | |
| Portion 2 | | | | | 24.8 | |
| HX 4 | | 23.6 | | | 23.6 | |
| HX 5 (SPR) | | 129.8 | | | | |
| HX 6 | | 32.8 | | | 32.8 | |

TABLE 5-continued

Biomass conversion optimized for production of Fischer-Tropsch Paraffins with increased input water:bimass ratio = 9:1 and adiabatic HGR (AHGR)

| Component | Energy rate in (MW) | | | Energy rate out (MW) | | |
|---|---|---|---|---|---|---|
| | PCE | Heat | Work | PCE | Heat | Work |
| HX 7 | | 603.4 | | | 481.8 | |
| HX 8 | | 15.9 | | | | |
| Portion 1 of HX 2 | | 49.0 | | | | |
| HX 9 (FTR) | | | | | 37.4 | |
| HX 10 | | | | | 37.3 | |
| HX G1 | | | | | 17.3 | |
| HX G2 | | | | | 122.0 | |
| HX G3 | | | | | 23.7 | |
| Portion 1 | | 18.8 | | | 18.8 | |
| Portion 2 | | | | | 8.0 | |
| Hydraulic Power | | | | | | |
| Liquid Pump | | | 0.6 | | | |
| Turbine 1 | | | | | | 7.3 |
| Turbine 2 | | | | | | 54.9 |
| Turbine 3 | | | | | | 0.0 |
| Brayton Cycle | | | | | | |
| Turbine 4 | | 20.5 | | | | 20.5 |
| Turbine 5 | | 103.5 | | | | 103.5 |
| Turbine 6 | | 1.0 | | | | 1.0 |
| Compressor | | | 2.8 | | | |
| Air Compressor | | | 31.2 | | | |
| Condenser Heat | | 85.8 | | | | |
| Turbine 7 & 8 | | | 0.1 | | | 23.6 |
| Waste Heat From Steam Cycle | | | | | 62.2 | |
| Chemical Conversion Process | | | | | | |
| synthetic paraffins produced | | | | 214.9 | | |
| synthetic diesel fuel produced* | | | | | | |
| Input into Conversion Process | | | | | | |
| Biomass (waste wood) input PCE | 473.0 | | | | | |
| Overall Energy Balances | | | | | | |
| Total Energy | 473.0 | 1106.9 | 34.7 | 214.9 | 1169.2 | 210.8 |
| Net Waste Heat Rejected | | | | | 62.2 | |
| Net Input Energy Required | | 0.0 | | | | |
| Power Conversion Process | | | | | | |
| Net Electricity Production | | | | | | 155.1 |
| Total Electricity Available for Export | | | | | | |
| Overall Thermodynamic Conversion Efficiency | | | | | | | notes
*synthetic paraffins produced are considered to be 50% cetane and 50% wax
wax can be conventionally processed to produce cetane with 70% efficiency

TABLE 6

Summary of Optimized Performance Studies for Biomass Conversion Options*

| Feed stock | feed rate kg/hr | MT/day | water/ biomass ratio | useful production per day | CPE rate MW ch | percent CPE input | | |
|---|---|---|---|---|---|---|---|---|
| Dry waste wood | 83775 | 2011 | | | 473.0 | 100.0% | | |
| Conversion Options | | | | | | | | |
| 1 Fischer-Tropsch Liquids (FTL) | | | | bbl/day | | | bbl/ton | MW h/ton |
| water fed used | 264670 | 6352 | 3.2 | | | | | |
| synthetic diesel fuel | 11526 | 277 | | 2231 | 116.0 | 24.5% | 1.11 | |
| electricity exported | | | | | 123.8 | 26.2% | | 1.48 |
| process water recovered | 295523 | 7093 | | | | | | |
| excess water available | 30853 | 740 | | | | | | |
| Air supply for combustion | 456047 | 10945 | | | | | | |
| CO2 produced | 122356 | 2937 | | | | | | |
| rejected waste heat | | | | | 187.0 | 39.5% | | |
| | | | | overall energy utilization | | 50.7% | | |
| 2 Dimethyl ether (DME) | | | | bbl/day # | | | bbl/ton | MW h/ton |
| water fed needed | 184387 | 4425 | 2.2 | | | | | |
| dimethyl ether produced | 20045 | 481 | | 4530 | 160.6 | 33.9% | 2.25 | |
| electricity exported | | | | | 110.3 | 23.3% | | 1.32 |
| process water recovered | 207334 | 4976 | | | | | | |
| excess water produced | 22947 | 551 | | | | | | |
| Air supply for combustion | 410739 | 9858 | | | | | | |
| CO2 produced | 119899 | 2878 | | | | | | |
| rejected waste heat | | | | | 171.5 | 36.3% | | |
| | | | | overall energy utilization | | 57.3% | | |
| 3 Gaseous Hydrogen (GH2) | | | | cu m/day + | | | cu m/ton | MW h/ton |
| water fed needed | 184387 | 4425 | 2.2 | | | | | |
| gaseous hydrogen (GH2) | 5618 | 135 | | 1899 | 221.4 | 46.8% | 0.94 | |
| electricity exported | | | | | 96.4 | 20.4% | | 1.15 |
| water produced | 180601 | 4334 | | | | | | |

TABLE 6-continued

Summary of Optimized Performance Studies for Biomass Conversion Options*

| Feed stock | feed rate kg/hr | MT/day | water/ biomass ratio | useful production per day | CPE rate MW ch | percent CPE input | | |
|---|---|---|---|---|---|---|---|---|
| excess water produced | −3785 | −91 | | | | | | |
| Air supply for combustion | 429682 | 10312 | | | | | | |
| CO2 produced | 158173 | 3796 | | | | | | |
| rejected waste heat | | | | | 137.7 | 29.1% | | |
| | | | | overall energy utilization | | 67.2% | | |
| 4 All Electric Power (AEP) | | | | MW eh/day | | | MW h/ton | |
| water fed needed | 260393 | 6249 | 3.1 | | | | | |
| electricity exported | | | | 4335 | 180.6 | 38.2% | 2.16 | |
| water produced | 311110 | 7467 | | | | | | |
| excess water produced | 50717 | 1217 | | | | | | |
| Air supply for combustion | 678774 | 16291 | | | | | | |
| CO2 produced | 158144 | 3795 | | | | | | |
| rejected waste heat | | | | | 230.0 | 48.6% | | |
| | | | | overall energy utilization | | 38.2% | | |
| 5 FTL with water:biomass at 9:1 and adaiabatic HGR (AHGR) | | | | bbl/day | | | bbl/ton | MW h/ton |
| water fed used | 753975 | 18095 | 9.0 | | | | | |
| synthetic diesel fuel | 18147 | 436 | | 3512 | 182.7 | 38.6% | 1.75 | |
| electricity exported | | | | | 155.1 | 32.8% | | 1.85 |
| process water recovered | 775890 | 18621 | | | | | | |
| excess water available | 21915 | 526 | | | | | | |
| Air supply for combustion | 456047 | 10945 | | | | | | |
| CO2 produced | 122356 | 2937 | | | | | | |
| rejected waste heat | | | | | 62.2 | 13.2% | | |
| | | | | overall energy utilization | | 71.4% | | |
| | | | | | revision | 10/12/01 | | |

Notes
No additional energy or energetic feedstock is requierd for all conversion options
All rejected waste heat is at a temperature below 40 C and is not considered recoverable
DME stored as a compressed liquid at 20 C, 5.1 atm. pressure. density 668 g/L and LHV 28.4 MJ/kg

TABLE 7

Summary of Optimized Performance Parameters for Biomass Conversion Options*

| Feed stock | feed rate kg/hr | MT/day | water/ biomass ratio | useful production per day | CPE rate MW ch | percent CPE input |
|---|---|---|---|---|---|---|
| Dry waste wood | 83775 | 2011 | | | 473.0 | 100.0% |
| Conversion Options | | | | | | |
| 1 Fischer-Tropsch Liquids (FTL) | | | | bbl/day | | |
| water fed used | 264670 | 6352 | 3.2 | | | |
| synthetic diesel fuel | 11526 | 277 | | 2231 | 116.0 | 24.5% |
| electricity exported | | | | | 123.8 | 26.2% |
| process water recovered | 295523 | 7093 | | | | |

| Input conditions: | T deg. C. | P atm. | H2/C | H2O/C | CO/H2 | CH4/CO |
|---|---|---|---|---|---|---|
| HGR | 1000 | 30 | 3.48 | 0.07 | | |
| SPR | 1000 | 30 | 2.47 | 4.15 | 0.21 | 0.93 |
| synthesis reactor | 200 | 10 | 1.4 | | 0.47 | 0.03 |
| | | | | overall energy utilization | | 50.7% |

| | feed rate kg/hr | MT/day | water/ biomass ratio | useful production per day | CPE rate MW ch | percent CPE input |
|---|---|---|---|---|---|---|
| 2 Dimethyl ether (DME) | | | | bbl/day # | | |
| water fed needed | 184387 | 4425 | 2.2 | | | |
| dimethyl ether produced | 20045 | 481 | | 4530 | 160.6 | 33.9% |
| electricity exported | | | | | 110.3 | 23.3% |
| process water recovered | 207334 | 4976 | | | | |

| Input conditions: | Tdeg.C. | Patm. | H2/C | H2O/C | CO/H2 | CH4/CO |
|---|---|---|---|---|---|---|
| HGR | 1000 | 30 | 3.48 | 0.07 | | |
| SPR | 1000 | 30 | 2.47 | 2.91 | 0.21 | 0.93 |
| synthesis reactor | 260 | 70 | 1.2 | | 0.58 | 0.05 |
| | | | | overall energy utilization | | 57.3% |

| | feed rate kg/hr | MT/day | water/ biomass ratio | useful production per day | CPE rate MW ch | percent CPE input |
|---|---|---|---|---|---|---|
| 3 Gaseous Hydrogen (GH2) | | | | cu m/day+ | | |
| water fed needed | 184387 | 4425 | 2.2 | | | |

TABLE 7-continued

Summary of Optimized Performance Parameters for Biomass Conversion Options*

| | | | | | | | |
|---|---|---|---|---|---|---|---|
| gaseous hydrogen (GH2) | 5618 | 135 | | 1899 | 221.4 | | 46.8% |
| electricity exported | | | | | 96.4 | | 20.4% |
| water produced | 180601 | 4334 | | | | | |

| Input conditions: | Tdeg.C. | Patm. | H2/C | H2O/C | CO/H2 | CH4/CO | |
|---|---|---|---|---|---|---|---|
| HGR | 1000 | 30 | 3.48 | 0.07 | | | |
| SPR | 1000 | 30 | 2.47 | 2.91 | 0.21 | 0.93 | |
| | | | | overall energy utilization | | | 67.2% |

| 4 All Electric Power (AEP) | | | | MW eh/day | | | |
|---|---|---|---|---|---|---|---|
| water fed needed | 260393 | 6249 | 3.1 | | | | |
| electricity exported | | | | 4335 | 180.6 | | 38.2% |
| water produced | 311110 | 7467 | | | | | |

| Input conditions: | Tdeg.C. | Patm. | H2/C | H2O/C | CO/H2 | CH4/CO | |
|---|---|---|---|---|---|---|---|
| HGR | 1000 | 30 | 3.48 | 0.07 | | | |
| SPR | 1000 | 30 | 2.47 | 4.15 | 0.21 | 0.93 | |
| | | | | overall energy utilization | | | 38.2% |

| 5 FTL with water:biomass at 9:1 and adiabatic HGR (AHGR) | | | | bbl/day | | | |
|---|---|---|---|---|---|---|---|
| water fed used | 753975 | 18095 | 9.0 | | | | |
| synthetic diesel fuel | 18147 | 436 | | 3512 | 182.7 | | 38.6% |
| electricity exported | | | | | 155.1 | | 32.8% |
| process water recovered | 775890 | 18621 | | | | | |

| Input conditions: | Tdeg.C. | Patm. | H2/C | H2O/C | CO/H2 | CH4/CO | |
|---|---|---|---|---|---|---|---|
| adiabatic HGR | 738 | 30 | 1.67 | 0.43 | | | |
| SPR | 900 | 30 | 0.84 | 3.08 | 0.18 | 4.47 | |
| synthesis reactor | 200 | 10 | 1.38 | | 0.47 | 0.17 | |
| | | | | overall energy utilization | | | 71.4% |
| | | | | revision | | | 10/9/2001 |

Notes
No additional energy or energetic feedstock is requierd for all conversion options
All rejected waste heat is at a temperature below 40 C. and is not considered recoverable
DME stored as a compressed liquid at 20 C., 5.1 atm. pressure, density 668 g/L and LHV 28.4 MJ/kg
1 bbl of compressed liquid DME has a mass of 106.2 kg and LHV CPE of 3.02 GJ
+ Cubic meters of liquified hydrogen (at 20 deg K.) per day at 1 atm. pressure
Approximately 3.7 MJ/kg is needed to cool and liquify hydrogen having an HHV of 144 MJ/kg
*All thermochemical and thermodynamic simulation data as of 10/9/2001

TABLE 8

Compartive ultimate and proximate analyses of Pine (wood) material

| | Ultimate analysis (daf wt %) | | | | | | Proximate analysis | | | | | ref: |
|---|---|---|---|---|---|---|---|---|---|---|---|---|
| | C | H | O | N | S | Cl | Moisture | VM | FC | ash | HHV(MJ/kg) | |
| pine (wood) | 53.00 | 6.00 | 40.70 | 0.20 | 0.080 | 0.02 | | 80.60 | 17.70 | 1.70 | 18.00 | dry wt % | 1 |
| pine (wood) | 45.40 | 4.40 | 37.90 | 0.80 | N.D | N.D | 10.70 | 74.50 | 13.60 | 0.40 | 20.20 | | 2 |
| pine (wood) | 51.60 | 4.90 | 42.60 | 0.90 | N.D | N.D | 11.50 | 74.50 | 13.60 | 0.40 | 20.19 | | 3 |
| pine (wood) | 44.00 | 5.20 | 34.30 | 0.50 | 0.100 | N.D | | 77.40 | 21.40 | 1.20 | | dry wt % | 4 |
| pine (wood) | 50.18 | 5.41 | 43.96 | 0.45 | N.D | N.D | | 72.00 | 26.67 | 1.30 | 18.61 | dry wt % | 5 |
| pine (wood) | 47.40 | 6.20 | 45.80 | 0.40 | 0.200 | N.D | | | | | | | 6 |
| pine (wood) | 48.90 | 6.00 | 43.80 | 0.17 | 0.060 | | | | | 0.50 | 17.80 | | 7 |
| pine bedding chips | 46.41 | 6.32 | 43.03 | 0.50 | 0.001 | N.D | | | | | | | 8 | notes:
daf: dry-ash-free base
references
1 Biagini et al.   Fuel, Volume 81, Issue 8, May 2002, Pages 1041-1050
2 Garcia-Garcia et al.   Bioresource Technology, Volume 88, Issue 1, May 2003, Pages 27-32
3 Pinto et al.   Fuel, Volume 81, Issue 3, February 2002, Pages 291-297
4 Pan et al.   Fuel, Volume 79, Issue 11, September 2000, Pages 1317-1326
5 Sevgi Ensöz   Biöresource Technology, In Press, Corrected Proof, Available online 28 May 2003,
6 Sharypov et al.   Journal of Analytical and Applied Pyrolysis, Volume 64, Issue 1, July 2002, Pages 15-28
7 Zevenhoven et al.   Fuel, Volume 81, Issue 4, March 2002, Pages 507-510
8 this study

TABLE 9

Measured change in hydrogasification reaction rate when using steam pyrolysis

| Substance | Figure | Process | gas | steam:sample ratio | Tr deg C | Prmax bar | t m rate s | Dt s | d[CH4]/dt mole % per s | change ratio |
|---|---|---|---|---|---|---|---|---|---|---|
| PUF | 48 | HGR + SPY | H2 | 0.5 | 660 | 11.0 | 560 | 340 | 0.01 | 1.0 |
| PUF | 49 | HGR + SPY | H2 | 1 | 680 | 12.4 | 510 | 300 | 0.02 | 1.4 |
| PUF | 50 | HGR + SPY | H2 | 2 | 680 | 19.3 | 240 | 100 | 0.07 | 5.9 |
| PVC | 51 | SPY | Ar | 1 | 720 | 41.4 | 220 | 40 | 0.05 | 1.0 |
| PVC | 52 | HGR + SPY | H2 | 1 | 700 | 31.0 | 220 | 40 | 0.15 | 3.0 |
| TR | 53 | SPY | He | 1 | 700 | 45.5 | 370 | 40 | 0.33 | 1.0 |
| TR | 54 | HGR + SPY | H2 | 1 | 700 | 41.4 | 260 | 40 | 0.50 | 1.5 |

TABLE 10

Measured methane production rate

| Gas | [H2O]/[C] | d[CH4]/dt | dry He [CH4]/dt | dry H2 [CH4]/dt | process |
|---|---|---|---|---|---|
| H2 | 0.00 | 0.00478945 | 1.4 | 1.0 | Dry HGR |
| H2 | 1.00 | 0.02758865 | 7.9 | 5.8 | HGR + SPY |
| H2 | 1.50 | 0.04761041 | 13.6 | 9.9 | HGR + SPY |
| H2 | 2.00 | 0.13088836 | 37.5 | 27.3 | HGR + SPY |
| H2 | 2.50 | 0.33396446 | 95.6 | 69.7 | HGR + SPY |
| H2 | 3.00 | 0.54138853 | 155.0 | 113.0 | HGR + SPY |
| He | 0.00 | 0.00349205 | 1.0 | | Dry pyro. |
| He | 1.00 | 0.03946821 | 11.3 | | SPY |
| He | 1.50 | 0.04634509 | 13.3 | | SPY |
| He | 2.00 | 0.05439925 | 15.6 | | SPY |
| He | 2.50 | 0.10675709 | 30.6 | | SPY |
| He | 3.00 | 0.14914457 | 42.7 | | SPY |

What is claimed is:

1. A process for converting carbonaceous material to energetic gases, the process comprising
   a) forming a liquid suspension slurry of particles of carbonaceous material in water; and
   b) feeding hydrogen and the suspension slurry into a hydrogasification reactor without a reaction catalyst at a temperature and pressure sufficient to generate methane and carbon monoxide rich producer gases, wherein the ratio of water to dry carbonaceous material in the hydrogasification reactor is at least 2:1.

2. The process of claim 1 wherein the temperature in step b) is about 580° C. to 790° C.

3. The process of claim 1 wherein the pressure in step b) is about 132 psi to 560 psi.

4. The process of claim 1 wherein the carbonaceous material has a nominal particle size of about 1 mm in diameter.

5. The process of claim 1 wherein the carbonaceous material comprises municipal waste, biomass, wood, coal, or a natural or synthetic polymer.

6. The process of claim 5 wherein the carbonaceous material comprises biomass.

7. The process of claim 5 wherein the carbonaceous material comprises municipal waste which comprises wood or a natural or synthetic polymer.

8. A process for converting carbonaceous material to energetic gases, the process comprising:
   a) forming a liquid suspension slurry of particles of carbonaceous material in water, and
   b) feeding hydrogen and the Suspension slurry into a hydro-gasification reactor without a reaction catalyst at a temperature and pressure sufficient to generate methane and carbon monoxide rich producer gases, wherein the ratio of water to dry carbonaceous material in the hydrogasification reactor is at least 2:1,
   wherein the carbonaceous material comprises wood or a natural or synthetic polymer.

9. A process for producing a synthesis gas, the process comprising:
   a) forming a liquid suspension slurry of particles of carbonaceous material in water;
   b) feeding hydrogen and the suspension slurry into a hydrogasification reactor without a reaction catalyst at a temperature and pressure sufficient to generate methane and carbon monoxide rich producer gases, wherein the ratio of water to dry carbonaceous material in the hydrogasification reactor is at least 2:1, and
   c) subjecting the methane and carbon monoxide rich producer gases to steam reforming reactions under conditions whereby synthesis gas comprising hydrogen and carbon monoxide is generated.

10. The process of claim 9 wherein the carbonaceous material is non-pyrolyzed carbonaceous material.

11. The process of claim 9 wherein the carbonaceous material comprises municipal waste, biomass, wood, coal, or a natural or synthetic polymer.

12. The process of claim 11 wherein the carbonaceous material comprises biomass.

13. The process of claim 11 wherein the carbonaceous material comprises municipal waste which comprises wood or a natural or synthetic polymer.

14. A process for producing a synthesis gas, the process comprising:
   a) forming a liquid suspension slurry of particles of carbonaceous material in water;
   b) feeding hydrogen and the suspension slurry into a hydragasification reactor without a reaction catalyst at a temperature and pressure sufficient to generate methane and carbon monoxide rich producer gases, wherein the carbonaceous material comprises wood or a natural or synthetic polymer, wherein the ratio of water to dry carbonaceous material in the hydrogasifleation reactor is at least 2:1, and
   c) subjecting the methane and carbon monoxide rich producer gases to steam reforming reactions under conditions whereby synthesis gas comprising hydrogen and carbon monoxide is generated.

15. A process for producing a liquid fuel, the process comprising:
   a) forming a liquid suspension slurry of particles of carbonaceous material in water;
   b) feeding hydrogen and the suspension slurry into a hydrogasification reactor without a reaction catalyst at a temperature and pressure sufficient to generate methane and carbon monoxide rich producer gases, wherein the ratio of water to dry carbonaceous material in the hydrogasification reactor is at least 2:1;

c) subjecting the methane and carbon monoxide rich producer gases to steam reforming reactions under conditions whereby synthesis gas comprising hydrogen and carbon monoxide is generated; and d) subjecting the synthesis gas to Fischer-Tropsch type reactions under conditions whereby a liquid fuel is produced.

16. The process of claim 15 wherein the carbonaceous material is non-pyrolyzed carbonaceous material.

17. The process of claim 15 wherein the carbonaceous material comprises municipal waste, biomass, wood, coal, or natural or synthetic polymer.

18. The process of claim 17 wherein the carbonaceous material comprises biomass.

19. The process of claim 17 wherein the carbonaceous material comprises municipal waste which comprises wood or a natural or synthetic polymer.

20. A process for producing a synthesis gas for use as a gaseous fuel or as feed into a Fischer-Tropsch type reactor to produce a liquid fuel, the process comprising:

a) forming a liquid suspension slurry of particles of carbonaceous material in water to produce a slurry of carbonaceous materials;

b) feeding hydrogen and the suspension slurry into a hydrogasification reactor without a reaction catalyst at a temperature and pressure sufficient to generate methane and carbon monoxide rich producer gases, wherein the ratio of water to dry carbonaceous material in the hydrogasification reactor is at least 2:1;

c) feeding the methane and carbon monoxide rich producer gases from the hydro-gasification reactor into a steam methane reformer under conditions whereby synthesis gas comprising hydrogen and carbon monoxide is generated;

d) feeding a portion of the hydrogen generated by the steam methane reformer into the hydro-gasification reactor as said hydrogen from an internal source; and e) either utilizing said synthesis gas generated by the steam methane reformer for process heat or as fuel for an engine to produce electricity, or feeding said synthesis gas into the Fischer-Tropsch type reactor under conditions whereby a liquid fuel is produced.

21. The process of claim 20 in which said slurry is formed by grinding said carbonaceous material in water.

22. The process of claim 20 in which said carbonaceous material comprises municipal waste, biomass, wood, coal, or a natural or synthetic polymer.

23. The process of claim 22 wherein the carbonaceous material comprises biomass.

24. The process of claim 22 wherein the carbonaceous material comprises municipal waste which comprises wood or a natural or synthetic polymer.

25. The process of claim 20 in which synthesis gas generated by the steam methane reformer is fed into a Fischer-Tropsch type reactor under conditions whereby a liquid fuel is produced.

26. The process of claim 25 wherein said conditions and the relative amounts of hydrogen and carbon monoxide in the Fischer-Tropsch type reactor are such that said liquid fuel is produced exothermally.

27. The process of claim 26 comprising transferring exothermic heat from one or both of the hydro-gasification reactor and Fischer-Tropsch type reactor to the steam methane reformer.

28. The process of claim 26 comprising transferring exothermic heat from the hydro-gasification reactor and Fischer-Tropsch type reactor to the steam methane reformer.

29. The process of claim 28 in which molten salt loops or water-steam loops are used to transfer said exothermic heat.

30. The process of claim 25 in which the relative amounts of hydrogen and carbon monoxide in the synthesis gas fed into the Fischer-Tropsch type reactor are such that said liquid fuel is substantially cetane.

31. A substantially self-sustaining process for producing a liquid fuel from carbonaceous feed, comprising:

a) fanning a liquid suspension slurry of particles of carbonaceous material in Water;

b) feeding hydrogen from an internal source and the suspension shiny into a hydro-gasification reactor without a reaction catalyst in amounts whereby methane and carbon monoxide rich producer gases are generated exothermally under super-atmospheric pressure; wherein the ratio of water to dry carbonaceous material in the hydrogasification reactor is at least 2:1;

c) feeding the methane and carbon monoxide rich producer gases from the hydro-gasification reactor into a steam methane reformer under conditions whereby synthesis gas comprising hydrogen and carbon monoxide are generated;

d) feeding a portion of the hydrogen generated by the steam methane reformer, through a hydrogen purification filter, into the hydra-gasification reactor, the hydrogen therefrom constituting said hydrogen from an internal source;

e) feeding the remainder of the synthesis gas generated by the steam methane reformer into the Fischer-Tropsch type reactor under conditions whereby a liquid fuel is produced exothermally; and f) transferring exothermic heat from the hydra-gasification reactor and Fischer-Tropsch type reactor to the steam methane reformer, whereby said process is substantially self-sustaining.

32. The process of claim 31 in which molten salt loops or water-steam loops are used to transfer said exothermic heat.

33. The process of claim 31 in which said carbonaceous material comprises municipal waste, biomass, wood, coal, or a natural or synthetic polymer.

34. The process of claim 33 wherein the carbonaceous material comprises biomass.

35. The process of claim 33 wherein the carbonaceous material comprises municipal waste which comprises wood or a natural or synthetic polymer.

36. The process of claim 20, wherein step a) further comprises feeding superheated steam from a steam generator into the hydro-gasification reactor.

37. The process of claim 36, further comprising transferring exothermic heat from one or both of the hydro-gasification reactor and Fischer-Tropsch type reactor to the steam generator.

* * * * *